US008554758B1

(12) United States Patent
Larson et al.

(10) Patent No.: US 8,554,758 B1
(45) Date of Patent: Oct. 8, 2013

(54) METHOD AND APPARATUS FOR MONITORING AND MAINTAINING HEALTH IN A SEARCHABLE DATA SERVICE

(75) Inventors: James S. Larson, Dublin, CA (US); Patrick W. Ransil, Alameda, CA (US); Aleksey V. Martynov, San Francisco, CA (US); James R. Collette, Sammamish, WA (US); Robert Wai-Chi Chu, Oakland, CA (US); Partha Saha, Oakland, CA (US)

(73) Assignee: Amazon Technologies, Inc., Reno, NV (US)

( * ) Notice: Subject to any disclaimer, the term of this patent is extended or adjusted under 35 U.S.C. 154(b) by 2034 days.

(21) Appl. No.: 11/392,480

(22) Filed: Mar. 29, 2006

Related U.S. Application Data

(60) Provisional application No. 60/754,777, filed on Dec. 29, 2005.

(51) Int. Cl.
G06F 17/30 (2006.01)
G06F 7/00 (2006.01)
G06F 9/44 (2006.01)

(52) U.S. Cl.
USPC ............ 707/707; 707/709; 707/673; 717/103

(58) Field of Classification Search
USPC .................. 707/219; 709/217, 219, 223, 224
See application file for complete search history.

(56) References Cited

U.S. PATENT DOCUMENTS

| 5,963,944 A | 10/1999 | Adams |
| 6,167,438 A * | 12/2000 | Yates et al. .................... 709/216 |
| 6,192,165 B1 | 2/2001 | Irons |
| 6,351,776 B1 | 2/2002 | O'Brien et al. |

(Continued)

FOREIGN PATENT DOCUMENTS

| EP | 993163 | 4/2000 |
| EP | 1237096 | 9/2002 |

(Continued)

OTHER PUBLICATIONS

Fernandess et al. "On Collaborative Content Distribution using Multi-Message Gossip" School of Engineering and Computer Science, The Hebrew University of Jerusalem, Israel.*

(Continued)

Primary Examiner — Pierre Vital
Assistant Examiner — Berhanu Mitiku
(74) Attorney, Agent, or Firm — Robert C. Kowert; Meyertons, Hood, Kivlin, Kowert & Goetzel, P.C.

(57) ABSTRACT

Method and apparatus for monitoring and maintaining group health and membership in a searchable data service. The searchable data service may provide a searchable index to a backend data store, and an interface to build and query the searchable index, that enables client applications to search for and retrieve locators for stored entities in the backend data store. Embodiments of the searchable data service may implement a group health mechanism that may allow one or more components of the searchable data service to identify sets of nodes that the components may monitor. A group health component may be queried by the other components for automatically-refreshed health information about those nodes. The group health component may perform as a node failure detection mechanism. Node health information may be communicated among nodes at least in part using a gossip protocol.

69 Claims, 22 Drawing Sheets

(56) References Cited

U.S. PATENT DOCUMENTS

| | | | |
|---|---|---|---|
| 6,557,111 B1* | 4/2003 | Theimer et al. | 714/4 |
| 6,651,242 B1* | 11/2003 | Hebbagodi et al. | 717/127 |
| 7,287,068 B1 | 10/2007 | Eriksson et al. | |
| 2002/0188735 A1 | 12/2002 | Needham | |
| 2004/0006601 A1 | 1/2004 | Bernstein et al. | |
| 2004/0010716 A1* | 1/2004 | Childress et al. | 713/201 |
| 2004/0044776 A1 | 3/2004 | Larkin | |
| 2005/0108203 A1* | 5/2005 | Tang et al. | 707/3 |
| 2006/0168154 A1 | 7/2006 | Zhang et al. | |
| 2007/0033262 A1 | 2/2007 | Labelle et al. | |
| 2007/0156842 A1 | 7/2007 | Vermeulen et al. | |

FOREIGN PATENT DOCUMENTS

| | | |
|---|---|---|
| WO | 0004458 | 1/2001 |
| WO | 02/05064 | 1/2002 |
| WO | 02/084528 | 10/2002 |

OTHER PUBLICATIONS

Lin et al. "Directional Gossip: Gossip in a Wide Area Network" University of Texas at Austin, Department of Electrical and Computer Engineering, Austin TX.*

Renesse et al. "A Gossip-Style Failure Detection Service" Dept. of Computer Science, Cornell University, 4118 Upson Hall, Ithaca, NY 14853.*

Sonica et al. "Chord: A Scalable Peer-to-peer Lookup Service for Internet Applications", SIGCOMM'01, Aug. 27-31, 2001, San Diego, California, USA.*

Karger, et al., "Consistent Hashing and Random Trees: Distributed Caching Protocols for Relieving Hots Spots on the World Wide Web," XP-002183010, Proceedings of the 29th Annual ACM Symposium on Theory of Computing, May 4, 2007, pp. 654-663.

Karger, et al., "Web Caching with Consistent Hashing," Elsevier Science B.V., vol. 31, No. 11-16, May 17, 1999, pp. 1203-1213, XP004304549.

Yang, et al., "Comparing Hybrid Peer-to-Peer Systems," Proceedings of the 27th VLDB Conference, 2001, pp. 561-570, XP002265418.

XDRIVE, "Frequently Asked Questions," Apr. 8, 2000, XP009054821.

Michael S. Marmor, "Make the P2P Leap with toadnode," Web Techniques, Miller Freeman, Vo. 5, No. 12, Dec. 2000, pp. 44-49, XP008000376.

Mojo Nations Docs, "Technology Overview of Mojo Nation," Feb. 14, 2000, XP002177454.

U.S. Appl. No. 11/393,002, filed Mar. 29, 2006.
U.S. Appl. No. 11/392,482, filed Mar. 29, 2006.
U.S. Appl. No. 11/392,485, filed Mar. 29, 2006.

* cited by examiner

METHOD AND APPARATUS FOR MONITORING AND MAINTAINING HEALTH IN A SEARCHABLE DATA SERVICE

PRIORITY DATA

This application claims priority to U.S. Provisional Patent Application Ser. No. 60/754,777, filed Dec. 29, 2005, and which is herein incorporated by reference in its entirety.

BACKGROUND OF THE INVENTION

1. Field of the Invention

This invention relates to data storage and retrieval, and, more particularly, to searchable indexes for data stores.

2. Description of the Related Art

The Internet, sometimes called simply "the Net," is a worldwide system of computer networks in which a client at any one computer may, with permission, obtain information from any other computer. The most widely used part of the Internet is the World Wide Web, often abbreviated "WWW", which is commonly referred to as "the Web". The Web may be defined as all the resources (e.g., Web pages and Web sites) and clients on the Internet that use the Hypertext Transfer Protocol (HTTP) or variations thereof to access the resources. A Web site is a related collection of Web files that includes a beginning file called a home page. From the home page, the client may navigate to other Web pages on the Web site. A Web server program is a program that, using the client/server model and HTTP, serves the files that form the Web pages of a Web site to the Web clients, whose computers contain HTTP client programs (e.g., Web browsers) that forward requests and display responses. A Web server program may host one or more Web sites.

Data Storage

Data storage, storing data objects of various types for access by various applications, is a primary area of interest and development in computer systems and applications, networking, the Internet, and related technical areas. Conventionally, developers have either created their own data storage solutions for storing data objects, have leveraged off-the-shelf database products, such as an Oracle® database product or a MySQL® database product, to develop data storage solutions, or have relied on third-party providers for data storage solutions. Oracle® is a registered trademark of Oracle Corporation and/or its affiliates. MySQL® is a registered trademark of MySQL AB. However the data storage solution is provided, data objects may be stored to, and retrieved from, the data store. Typically, a data storage solution provides one or more types of locators that may be used to retrieve data objects from the data store. A common "locator" is a file path-type locator, in which a client provides a file path, including a particular file name, to retrieve a particular data object (e.g., a file) from some location with a data store specified in the file path. File paths are, however, not very flexible, as the desired data object is specifiable only by the path/file name. File path mechanism, and other conventional "locator" mechanisms for retrieving data objects from data stores, typically do not provide the flexibility to retrieve data objects from a data store according to other attributes of the desired data objects. For example, a client may wish to retrieve data objects from the data store according to category, company, type, or any of countless other attributes that may be associated with a data object. Conventional file paths do not provide for such flexible retrieval methods.

There are "one-off" data storage solutions that may provide more flexible mechanisms for querying/retrieving data objects from a data store according to other attributes than just a file path/file name. Conventionally, different developers have tended to solve this same data storage problem for different applications over and over again in ways that do not scale to other problems, are not flexible to address other data storage needs, and/or have based their solutions on "off-the-shelf" technologies such as an Oracle® database product or a MySQL® database product that prove to be expensive in the short- and/or long-term. As the data store grows, these conventional data storage solutions generally require a data store administrator to perform or manage monitoring, partitioning, query optimizations, storage procedures, additions of new hardware, crisis/emergency procedures (e.g., when a storage system goes down), etc. In addition, for these conventional data storage solutions, if a client wants to add new attributes that may be used to query for and retrieve data objects, table schemas have to be changed to support the new attributes.

SUMMARY

Various embodiments of a method and apparatus for monitoring and maintaining group health and membership in a searchable data service system are described. The searchable data service may provide a searchable index to a backend data store, and an interface to build and query the searchable index, that enables client applications to search for and retrieve locators for stored entities in the backend data store according to a list of attributes associated with each locator. One embodiment of the searchable data service may be implemented as a Web service with a Web service interface that exposes one or more calls to the functionalities of the searchable data service to client applications. The searchable data service provides a searchable index and is not itself a data store per se. Note, however, that embodiments of the searchable index may be used in applications where there may be no backend data store. In these applications, the attributes stored as {name, value} pairs in the searchable index are the data.

Embodiments of the searchable data service may be implemented as a distributed system on a plurality of hosts, or nodes. In one embodiment, the nodes may include coordinator nodes that route requests from client systems to appropriate nodes within the searchable data service, query nodes that handle the processing of query requests, and storage nodes that store and manage the searchable index. In one embodiment, communications among nodes and components in a searchable data service implementation may be facilitated at least in part through a gossip protocol and an anti-entropy protocol. The plurality of nodes may self-organize into two or more node groups each including a subset of the plurality of nodes. In one embodiment, the node groups may include one or more storage node groups each including a subset of the storage nodes, one or more query node groups each including a subset of the query nodes, and one or more coordinator node groups each including a subset of the coordinator nodes. Other embodiments may include other types of node groups.

Embodiments of the searchable data service may implement a group health mechanism that may allow one or more components of the searchable data service to identify sets of nodes that the components may monitor. A group health component may be queried by the other components for automatically-refreshed health information about those nodes. In one embodiment, the group health component may also perform as a node failure detection mechanism.

In one embodiment, nodes may exchange health information about themselves and other nodes via a group health component and a group communication component. In one embodiment, if a searchable data service node is not communicating with other nodes within a group, whether due to a node failure, a network failure, or for some other reason, the staleness of the node's information may be noticed by the other nodes, and a timer may be used to eventually declare the silent node as failed. This encapsulation of time may help to simplify other components by allowing the components to work asynchronously. In one embodiment, another node may be determined to have failed or gone offline if a group health message is not received from that node (either directly or through gossip) for a period equal to or greater than a pre-specified timeout period after the last received group health message. If a node does not receive any group health messages from any other nodes for a specified period, the node may assume that its network connection has failed.

In one embodiment, if a node has not seen a health update from a monitored node for a specified period, e.g. 5 minutes, the node may perform a health anti-entropy operation with a different node, which in one embodiment may be selected according to a probability that decreases with distance from the node. Other embodiments may use other methods or metrics or combinations thereof to select a different node with which a health anti-entropy may be performed. If the anti-entropy does not yield an update for the monitored node, the monitored node may be identified as dead or unavailable to local components on the monitoring node.

In one embodiment, distributed load averaging may be controlled at least in part through the group membership and health component. For example, in one embodiment, group membership and health component may provide a mechanism to select a best member node from a replication group, taking current load averages and distances into account.

Figure 1:
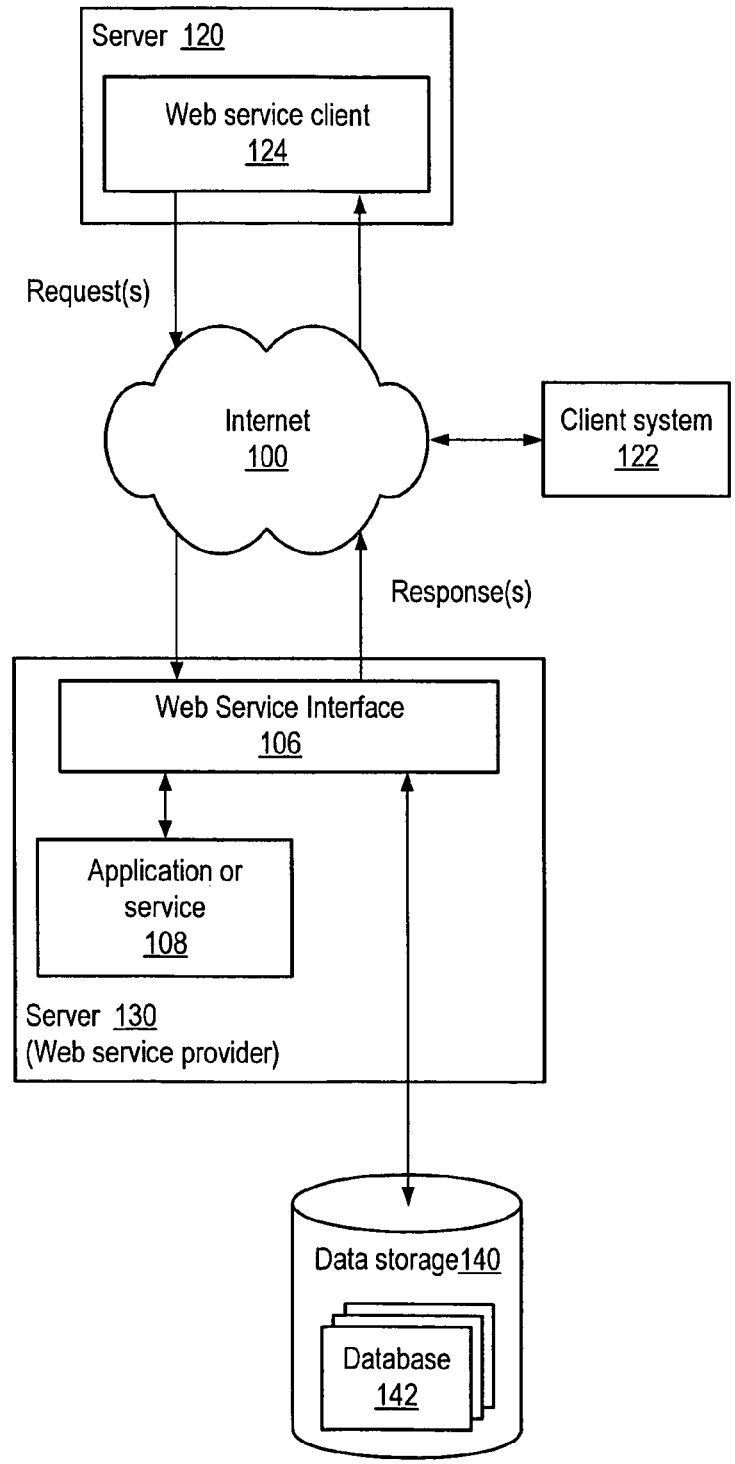
FIG. 1 is a block diagram that illustrates an exemplary system configuration that provides a Web service interface, and shows the interaction between a Web service client and a Web service provider.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for a general-purpose searchable data service are described. In one embodiment, the searchable data service may be implemented as a Web service that allows developers to store attributes, expressed as {name, value} pairs, that are associated with data objects (entities) in a data store. Attributes associated with entities may be automatically indexed for use in searches. Search expressions may perform logical and arithmetic operations on attributes to find and retrieve data objects, or entities, identified by locators (also referred to as entity identifiers, or eIDs) for the entities. Embodiments of the searchable data service may be implemented according to an architecture as described herein that is accessible to developers via a Web service interface to provide search frontends for client applications to data stores that are easy to implement, and to create and update searchable indexes to the data stores that are reliable, fast and scalable.

Embodiments of the searchable data service may provide a searchable index to a backend data store and an interface to build and query the searchable index that enable client applications to search for and retrieve locators for stored data (units of data, or data objects, in a data store may be referred to herein as entities) in the backend data store according to a list of attributes associated with each locator. The backend data store may be implemented as any type of data storage system in which a locator may be used to locate and retrieve an entity, and may store any type of data object (entity). The entities may be described in the searchable data service by locators for the entities in the data store, which may be referred to as entity Identifiers, or eIDs. Each locator, or eID, may have an associated set of attributes of the entity, expressed as {name, value} pairs. Note that the locator, or eID, may itself be considered one of the attributes of the entity in the data store. A query interface and protocol may be provided which may be used to query for and receive lists of eIDs from the searchable data service according to one or more of the attributes associated with the eIDs.

The conventional Web model allows clients to access Web resources (e.g., applications, services, and data) via an HTTP client program, such as a Web browser. A technology referred to as Web services may be used to provide programmatic access to Web resources. Web services may be used to provide Web software developers programmatic access to Web resources including technology platforms (e.g., applications and services) and data (e.g., product catalogs and other databases) hosted on Web-connected computers such as Web server systems via a Web service interface. Generally speaking, a Web service interface may be configured to provide a standard, cross-platform API (Application Programming Interface) for communication between a client requesting some service to be performed and the service provider. In some embodiments, a Web service interface may be configured to support the exchange of documents or messages including information describing the service request and response to that request. Such documents, or messages, may be exchanged using standardized Web protocols, such as the Hypertext Transfer Protocol (HTTP), for example, and may be formatted in a platform-independent data format, such as eXtensible Markup Language (XML), for example.

FIG. 1 is a block diagram that illustrates an exemplary system configuration that provides a Web service interface, and shows the interaction between a Web service client and a Web service provider. In this example, a Web service interface 106 may be implemented on a server 130 coupled to Internet 100. This server 130 may be referred to as a Web service provider. Server 130, or alternatively one or more other servers coupled to server 130, may include one or more applications or services 108. Server 130 may be coupled to data storage 140 for storing information in database 142. Database 142 may include any type of data.

Server 120 may be coupled to Internet 100. Server 120 may host a Web service client 124. Web service client 124 may be configured to programmatically access application or service 108 of server 130 and/or database 142 via Web service interface 106. Note that Web service interface does not provide a Web browser interface, but instead provides a programmatic interface via an API through which at least some functionality of application or service 108 and/or at least some data in database 142 may be programmatically accessed by Web service client 124. Also note that server 120 may provide a Web site accessible to client(s) 122 via Web browsers, and Web service client 124 may be configured to access at least some functionality of application or service 108 and/or at least some data in database 142 of server 130 via Web service interface 106 to provide access to at least some functionality of application or service 108 and/or at least some data in database 142 via the Web site provided by server 120. Further, note that Web service client 124 may itself be another Web service.

To access an application, service or data provided by the Web service provider 130, Web service client 124 may send a request message to Web service interface 106 via Internet 100. This request message goes through the network and Internet infrastructures; through the Web service client 124's local network routers, switches, firewalls, etc., through the Internet backbone, to the Web service provider's local network, to Server 130, and then to Web service interface 106. Web service provider 130 may then process the request, for example by performing an indicated function(s) of application or service 108 or accessing indicated data in database 142. Web service interface 106 may then return results of the processing to the Web service client 124 in a response message via Internet 100, back through the local networks and Internet backbone.

One embodiment of the searchable data service may be implemented as a Web service with a Web service interface that exposes one or more Web service calls to the functionalities of the searchable data service to client applications. This Web service interface may enable developers to easily build search frontends for a variety of client applications that access the functionalities of the searchable data service via the Web service interface to search for and retrieve various types of data stored in the backend data stores. Applications that leverage the searchable data service to implement a search frontend for a data store may be automatically scaled to any size with little or no system administration overhead required for the scaling, and search speed may be automatically optimized using, for example, indexes, query planning, and parallelism.

Embodiments of the searchable data service may provide an inexpensive, easy to implement, and easy to maintain searchable index and interface to the searchable index that may be leveraged to provide a search frontend to data stores that may satisfy the search requirements for a wide variety of applications: The searchable data service provides a searchable index and is not itself a data store per se. Embodiments of the searchable data service may separate searching and indexing of data from the actual storage of the data. A backend data store may be implemented as any type of data storage system in which a locator may be used to locate and retrieve an entity, and may reside anywhere on a network, Local Area Network (LAN), Wide Area Network (WAN), or on the Internet, or may even be implemented on a local data storage locally attached to a computer system or systems. Note, however, that embodiments of the searchable index may be used in applications where there may be no backend data store. In these applications, the attributes stored as {name, value} pairs in the searchable index are the data.

Embodiments of the searchable data service may enable developers to put the data store anywhere they want; the developers then provide the locators (eIDs) to the searchable data service, along with a set of attributes, expressed as {name, value} pairs, for the eIDs, for which a searchable index is constructed, and the searchable data service may then be queried to return lists of eIDs from the searchable index that satisfy the queries. These lists of eIDs may then be used to access the data entities stored on the backend data store. As mentioned, one embodiment may provide a Web service interface that provides one or more Web service calls through which the developers may add the eIDs and associated attributes, update the searchable index (e.g., by modifying, replacing or deleting eIDs and attributes in the searchable index), and query the searchable data service to obtain lists of eIDs.

Embodiments of the searchable data service may be used to provide searchable indexes to any type of data. Embodiments may be used, for example, to provide searchable indexes to data stored in databases, and to repositories of files of various particular or mixed types including, but not limited to, textual, digital image, and digital audio files. For example, the searchable data service may be used to provide a searchable index to a digital image repository. Through a Web service interface to the searchable data service, clients on the Internet may open an account, store digital images, and provide indexing information for the digital images.

In one embodiment, an implementation of the searchable data service may provide the data store as well as a searchable index to the data store. In one embodiment, through a Web service or other interface to the searchable data service, clients may store entities to a data store and provide the eIDs and associated attributes for the entities, which are used to create the searchable index for the data store. The clients may then query the searchable index via the interface to the searchable data service, and use the results of the queries to access the data store via the interface to the searchable data service.

Note that, while embodiments of the searchable data service are generally referred to herein as providing a searchable index to a backend data store, embodiments may be used in applications where there may be no backend data store. In these applications, the attributes stored as {name, value} pairs in the searchable index are the data. In these applications, there are no "entities" stored in a backend data store; in a sense, the entities are the attributes in the searchable index. In one embodiment, through a Web service or other interface to the searchable data service, clients may provide their data as {name, value} pairs, which are used to create the searchable index. The clients may then query the searchable index via the interface to the searchable data service to obtain desired data. Examples of applications for which the searchable data service may be used and in which there is no backend data store may include, but are not limited to, product catalogs and phone directories.

Embodiments of the searchable data service may include mechanisms that enable the searchable data service to scale easily, and to provide redundancy, reliability, and high availability of the searchable indexes without requiring any knowledge or additional effort by a developer leveraging the searchable data service to provide a search frontend to a backend data store. These mechanisms may include, but are not limited to, a mechanism for building the searchable indexes, a mechanism for partitioning the searchable indexes, a mechanism for replicating the searchable indexes, a mechanism for handling the failure of nodes within the searchable data service, and a mechanism for the automated monitoring and control of nodes within the searchable data service.

Some embodiments of the searchable data service may be implemented as a distributed system with a Web services frontend, with various nodes in the system configured to perform various functions. For example, in one embodiment, there may be one or more coordinator nodes that coordinate the routing of requests from client systems to one or more other appropriate nodes, for example routing clients' query (read) requests received via a Web service interface to one or more appropriate query nodes and clients' storage (write) requests received via a Web service interface to one or more appropriate storage nodes; one or more query nodes that handle the processing of query requests including the routing of query requests to appropriate storage nodes, and one or more storage nodes that manage the storage of eIDs and associated attributes in response to storage requests and the retrieval of stored eIDs in response to query requests received from the query nodes.

The various nodes in the distributed system may communicatively cooperate to ensure that the searchable indexes are scalable, consistent, available, and durable. In one embodiment, communications among nodes in a searchable data service implementation may be facilitated at least in part through a gossip protocol. In one embodiment, communications among nodes in a searchable data service implementation may be facilitated at least in part through an anti-entropy protocol. In one embodiment, communications among nodes in a searchable data service implementation may be facilitated at least in part through a gossip protocol and an anti-entropy protocol. In one embodiment, two or more nodes in a searchable data service implementation may participate in groups according to a group communications protocol that uses the gossip protocol and/or the anti-entropy protocol to facilitate the cooperative performance of various functions among the nodes within the group, such as the cooperative movement of partitions or the cooperative replication of partitions within groups of storage nodes.

In one embodiment, a searchable index (also referred to as a domain, or bucket) created by a subscriber may be initially created as one partition, and that partition (and any subsequently created partitions) may be repartitioned on a storage node, and one of the resulting new partitions may then be cooperatively moved to another storage node within a data center or in another data center, to allow the searchable index to grow beyond the storage limits of one node or even one data center. Partitioning may also be used to improve performance by allowing client storage (write) requests to be distributed among two or more nodes.

Partitions of a domain may be replicated to other storage nodes, within a data center or across data centers, to provide redundancy of data, which may help to ensure that the searchable index remains available and is durable. Replication may also be used to improve performance by allowing client query (read) requests to be distributed among two or more nodes. In one embodiment, replication may be performed using anti-entropy to copy the partition from one storage node to another storage node, and then using the gossip protocol to bring the replicated partition up-to-date. The storage nodes that store replicas of a particular partition may cooperatively participate in a replication group, and group communications may be used within the group to propagate updates to the partition. In one embodiment, writes to a replicated partition may initially be directly applied on one or more storage nodes within the replication group, and then propagated to the other storage nodes within the replication group using the gossip protocol.

Group communications may be used to monitor the health and status of various nodes, components, and other resources within the searchable data service implementation, and may enable the automatic addition of new resources to replace existing resources that fail or become unavailable for any reason. For example, group communications may be used to automatically recruit a new storage node into a storage node group (e.g., a replication group) if one of the existing storage nodes goes offline.

Embodiments of the searchable data service may use key-value pair storage to store the eIDs and associated other attributes (expressed as {name, value} pairs) of entities in an eID store. Note that the eIDs may be considered as one of the attributes of the associated entities, and may be stored in the eID store as a key-value pair. In one embodiment, the key-value pair storage may be implemented according to an associative dictionary database architecture to store the eIDs and associated other attributes. The associative dictionaries used to store attributes in embodiments may be capable of high throughput, especially when reading, at relatively little CPU cost. The associative dictionaries are simple, which may aid in maintaining reliability, in ease of use, and in flexibility. Further, the associative dictionaries may be inexpensive when compared to alternatives like relational databases.

In one embodiment, the eID store may be implemented in accordance with a Berkeley Database. The Berkeley Database is an open source embedded database system that uses key-value pairs, and that may be used to create indexes to tables and other data structures. Unlike relational databases, a Berkeley Database does not support SQL queries. All queries and data analyses are instead performed by the application through a Berkeley Database application programming interface (API). Note that other embodiments may use other database structures for the eID store.

Embodiments of the searchable data service may make indexed search available on the Web using Web services. Embodiments may make it easy for developers to add search capabilities to their applications. Developers of applications that need to access data objects stored in a data store may need or desired to enable the application to retrieve data objects based on one of several attributes or a combination of attributes. By combining associative dictionaries with search indexes, and making indexed search available through a Web service interface, embodiments of the searchable data service may allow developers to leverage the searchable data service to inexpensively and easily implement a searchable index frontend for such applications that provides the speed and query power needed or desired for many such applications to retrieve locators for data objects stored in data stores based on one attribute or a combination of attributes.

Note that the implementation of the searchable data service, including the various mechanisms, subsystems, and components of the searchable data service described herein, may be transparent to the client/developer. The client and/or developer may only need to be aware of a minimal, externally exposed interface to the searchable data service, which may be provided through a Web service interface, that allows the client/developer to build and update a searchable index (domain) and to query the searchable data service for lists of eIDs from the searchable index.

Figure 2:
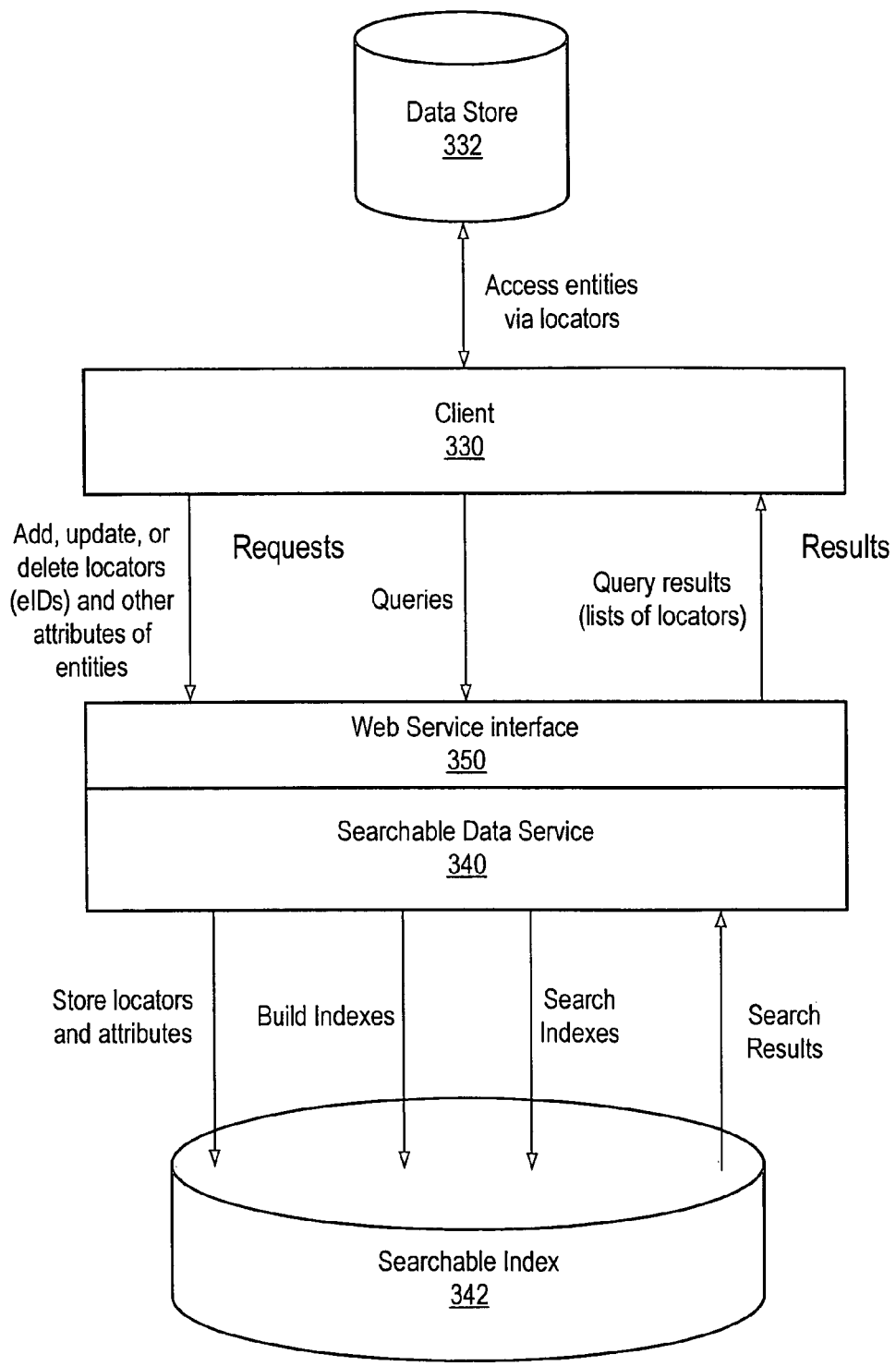
FIG. 2 illustrates the relationship and dataflow between a client and the searchable data service, according to one embodiment.

FIG. 2 illustrates the relationship and dataflow between a client and the searchable data service, according to one embodiment. A data store 332 may include data entities that are accessible via locators. A searchable data service 340 implementation may expose an API via a Web service interface 350. A client 330 may have access to the functionalities of the searchable data service 340 via the Web service interface. A developer of an application (e.g., client 330) may leverage the searchable data service 340, via the calls provided by the Web service interface 350, to provide a frontend search service to the data store 332.

The client 330 may provide locators (eIDs) and associated attributes (which may be described by {name, value} pairs) for at least some of the entities in data store 332 to the searchable data service 340 via Web service interface 350. Searchable data service 340 may store the eIDs and associated attributes in buckets as described above, and may build indexes for the attributes, to generate searchable index 342. Client 330 may then query the searchable data service 340 via Web service interface 350. Searchable data service 340 executes the queries against the searchable index 342 to locate eIDs that satisfy the queries. Searchable data service 340 may return query results including lists of eIDs that satisfy the queries to the client 330.

The following are definitions for some terms used herein to describe aspects of embodiments of the searchable data service:

Entity: An entity refers to any data object or entity, which may be stored in a data store 332 of some type, to which the developer wants to associate attributes.

Entity identifier (eID): a string (e.g., a UTF-8 encoded string) that a developer may use to uniquely identify an entity to their application. An eID may also be referred to as a locator. In some use cases, an eID may be used to locate a blob-like entity. In one embodiment, the searchable data service may be opaque to the storage solution used by the developer. In one embodiment, UTF-8 encoding may be used for eIDs to support features that require ordering of eIDs. Note that, in one embodiment, an eID may be an arbitrary sequence of bytes (but unique within the domain or bucket).

Attribute: refers to {name, value} pairs, which may be expressed as strings, which are associated with eIDs, and based on which the eIDs may be indexed and queried. In one embodiment, attributes may be UTF-8 encoded strings so that the attributes may readily be used in UTF-8 encoded query expression strings.

Index: Each of the attributes associated with an eID may have or may be given an index that may be queried to retrieve the list of eIDs that satisfy the query expression.

Sequence ID: A searchable data service-generated unique identifier that acknowledges receipt of an update request and allows the status of the update to be tracked. In one embodiment, the sequence ID may be used in ordering and in maintaining the consistency of update requests; a request with a higher sequence ID globally supercedes a request with a lower sequence ID. Note that, in one embodiment, the sequence ID may not be exposed to the client.

Client (e.g., client 330 in FIG. 2): The term client may be used to represent any application, script, piece of software, etc., developed by a searchable data service subscriber who would like to use the searchable data service system.

Subscriber: A searchable data service subscriber may be uniquely identified by a subscriber identifier for billing, metering, and possibly other purposes. Each searchable data service subscriber may have more than one client accessing their data in searchable data service using the same subscriber identifier. The subscriber identifier may be used within the searchable data service to locate the subscriber's eID data stored in the searchable data service. A subscriber may be the owner of one or more buckets. A subscriber may also be referred to as a customer.

Searchable data service request: refers to a call (including the data) that the client sends to the searchable data service, via the Web service interface, to perform one or more of the searchable data service operations described herein.

Searchable data service response: refers to a response that the searchable data service sends back to the client once it has processed the searchable data service request sent by the client.

Bucket: refers to a group of searchable data service objects that the subscriber may wish to keep together for semantic or other reasons. A query is applied across one bucket. A bucket may also be referred to as a domain or as a searchable index. Each bucket may be identified by a bucket identifier. In one embodiment, each subscriber identifier may be associated with one or more bucket identifiers, but a bucket identifier may be associated with one and only one subscriber identifier.

The following illustrates the relationship between a subscriber, a bucket, and an entity identifier (eID):

subscriber→bucket→eID

In one embodiment, the searchable data service logically maintains an eID→attributes table for every subscriber bucket. The following is a representation of an exemplary eID→attributes table:

| eID | Attributes |
|-----|------------|
| k1  | {{name, value}}, {{name, value}}, . . . |
| k2  | {{name, value}}, {{name, value}}, . . . |
| k3  | {{name, value}}, {{name, value}}, . . . |
| ... | ... |

In one embodiment, every eID is unique in the table (within a bucket); an eID may thus be viewed as a subscriber-provided entity key. In one embodiment, an eID may be composed of printable characters.

Concerning the relationship between attributes and {name, value} pairs, attributes may typically be represented by one {name, value} pair. However, in one embodiment, it is possible to have more than one {name, value} pair with the same name on any row in the table above, indicating a multi-valued attribute of that name. For example, the following exemplary row from an eID→Attributes table illustrates that the keywords attribute is multi-valued for the particular URL specified as the eID.

| eID | Attributes |
|-----|------------|
| <url> | (name = "keywords", value = "xxx"), (name = "keywords", value = "yyy"), . . . |

In one embodiment, all values in {name, value} pairs are expressed as strings. To have comparison operators for strings return the same truth-value as numbers, the numbers may be zero-padded. For example, "21">"100" is true when ">" is comparing strings, but false when it is comparing numbers; however, "021" and "100" have the same truth-value when compared as strings or numbers. In one embodiment, a format such as ISO 8601 may be used to allow date-time values to be compared correctly as strings.

In one embodiment, each row of an eID→Attributes table may be considered a searchable data service object. A searchable data service object may be expressed as:

Subscriber→Bucket→eID→{Attributes list}

Searchable data service objects may be created when a subscriber wishes to build indexes that may be used to search for entities in a data store used by a client application and identified by an entity identifier (eID). When creating a searchable data service object, the subscriber may provide at least the following inputs:

Subscriber ID
Bucket identifier—identifies the domain
eID
Attributes list—a list of {name, value} pairs associated with the entity In one embodiment, the searchable data service may automatically provide one or more other attributes, also expressed as {name, value} pairs, for a searchable data service object. These other attributes may be indexed and searched in addition to the list of attributes provided by the subscriber. These attributes may be referred to as basic attributes. In one embodiment, all searchable data service objects in all domains and for all subscribers may include these basic attributes. In another embodiment, one or more of these basic attributes may be optional. Basic attributes may include one or more of, but are not limited to:

Creation time/date—a timestamp that indicates when the searchable data service object was created.

Last modified time/date—a timestamp that indicates when the searchable data service object was last modified. Initially, may be the same as the creation time/date.

Last accessed time/date—a timestamp that indicates when the searchable data service object was last accessed.

Created by—indicates a particular user/client that created this searchable data service object.

Last modified by—indicates a particular user/client that last modified this searchable data service object.

Size—indicates a size (e.g., in bytes) of this searchable data service object.

Access rights—indicates access rights for this searchable data service object.

A searchable data service object may be considered successfully created when all attributes specified by the subscriber, and the basic attributes, are indexed, and the eID is persistently stored. When a searchable data service object is not created successfully, an error code and message may be returned to the subscriber that may indicate a reason or reasons why an object could not be created.

In one embodiment, a subscriber may read a searchable data service object and the basic attributes associated with the object by the searchable data service. In one embodiment, a searchable data service object may be read from the searchable data service by specifying the subscriber identifier, bucket identifier, and eID of the searchable data service object.

In one embodiment, a subscriber may update searchable data service objects by providing the subscriber identifier, bucket identifier, and eID of the searchable data service object to be updated, along with update information. In one embodiment, a subscriber may add or delete eIDs, add or delete attributes for an eID, and modify the values associated with existing attributes. In one embodiment, the subscriber may not be allowed to add, delete, or modify at least some of the basic attributes. However, when the subscriber modifies a searchable data service object, one or more of the basic attributes associated with object modification may be updated.

In one embodiment, a searchable data service object may be considered successfully updated only when all the eIDs and attributes that the subscriber wishes to modify as specified in a request message have been updated, including the indexes associated with the attributes. In one embodiment, partial updates may not be allowed. For example, if a request specifies multiple attributes that need to be modified, and one of the modifications cannot be performed, the entire update request may be failed, with none of the modifications performed. When a searchable data service object is not updated successfully, an error code and message may be returned to the subscriber that may indicate a reason or reasons why the object could not be updated.

In one embodiment, a subscriber may delete existing searchable data service objects from a domain by providing the subscriber identifier, bucket identifier, and eID of the object(s) to be deleted. In one embodiment, a searchable data service object is successfully deleted only when there is no longer a guarantee that the object can be accessed with the eID associated with the object and when the object is no longer searchable. In one embodiment, after the deletion of a searchable data service object, there might be a period when the eID may still be used to access the object. Additionally it is possible that the object may be searchable for a period. If a searchable data service object and its associated indexes cannot be deleted, the delete request fails, and the subscriber may be notified of the failure via an error code and message. In one embodiment, once a searchable data service object is deleted from a domain, the eID may be reused by the subscriber within the domain.

In one embodiment, a subscriber may request listings of the subscriber's domains (buckets), indexed attributes, searchable data service objects, and eIDs. Along with the searchable data service objects and the subscriber-provided attributes, subscribers may also have access to the basic attributes provided by the searchable data service when listing searchable data service objects. In one embodiment, a subscriber may perform one or more of, but not limited to, the following list operations:

- List all the searchable data service objects and/or eIDs that match a specified prefix.
- List all the domains (buckets) associated with the subscriber and identified by a unique subscriber identifier.
- List all attributes indexed under a domain (in a bucket).
- List all searchable data service objects and/or eIDs under a domain.
- List all attributes indexed by a specified client.
- List all searchable data service objects and/or eIDs for a customer across all domains.
- List all searchable data service objects and/or eIDs that have a specified attribute.

Given that a large number of domains, attributes, searchable data service objects or locators may be returned in response to a list request, the searchable data service may paginate list results. The client may retrieve the list in pieces (pages) via multiple requests.

In one embodiment, a subscriber may search the searchable data service objects and eIDs via a query request exposed via the Web service interface. Subscribers may perform queries on one or more of the attributes of searchable data service objects within a single domain (bucket) to obtain a list of eIDs that satisfy the query expression. In one embodiment, the searchable data service may support one or more of, but not limited to, the following operators on attributes in the query expressions. These operators may be used in combination:

- Boolean (e.g., AND, OR, NOT)
- Arithmetic (e.g., <, >, =, !=, <=, >=, < >)
- Contains (an attribute contains a specified string)
- Starts with (an attribute starts with a specified string)

A query operation may return the eIDs of the searchable data service objects that satisfy the query expression. In one embodiment, the complete searchable data service objects may be optionally returned. In one embodiment, the results of a query may be sorted in either ascending or descending order based on a sort specification provided by the subscriber in the query message. Given that a large number of eIDs may be returned in response to a query, the searchable data service may paginate query results. The client may then retrieve the list of eIDs in pieces (pages) over multiple requests. In one embodiment, the client may provide a page length specification in the query message that specifies the number of entries (eIDs) on a page.

In one embodiment, a subscriber may delete a domain (bucket), if desired. A domain may be considered successfully deleted only if all of the indexes associated with attributes in the domain and searchable data service objects in the domain are deleted. If the searchable data service objects and their associated indexes in the domain cannot be deleted, the delete request fails, and the subscriber may be notified of the failure via an error code and message.

In one embodiment, a subscriber may delete an index within a domain. An index may be considered successfully deleted if all the attributes within the index are successfully deleted. If the index in the domain cannot be deleted, the delete request fails, and the subscriber may be notified of the failure via an error code and message.

One embodiment of the searchable data service may provide a mechanism whereby a subscriber may submit at least some operations to be performed on a bucket in batch mode. A batch mode mechanism may be used, for example, by subscribers that may have large datasets that they would like to upload to the searchable data service. An exemplary batch mode mechanism may, for example, allow a subscriber to submit a file in which each line represents one operation, for example an operation to add a searchable data service object. An exemplary line from such a file may include, but is not limited to:

- Bucket identifier—identifies the domain
- Operation—indicates the operation to be performed. For example, ADD, DELETE, or MODIFY.
- eID
- Attributes list Exemplary Searchable Data Service API This section describes an exemplary API for a searchable data service 340 that may be exposed to developers and clients as a Web service via a Web service interface 350 according to one embodiment. In one embodiment, the API may be provided to developers and clients through a Web services platform via Fully REpresentational State Transfer (REST) and/or Simple Object Access Protocol (SOAP) over HTTP/HTTPS. Other embodiments may use other protocols. The provided Web service interface 350 may be application-agnostic.

The following describes exemplary requests that may be made by a client to the searchable data service via the Web service interface 350 according to one embodiment. Note that these descriptions are exemplary, and are not intended to be limiting. Other embodiments may include other requests, and/or may include variations of the described requests.

In one embodiment, the following types of client operations may be allowed by the searchable data service. These operations may be exposed to the client via the Web service interface:

- Update: An operation to update the eID-attributes bucket. E.g., add, replace, and delete operations.
- List-Attributes: Given an eID and a bucket identifier, this operation lists the eID's attributes. This may be visualized as going from left to right in the table above—for example, if given "k1" as an argument, all of the {name, value} pairs on the right of "k1" are returned.
- Query-eID Given a query expression, return all eIDs from a bucket that satisfy that expression. This may be visualized as going from right to left in the table above. In one embodiment, a query expression is a collection of predicates combined using Boolean operators (e.g., NOT, AND, OR). A predicate expresses a condition that must hold true for the name and/or value fields of the attribute list.

Update Operations

These searchable data service operations may be invoked by the client via the Web service interface to update the eID-attributes bucket of a subscriber.

In one embodiment, a replace operation may create an attribute if the attribute does not exist. Subsequent invocations of the replace operation may revise (update) the value, and may ensure that there is only one value for that attribute at any given time. Updates of unique valued attributes should use this operation. In one embodiment, a client request to invoke the replace operation may include one or more of, but is not limited to, the following information:

Bucket identifier: A string that identifies a bucket of the subscriber. If a bucket does not exist, one may be created.

eID: A string that may be used by the client to locate entities in a data store.

Name: A string that represents the name of an attribute.

Value: A string that represents the value of an attribute.

Subscriber identifier: Identifies a searchable data service subscriber, and may be used to bill and authenticate the subscriber. In one embodiment, credentials for the subscriber may also be included.

In one embodiment, an add operation creates an attribute if the attribute does not exist. A subsequent invocation of the add operation with the same name and a different value may add another value to the attribute, and thus allows creation of multi-valued attributes. In one embodiment, a client request to invoke the add operation may include one or more of, but is not limited to, the following information:

Bucket identifier: A string that identifies a bucket of the subscriber. If the bucket does not exist, one may be created.

eID: A string that may be used by the client to locate entities in a data store.

Name: A string that represents the name of an attribute.

Value: A string that represents the value of an attribute.

Subscriber identifier: Identifies a searchable data service subscriber, and may be used to bill and authenticate the subscriber. In one embodiment, credentials for the subscriber may also be included.

In one embodiment, a delete operation may invoke one of the following, depending on whether an optional name and/or a {name, value} pair is specified:

Without either the name or value specified, the delete operation may delete all attributes associated with the given eID. In one embodiment, the eID becomes a candidate for garbage collection after a time interval if no new attributes are introduced with add or replace operations.

In one embodiment, buckets with no eIDs may become candidates for garbage collection. In one embodiment, attributes may be marked as deleted and no active garbage collection is performed.

With just the name but no value specified, the delete operation may delete the attribute with that name and associated with the given eID. The attribute may either have a unique value or be multi-valued.

With both the name and value specified, the delete operation may delete that {name, value} pair associated with the given eID. This allows the client to delete one particular value in a multi-valued attribute.

In one embodiment, a client request to invoke the delete operation may include one or more of, but is not limited to, the following information:

Bucket identifier: A string that identifies a bucket of the subscriber.

eID: A string that may be used by the client to locate entities in a data store.

Name: A string that represents the name of an attribute.

Value: A string that represents the value of an attribute.

Subscriber identifier: Identifies a searchable data service subscriber, and may be used to bill and authenticate the subscriber. In one embodiment, credentials for the subscriber may also be included.

Each of the eID-attributes bucket update operations described above may generate an update response to the client which includes update results. In one embodiment, the update response may be forwarded to the client via the Web service interface to the searchable data service. In one embodiment, an update response may be sent to the client to inform the client of the results of the update both for update operations that were successful to notify the client that the update operation was successful, and in cases where the update operation could not be performed for some reason to notify the client that the update operation failed. In one embodiment, each of the update operations described above may use a similar response structure. The following illustrates information that may be included in an exemplary response to an update operation request. Note that this is exemplary and not intended to be limiting:

Status: Either "OK" or "ERROR" If the update is correctly formed and can be applied, the status is OK; otherwise, the response may explain the problem(s) in the error message.

Error message: information that further explains any problem(s) encountered with the update operation request. E.g., "Request ill-formed."

Batched Update Requests

One embodiment may provide a mechanism via which update requests may be batched, or submitted as a batch operation. A batched update request may include a sequence of two or more update requests as described above, and a response to the batched update request may contain a sequence of update statuses corresponding to the batched update requests. In one embodiment, to sequentially process the update operations specified in a batched update request in real-time, there may be a limit on the number of update operations that may be submitted in a single batch update request. Alternatively, the updates in a batched update request may be performed asynchronously.

List-Attribute Operation

One embodiment may provide a list-attributes operation that may be invoked by a client via the Web service interface. A list-attributes operation may return a list of attributes associated with a specified eID. The following illustrates information that may be included in an exemplary list-attributes operation request. Note that this is exemplary and not intended to be limiting:

Bucket identifier: A string that identifies a bucket of the subscriber.

eID: A string that may be used by the client to locate entities in a data store.

Filter expression: A string expression that may be used to filter the attributes returned for the eID. If no filter expression is specified, all the attributes associated with the eID are returned. The syntax of the filter follows the one used for "Query-eID" as described below. This parameter may be optional.

Subscriber identifier: Identifies a searchable data service subscriber, and may be used to bill and authenticate the subscriber. In one embodiment, credentials for the subscriber may also be included.

The following illustrates information that may be included in an exemplary list-attributes operation response to the client.

Attribute list: List of {name, value} pairs that match the filter expression, if any. All attributes for the specified eID may be returned if there is no filter expression given in the request. If there is no error, this is the expected return.

Error message: Information that explains any problem(s) encountered with the list-attributes operation request. E.g., "Unknown Entity Identifier", "Unknown Bucket", or "Filter expression has incorrect syntax".

Query-eID Operation

One embodiment may provide a query-eID operation, or simply query operation, that may be invoked by a client via the Web service interface. The query-eID operation returns a list of eIDs that match the criteria specified through a query expression. A query expression is a string that may follow a set of rules given below in the section titled Query Syntax and Search Expressions. Some embodiments of the searchable data service, however, may accept unnormalized search expressions with implicit syntax and reduce the statements to the canonical form using one or more normalization rules (see the section titled Unnormalized Search Expressions). Note that a query-eID operation request may be referred to herein as a query, a query request, or a query node request.

The following illustrates information that may be included in an exemplary query-eID operation request. Note that this is not intended to be limiting:

Bucket identifier: A string that identifies a bucket of the subscriber.

Query expression: A string expression, according to which a list of eIDs may be located and returned.

MoreToken: An opaque object (e.g., a cookie) that may have been returned to the client in a previous query-eID operation request. If a token is returned from an earlier query-eID operation, the token may be provided in a subsequent query-eID operation request to request that the next page in a list of eIDs located in response to the previous query-eID operation request be returned. This is an optional parameter.

Subscriber identifier: Identifies a searchable data service subscriber, and may be used to bill and authenticate the subscriber. In one embodiment, credentials for the subscriber may also be included.

The following illustrates information that may be included in an exemplary query-eID operation response to the client.

Entity identifier list: A list of eIDs that match the search criteria specified in the query request. This is the expected return unless there is an error, in which one or more error messages may be returned.

MoreToken: A string; in one embodiment, MoreToken is opaque to the client. If the list of eIDs to satisfy a query request is too large to be returned in one response, the list may be returned in "pages". The MoreToken "cookie" may indicate the "last page seen". The More Token cookie may be included in a subsequent query request to retrieve the next page of eIDs.

Error message: Information that explains any problem(s) encountered with the query-eID operation request. E.g., "Unknown bucket", "Query expression does not have right syntax", or "Invalid MoreToken".

Searchable Data Service Architecture

The previous sections described an exemplary Web services API exposed to developers/clients for embodiments of the searchable data service. In the following sections, an exemplary architecture for implementations of a searchable data service, and various subsystems and components that may be included in an implementation of a searchable data service, are described.

Figure 3:
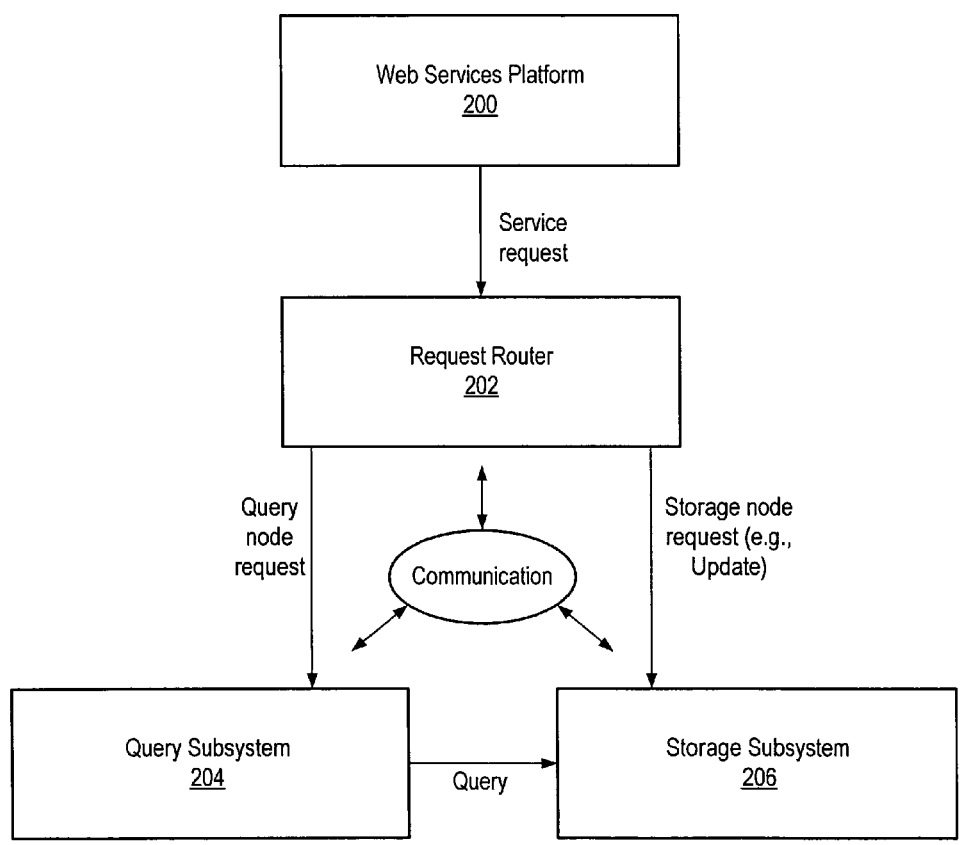
FIG. 3 illustrates an exemplary high-level functional architecture for a searchable data service, according to one embodiment.

FIG. 3 illustrates an exemplary high-level functional architecture for a searchable data service, according to one embodiment. In this embodiment, the searchable data service may include one or more of, but is not limited to, the following major components and subsystems: a Web services platform 200, a request router 202, a query subsystem 204, and a storage subsystem 206. Note that other embodiments may have other components and/or subsystems, or combinations or numbers of components and/or subsystems, at this architectural level.

The Web services platform 200 may include one or more Web servers that serve as a front-end to the searchable data service. The Web services platform 200 may perform one or more of, but is not limited to, the following functions:

Through request-interceptors, the Web servers may interact with one or more other services for the metering, billing, authentication, and access rights to the searchable data service.

The Web servers may provide one or more Fully REpresentational State Transfer (REST) and/or Simple Object Access Protocol (SOAP) APIs that are exposed to developers and clients for submitting data to or retrieving data from the searchable data service. Note that other embodiments may use one or more other protocols or combinations of protocols. These APIs allow the receipt and storage of entity locators (eIDs) and attributes associated with the entities in an entity ID (eID) store. Indexes for the attributes may be built from the eID Store. In one embodiment, the APIs may provide one or more of, but are not limited to, the following API calls dealing with eIDs and attributes (which may be referred to as storage node requests or storage requests):

add—add an attribute (a {name, value} pair) for an entity. Used primarily for attributes with multiple values, such as an attribute like "keywords", that may have two or more values.

delete—remove an attribute.

replace—replace an existing attribute. May primarily be used with attributes that have a single value.

list attributes—list all {name, value} pairs for an entity.

The Web servers may provide one or more REST- and/or SOAP APIs for submitting query requests to the searchable data service. Note that other embodiments may use one or more other protocols or combinations of protocols. In one embodiment, there is one query API call (query-eID). Query requests may also be referred to as query node requests.

The request router 202 may perform one or more of, but is not limited to, the following functions:

The request router 202 may receive a service request from the Web services platform 200 and determine whether the service request is a storage node request (e.g., a request to add, delete or replace one or more eIDs and associated attributes) or a query node request (a request to retrieve one or more stored eIDs and/or associated attributes).

If the service request is a storage node request, request router 202 queries a storage node locator to map the eID and bucket specified in the request to an appropriate storage node. In one embodiment, searchable data service indexing data may be segregated into buckets. Buckets define the limits of data that may be considered in a single query.

If the service request is a query node request, request router 202 queries a query node locator to map the bucket and query expression to an appropriate query node.

The request router 202 routes the service request to the appropriate node, collects results, and sends the results back to the Web services platform 200.

The query subsystem 204 (which may also be referred to as a query service) may perform one or more of, but is not limited to, the following functions:

Processes queries.

Services queries from query caches maintained by the query subsystem 204, if possible.

Sends queries not satisfied from a query cache to one or more storage nodes on storage subsystem 206 for execution. For a small domain (bucket), a query typically may run on a single storage node. Larger buckets may be partitioned across multiple storage nodes, requiring queries to be executed on one storage node for each partition. Similar to the request router 202, the query subsystem 204 may use a local instance of a storage node locator to find appropriate storage nodes.

Aggregates query results received from two or more storage nodes, and sorts query results, if necessary.

Returns the query results to the querying client via the Web service interface provided by the Web services platform 200. In one embodiment, paginates the results if necessary.

The storage subsystem 206 may include one or more storage nodes. The storage nodes may be located in one or more data centers. Storage nodes may perform one or more of, but are not limited to, the following functions:

On a storage node, a local eID store may serve as the authoritative store for eIDs and their attributes.

Indexes may be built from the eID store that may index all attributes for eIDs on the local storage node.

A local query processor may run queries against the local eID Store.

An eID update service may apply storage node requests (add, replace, delete, etc.) to the local eID Store.

A local partition manager may observe the use of local resources (disk space, CPU load, network bandwidth, etc.) for each storage node and manage the partitioning of buckets accordingly, and may cooperatively communicate with other storage nodes to move partitions. Partitions may be moved, for example, to maintain available storage space within a comfort zone on a storage node, and/or to provide load balancing.

May cooperatively communicate with other storage nodes to replicate partitions across storage nodes, for example to provide redundancy of data.

In one embodiment, Web services platform 200 is the first point of contact when a client makes an API call to the searchable data service. Web services platform 200 may, for example, provide authentication, access control, logging, metering, and billing services for the searchable data service. Service requests from clients to the searchable data service API provided by Web services platform 200 may be broken into two categories: write requests to the storage subsystem 206, which may be referred to herein as storage node requests or storage requests, and read requests to the query subsystem 204, which may be referred to herein as query node requests, query requests or simply queries. Storage node requests may include, but are not limited to, requests to add, replace or delete locators (eIDs) and their associated attributes in a bucket in storage subsystem 206. In addition, one embodiment may provide a construct API call that allows a client to request that a new domain (bucket) be created, to which eIDs and associated attributes may be added. Query node requests are queries to obtain lists of locators (eIDs) from a bucket in storage subsystem 206 according to a query expression in the query node request.

Web services platform 200 forwards incoming requests from clients to a request router 202, which in one embodiment may be instantiated on a coordinator node of the searchable data service. In one embodiment, there may be two or more coordinator nodes and/or request routers 202 to distribute load and to provide redundancy by guarding against a single point of failure. Request router(s) 202 and one or more other associated components, which may reside on one or more coordinator nodes, may constitute a coordination subsystem or coordination service. Request router 202 examines an incoming service request to determine if the request is a storage node request or a query node request, determines an appropriate node (e.g., storage node or query node) to receive the request, and forwards the request to the determined node in the searchable data service implementation.

If the request is a storage node request, the client is requesting a write operation (e.g., add, delete, or replace) to indexing information stored in a bucket. Note that a storage node request may also be a list attributes request. Buckets define the limits of data that may be considered in a single query. In one embodiment, a bucket may be partitioned into one or more partitions, which may be stored on different storage nodes. Note, however, that a storage node may store more than one partition. Partitioning may allow clients of the searchable data service to store and maintain larger searchable indexes than can otherwise fit on a single storage node. Thus, distinct partitions of a bucket may reside on different storage nodes. Partitions may be replicated across storage nodes. Replication of partitions across storage nodes (and potentially across data centers) may provide redundancy of data, and thus durability, reliability, and availability of a client's searchable index, in the searchable data service. Partitioning and Replication mechanisms for the searchable data service are further described later in this document.

In one embodiment, if the request is a storage node request, request router 202 may query a local storage node locator to map a bucket and eID specified in the storage node request to a particular storage node in storage subsystem 206. Request router 202 may also query the storage node locator to determine if the specified bucket has one partition or more than one partition. From the information received from the storage node locator, request router 202 determines a particular storage node in storage subsystem 206, and then forwards the storage node request to the determined storage node. In the storage subsystem 206, the storage node performs the operation specified in the storage node request on its local eID store. The storage node may then propagate the storage node request to other storage nodes in the storage subsystem 206 that store replicas of partitions of the bucket, if necessary.

If the request is a query node request, the client is requesting a read operation, or query on indexing information stored in a bucket. In one embodiment, if the request is a query node request, request router 202 may query a local query node locator to map the bucket and query expression specified by the request to an appropriate query node in query subsystem 204. The request router 202 then forwards the query node request to the determined query node in query subsystem 204.

On a query node in query subsystem 204, some preprocessing (e.g., normalization) of a query request may be performed, for example to normalize a query expression specified in the query request. In one embodiment, a local query cache may be examined to determine if the query can be satisfied from the query cache. If the query can be satisfied from the local query cache, the query subsystem 204 returns query results from the query cache to the client via the Web services platform 200. If the query cannot be satisfied from the query cache, a local instance of a storage node locator may be queried to locate one or more storage nodes in storage subsystem 206 to which the query is to be forwarded.

For a small domain (bucket), a query may run on a single storage node. Large domains (buckets) may be partitioned across multiple storage nodes, which may require queries to be executed on one storage node for each partition. The storage node(s) return results (lists of eIDs) to the query node in query subsystem 204. In one embodiment, a query aggregator on the query node in the query subsystem 204 may aggregate results received from two or more storage nodes according to specifications in the query node request. Query subsystem 204 then returns the query results received from the storage node(s) to the client via the Web services platform 200. In one embodiment, query subsystem 204 may paginate the query results as necessary or desired. On a query node, query results received from the storage subsystem 206 may be written to the local query cache.

As mentioned above, the request router 202 may query a local storage node locator and a local query node locator to locate storage nodes that are to receive storage node requests and query nodes that are to receive query node requests, respectively. In addition, a local storage node locator on a query node may be queried to locate storage nodes to receive query requests. The storage node locator tracks what storage nodes are in the storage subsystem 206, and the query node locator tracks what query nodes are in the query subsystem 204. Both node locators may use a table or database to record information on the respective nodes being tracked. In one embodiment, this table may be built in accordance with a Berkeley database. In one embodiment, when there is a change in the storage subsystem 206, for example when a bucket is repartitioned, a partition is replicated, new storage nodes are added, new entries are added to a bucket, etc., the change may be communicated to the various node locators. Changes to the query subsystem 206, such as additions or removals of query nodes, may be communicated to the query anode, locators. In one embodiment, one local node locator may be initially updated in response to a change, and the change may then be propagated from that node locator to other node locators on other nodes in accordance with the gossip protocol.

The searchable data service may include a communication mechanism among the various nodes and components that, for example, allows the storage and query node locators to monitor changes in the searchable data service implementation (e.g., added or removed nodes, replications, partitioning, writes to the storage subsystem 206, etc.) and to thus update the information stored in their respective tables according to the communicated update information. In one embodiment, the communication mechanism may be implemented in accordance with a gossip, or epidemic, protocol. This communication mechanism may allow the propagation of changes on one node to all nodes and components of the searchable data service implementation that may require the information. In one embodiment, the communication mechanism provides weakly consistent updating; the communication mechanism propagates information, and so does not provide immediate updates to all nodes. However, the communication system may propagate updates sufficiently fast to maintain weak consistency among various nodes and components that may be tracking the information. In one embodiment, the communication mechanism propagates update information so that the communicated information does not overwhelm the communications bandwidth of the system. In one embodiment, this may be accomplished by piggybacking at least some update information on other inter-component or inter-node communications.

In one embodiment, an entity ID (eID) store in storage subsystem 206 may be implemented as a table of entity locators (eIDs) and, for each eID, a set of attributes, expressed as {name, value} pairs, that are associated with the entity. The eID store is the authoritative store of information in the searchable data service. When a client application of the searchable data service writes information into the searchable data service via a storage node request to the Web service interface provided by Web services platform 200, the storage node request is routed to a particular storage node in the storage subsystem 206 by request router 202, and on the storage node the information is written to the local eID store. Note that the information may be written to a particular bucket associated with the particular application, and that the bucket information may be provided in the storage node request. Thus, information for different client applications may be written into different buckets. In one embodiment, when a subscriber to the searchable data service initiates the creation of a searchable index for a particular application, the subscriber may provide a bucket identifier for that searchable index (bucket). When a request (e.g., a query) is made for that searchable index, the request references the bucket identifier of the searchable index. Note that the subscriber may be provided with a unique subscriber identifier that may be used to distinguish among multiple subscribers to the searchable data service. In one embodiment, the Web services platform may assign the subscriber identifier to the subscriber. A particular subscriber may have more than one searchable index, each assigned a bucket and given a bucket identifier. Thus, a particular subscriber identifier and a particular bucket identifier specify a domain in the searchable data service. Note that a bucket may be distributed across two or more local eID, stores on two or more different storage nodes. A particular storage node eID store to which a storage node request or query node request is routed may be determined by the subscriber identifier, bucket identifier and eID specified in the request.

Once information is added to an eID store, indexes for the eID store may be built. As described above, each eID in the eID store has an associated set of attributes stored as {name, value} pairs. Each name corresponds to an index, and each index corresponds to a particular name for a {name, value} pair. In one embodiment, the indexes (each row in the index) may be sorted by the values associated with the names. In one embodiment, the indexes may be stored in a local query index store associated with the local eID store. Note that the indexes are specific to the particular bucket. In one embodiment, however, indexes may be concatenated across buckets to avoid having many small data structures if there are many small buckets.

As an example, an eID store, and associated index, may be constructed for a database of information (the data store) on articles of merchandise for sale, for example books at an online commercial website that offers the books for sale. One attribute of the articles may be the sale price of the article. Thus, eIDs for the information on the articles in the database may be provided and added to the eID store. Each eID may have an associated set of {name, value} pairs that represent names and values for various attributes of the associated article. For example, one of these {name, value} pairs for the articles may be "Sale Price—<dollar amount>". Thus, an index may be created for the attribute name "Sale Price". This index may be sorted by the value of "Sale Price". A client may submit a query request that includes a query expression that indicates that the client is requesting eIDs for all articles with a certain "Sale Price" value, with a "Sale Price" value less than a specified amount, and so on. The indexes may then be used to find which article(s) in the data store have a "Sale Price" value that satisfies the query expression. All eIDs for articles in the data store that have a "Sale Price" value that satisfies the query may be returned in the query results to the querying client.

In one embodiment, the storage subsystem 206 may initialize a bucket as one partition. As information is added to the bucket, the bucket may eventually grow until the bucket is at or near the point of being too large to fit on one storage node. At some point before the available storage space on the storage node becomes critically low (in other words, while available storage space on the storage node is still in a comfort zone), the bucket may be repartitioned into two (or more) partitions, and one (or more) of the partitions may then be moved onto another storage node so that the bucket can continue to grow. This repartitioning of the bucket may be performed transparently to the client application. Note that partitioning may also be performed for other reasons, for example to provide load-balancing for service requests. A partitioning mechanism for the searchable data service is further described later in this document.

Embodiments of the searchable data service may provide an interface that allows clients to delete entries that were previously added to a bucket. In one embodiment, these entries may be marked as deleted in an eID store, but are not removed from disk. In another embodiment, these entries may be marked for deletion, and the searchable data service may provide a mechanism that periodically or aperiodically performs garbage collection to remove any entries that have been marked for deletion from disk. In one embodiment, if a bucket has been previously repartitioned to create two or more partitions, and subsequently entries have been deleted from the bucket, the searchable data service may provide a mechanism that may merge two or more partitions into one partition, if there is sufficient disk space on a storage node to store the single, merged partition.

Repartitioning of a bucket may be performed when the bucket (or a partition of the bucket) is at or near the point of being too large to fit on a single storage node. Thus, repartitioning of buckets as described herein may allow a bucket to grow as the storage requirements of the client grow. Replication of partitions across two or more storage nodes, on the other hand, may be performed, for example, to provide redundancy, data durability, data availability and load sharing among the storage nodes and/or across data centers. Replication of a partition to two or more storage nodes within a data center or across data centers may be performed even for a bucket that has only one partition.

Note that, in one embodiment, a searchable data service may be implemented on nodes, or hosts, that physically reside in two or more data centers. Each data center may include two or more nodes that participate in the searchable data service implementation. Searchable data service nodes in a data center may include, but are not limited to, one or more coordinator nodes (nodes that host an instance of the request router 202), one or more query nodes, and one or more storage nodes. A partition on a storage node within a data center may be replicated to one or more other storage nodes within that data center, and/or may be replicated to one or more other storage nodes in one or more other data centers. Replication within a data center may protect against node failures within the data center and may provide load-balancing among nodes within the data center. Replication across data centers may protect against data center-level failures, and may provide load-balancing across data centers.

In one embodiment where the searchable data service is implemented across two or more data centers, a bucket with a single partition may have at least four replicas of the partition. In any particular data center where this bucket resides, the partition may be replicated to at least two storage nodes, and may also be replicated to at least one other data center. In the other data center(s), the partition may be replicated to at least two storage nodes within the data center(s). If the bucket has more than one partition, each partition may be similarly replicated across storage nodes within a data center and/or may be replicated to storage nodes across data centers.

In one embodiment, a lazy replication mechanism may be used in the replication of partitions. In one embodiment, when replicating a partition, there may be two types of communication among nodes that are performed. In one embodiment, replication of partitions may be performed at least in part using a gossip protocol-based communication mechanism among searchable data service nodes and components within and across data centers, in combination with an anti-entropy-based communication mechanism. The anti-entropy protocol may provide faster communication than a gossip protocol. Using the anti-entropy protocol, the entire data structure of the partition may be replicated to another storage node to ensure initial consistency. In the meantime, however, updates may be received and applied to the original partition. Therefore, updates to the original partition that are received on the original storage node while the anti-entropy replication is occurring may be propagated to the new replica on the other storage node using the gossip protocol. The replica of the partition that is replicated via anti-entropy gets progressively older as time passes. However, any updates that are received are gossiped to the new replica. When the anti-entropy replication of the partition is completed and the new replica is ready to come on-line, the new replica may be up-to-date because of the gossiped updates.

In one embodiment, the searchable data service may attempt to provide as close to 24/7 availability and reliability of searchable indexes to clients as possible, and may provide a mechanism through which searchable indexes are ensured to be available and up-to-date with any additions or modifications if a storage node or even an entire data center becomes unavailable for some reason. Replication of partitions across storage nodes both within data centers and across data centers is part of this mechanism. To help ensure that available replicas are up-to-date, in, one embodiment, when an entry for an entity in a data store is added to or modified in a local eID store on a storage node, the change made to the local eID store on the storage node may be made to one or more other eID stores on other storage nodes by an update service of the storage subsystem 206. In one embodiment, an instance of an eID update manager component on each storage node may implement the functionality of the update service on the storage node. In one embodiment, the update service ensures that each update is applied to two or more replicas on other storage nodes, but not necessarily to all replicas. The gossip protocol among the storage nodes may then be used to propagate the update to all replicas.

In one embodiment, when an update to a local eID store on a storage node in a data center is made, and before a response is returned to the client indicating that the update was successful, the update service of the storage subsystem 206 may act to ensure that the update has been made to at least one other local eID store on a storage node in the data center and to at least one other local eID store on a storage node in another data center. In one embodiment, when there is an initial update made in a local eID store on a storage node within a data center, the update service of the storage subsystem 206 waits for confirmation that the update has been successfully made to at least two local storage nodes and to at least one storage node in another data center before a response is sent to the client that the update was successful. Thus, if the original storage node or even the entire data center goes offline for some reason, an up-to-date replica may be available on another storage node in the same data center and/or on another storage node located in a different data center. Note that the update may be propagated to other storage nodes not updated by the update service using the gossip protocol so that all replicas of the partition are weakly maintained as consistent, even though the client may be informed that the update has been successfully made before the update has been propagated to all storage nodes that host replicas of the partition.

The storage nodes that replicate a particular partition or partitions of a bucket may be considered a replication group. The storage nodes in a replication group may have identical, or nearly identical, copies or replicas of the partitions. In one embodiment, updates to the partition(s) may be propagated to the storage nodes within the replication group using the gossip protocol. Therefore, "identical" may be subject to the limitations of the gossip protocol, which provides weak consistency. At any given point in time, the partitions within a replication group are not necessarily identical, but converge to be identical as the updates are propagated via the gossip protocol.

In one embodiment, the number of replicas of a partition that are maintained in a replication group may be dependent on monitored availability and reliability statistics of the hardware within the data center. If the searchable data service detects that the hardware is not particularly reliable or available, more replicas may be created within a replication group. More reliable and available hardware may allow fewer replicas to be maintained. In one embodiment, there may be at least four and up to six replicas of a partition in a replication group. Note that this pertains to replicas created and maintained to provide durability, reliability, and availability of the data. In one embodiment, the number of replicas of a partition that are maintained in a replication group may be dependent on monitored availability and reliability statistics of the hardware across two or more data centers, for example if the replication group extends across two or more data centers. In one embodiment, the number of replicas of a partition that are maintained in a replication group may also be at least in part a function of the operational characteristics of a network. In this embodiment, for example, data redundancy may be increased based on factors that may include one or more of, but are not limited to, failure modes on a network, response times on the network, error rates for data retrieval on the network, or on one or more other factors or combinations thereof.

In one embodiment, replication of partitions may also be performed in situations where a particular partition or a particular replica of a partition is detected to be very read active, with large numbers of reads (query messages) being received for the partition or for a particular replica within the replication group, by a group membership and health component of the searchable data service. The searchable data service, upon detecting that the partition or replica is receiving queries to the extent that it is approaching being out of a comfort zone for reads, may create one or more additional replicas of the partition to distribute the queries across more replicas and thus to provide load-balancing of the read (query) load across additional storage nodes.

If a high write load to a bucket (e.g., messages from the client to add or update entries in the bucket) is detected, creating additional replicas of a partition or partitions within the bucket may not help. Instead, creating additional replicas may be counterproductive, since updates are propagated to replicas using the gossip protocol, and more replicas tends to generate more gossip within a replication group. Therefore, in one embodiment, if a bucket is detected to be write active by the searchable data service to the point that at least some storage nodes may be nearing the boundary of their comfort zone, the searchable data service may repartition the bucket, rather than creating more replicas of partitions, so that the data in the bucket is spread across more storage nodes, and thus the write load may be load-balanced across more storage nodes.

In one embodiment, a storage node that has a partition that needs to be replicated may communicate this information to one or more other storage nodes, for example using the gossip protocol. One or more of the other storage nodes, within the data center or in another data center, may then volunteer to receive a replica of the partition. Information on the actual replication to another storage node may be communicated to other components on nodes of the searchable data service (for example, to storage node locators on coordinator nodes and query nodes) so that the status of replicas within a domain (within a bucket) of the searchable data service may be tracked.

Information on the repartitioning of a partition on a storage node may be similarly communicated to other components on other nodes so that the status of partitions within a domain of the searchable data service may be tracked. If a partition needs to be moved from one storage node to another storage node, this information may be communicated to one or more other storage nodes, and storage nodes that receive this information may then volunteer to receive the partition. The storage node that needs to move a partition may then select a best candidate storage node to receive the partition. An exemplary stress management mechanism that implements a stress management algorithm for managing disk load on storage nodes in one embodiment of a searchable data service system, and that may be used to select a best candidate storage node from among two or more candidate storage nodes to receive a partition, is described later in this document in the section titled Stress Management.

Instead of repartitioning or replicating a partition as a reactionary response to problems or crises, the searchable data service may provide one or more mechanisms that enable nodes to monitor the use and health of various resources on the nodes, including storage resources on storage nodes within the storage subsystem 206, to share the health information among nodes within the searchable data service, and to proactively work to avoid potential high stress or load on various resources within the searchable data service. In one embodiment, comfort zones may be defined for various resources in the searchable data service, and the searchable data service may proactively work to keep the resources within their respective comfort zones.

The searchable data service may perform a particular action or actions when it is detected that a resource is getting near the edge of its comfort zone. For storage nodes in storage subsystem 206, these actions may include, but are not limited to, replicating and repartitioning. The searchable data service may monitor the use and health of the storage nodes, as well as other types of resources such as query nodes and coordinator nodes, and may attempt to perform an action (e.g., repartitioning or replication for storage nodes) in advance of a potential crisis (i.e., when the resource is still within the comfort zone), as opposed to waiting until the resource is already under stress. If the system were to wait until a resource is already under stress to perform some action in an attempt to relieve the stress, such as repartitioning or replication, the resource may already be being overloaded with internal and external requests, making it more difficult to perform the action. Thus, the searchable data service provides a proactive approach to health management to support the availability and reliability of resources within the system as opposed to a reactive approach.

In one embodiment, each node in the searchable data service may include an instance of a node manager component that may serve as a control and monitoring agent for the node. The node manager component may serve as a self-monitoring agent that may monitor health information for various resources on the node, which may include, but is not limited to, disk space usage, bandwidth usage, CPU usage, read and/or write load, etc.

In one embodiment, a stress manager component on each node in the searchable data service may detect if a health metric for a resource on the node, collected by the node manager, is at or near the limits of its comfort zone, and may, in response to said detection, initiate an appropriate action. The stress manager may implement one or more algorithms that may be used to determine an action or actions to be taken when a resource is at or near the limit of its comfort zone. For example, when the available storage space on a storage node is nearing the edge of its comfort zone, the stress manager may initiate repartitioning on the node so that a newly-created partition may be moved to another storage node, thus freeing disk space on the storage node. Note that repartitioning would actually be performed under the control of a local partition manager.

The node manager component may enable the nodes to participate in monitoring and maintaining the global health of the searchable data service implementation. The node manager component monitors the health of resources on a particular node. In one embodiment, another component may monitor the health of other nodes in a local neighborhood or node group to compare the health of the node to other nodes.

In one embodiment, each node in the searchable data service may have an instance of a group membership and health component. In one embodiment, the group membership and health components on the various nodes may allow health information collected locally on nodes to be communicated to other nodes within a local neighborhood or node group of the searchable data service. In one embodiment, the group membership and health component allows other components of the searchable data service to identify sets of nodes to be monitored, and to then query for automatically refreshed health information about those nodes. The group membership and health component may serve, for example, as a failure detection mechanism. The group membership and health component may also allow a node to compare its local health with other nodes in its neighborhood or group.

In one embodiment, each node in the searchable data service may make local decisions based on the health of its local resources and the health messages that it receives from other nodes within its neighborhood or node group through the group membership and health mechanism. This may distribute health monitoring and management of resources of the searchable data service among the local nodes and node groups, rather than relying on a central controller. Thus, in one embodiment, there may be no central controller that monitors the health of the entire searchable data service implementation and attempts to optimize resources, and thus no single point of failure. Since health monitoring and maintenance is performed locally on nodes and cooperatively within node groups instead of by a central controller, a global list of health information does not have to be maintained, and less health information has to be communicated globally across the entire searchable data service implementation.

Through a local node manager, each node tracks its own resource usage and health. Each node may also monitor the health of other nodes within a local neighborhood or group. A local stress manager accesses the resource usage and health information collected by the node manager. If the stress manager on a storage node determines that the node needs to repartition its data, the storage node does not force another storage node to accept the newly-created partition. Instead, this information may be shared with other local storage nodes, for example through the group membership and health mechanism. Other local storage nodes that have available disk space (again, locally monitored by the node manager) may look for other storage nodes that need to repartition in the health information shared through the group membership and health mechanism. If a storage node that has available disk space finds another storage node that needs to move a partition, the storage node may voluntarily decide to accept the partition.

Thus, storage nodes in a particular group may agree among themselves on the repartitioning of data. This may not be necessarily performed as a group decision in which all nodes participate. Instead, two storage nodes may agree to cooperate to repartition data, with one of the nodes voluntarily accepting the new partition. Note that this group communication and cooperation may occur among nodes within a particular data center, but may also occur among nodes across data centers.

Initially, when a bucket is created, the bucket includes one partition. The partition may be replicated across two or more storage nodes, which form a replication group. When the replicated partition is repartitioned to form two or more new partitions, each new partition becomes a replication group. Initially, the newly created partitions remain on the same storage nodes. Thus, each storage node may be a member in one or more replication groups. Repartitioning of the partition is performed on all of the storage nodes in the replication group; there is still one bucket; and initially all of the data remains in the same place. Half of the data, however, is in partition A, and the other half is in partition B. Potential storage space problems on any of the storage nodes have not been solved by repartitioning, however, because the replicas are still on the same storage nodes. Each storage node, if nearing the limits of its available storage space comfort zone, may decide to move a partition to another storage node, if possible. In one embodiment, another storage node, which in one embodiment may be located via a gossip protocol, may voluntarily decide to receive the partition. Copying the partition to the other storage node may be performed using an anti-entropy mechanism to replicate the partition, with a gossip protocol used to apply any updates to the replica of the partition. This moving of partitions may be performed proactively, while available storage space is still within the comfort zone, to help avoid crisis situations.

As mentioned above, one type of node group is a replication group. Each storage node in a replication group stores a replica of a particular partition. As the partition grows, any one of the storage nodes in the replication group may detect that available storage space on the node is nearing the limits of its comfort zone, and thus the local replica may need to be partitioned. In one embodiment, if a partition is getting too large for any one of the storage nodes within a replication group, the partition may be repartitioned on all of the storage nodes within the replication group, even if there is disk space available on the other storage nodes. The newly created partitions may each constitute a separate replication group, though initially all the partitions may remain on the same set of storage nodes. Thus, repartitioning a replicated partition also generates two replication groups where formerly there was one replication group. One of the storage nodes that is at or near the limits of its comfort zone for available storage space may then move its replica of one of the newly created partitions to another storage node that volunteers to receive the partition. For example, another node may join or be added to the replication group, and may voluntarily receive the partition. Other storage nodes in the replication group(s) may have enough disk space, and so may not move a partition.

Figure 4:
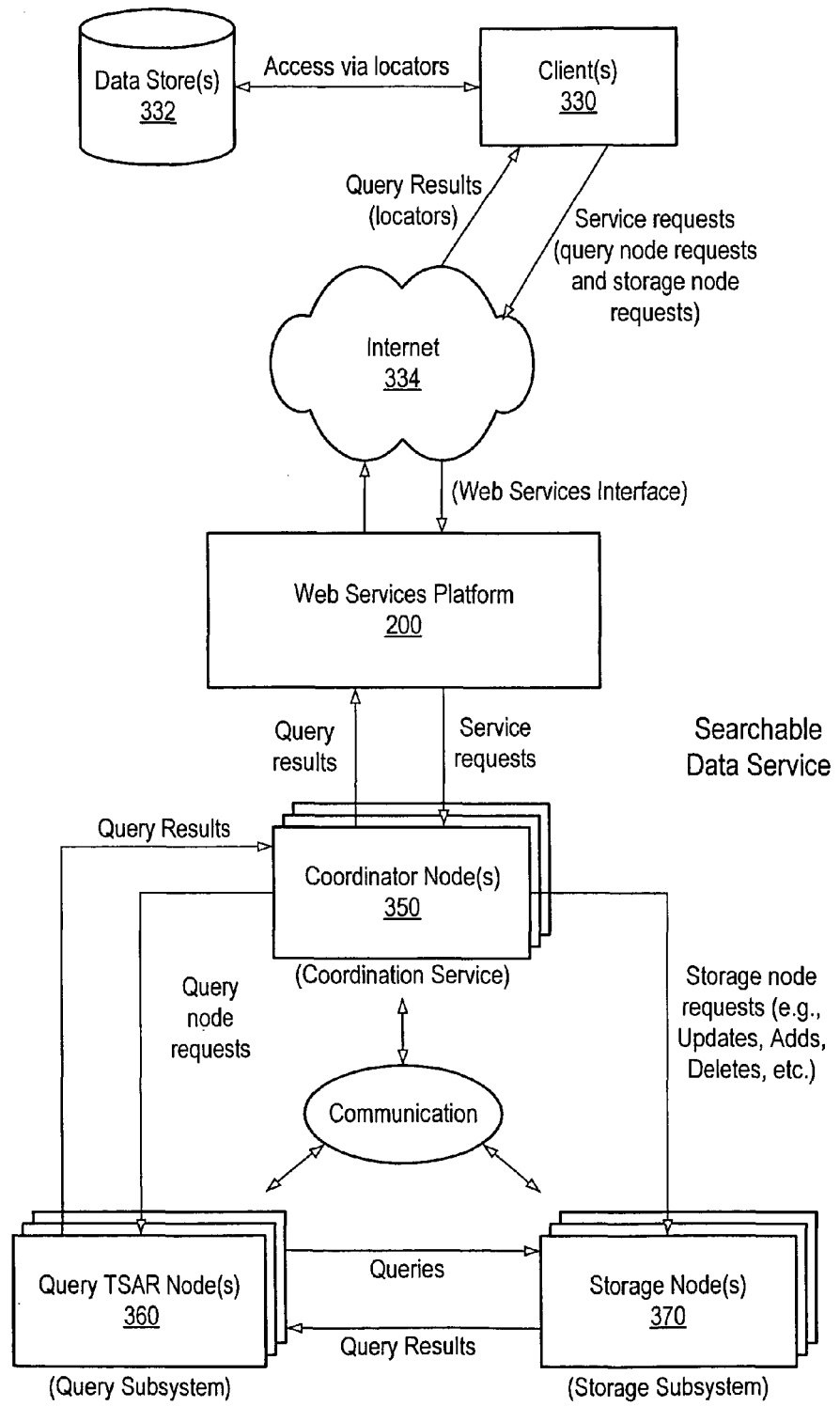
FIG. 4 illustrates an exemplary network architecture for a searchable data service according to one embodiment.

FIG. 4 illustrates an exemplary network architecture for a searchable data service according to one embodiment. A searchable data service implementation may include, but is not limited to, a Web services platform 200, one or more coordinator nodes 350, one or more query nodes, referred to as query TSAR (Top Search AggregatoR) nodes 360, and one or more storage nodes 370. Each coordinator node 350 may include, but is not limited to, at least one instance of request router 202.

Note that the high-level, functional query subsystem 204 and storage subsystem 206 described in FIG. 3 may, but do not necessarily map directly onto query TSAR nodes 360 and storage nodes 370, respectively. Each of the Subsystems may include several components, which are further described below in reference to FIG. 6. In one embodiment, components of the query subsystem 204 reside on the query TSAR nodes 360, and components of the storage subsystem 206 map onto the storage nodes 370. Alternatively, particular components that may be viewed as functionally part of one of the Subsystems may physically reside on a coordinator node 350, a query TSAR node 360, or a storage node 370. For example, each storage node 370 may include an instance of a local query processor 228 of FIG. 6, which may be, but is not necessarily, functionally viewed as a component of the query subsystem 204. In addition, some components of the searchable data service illustrated in FIG. 6 may have local instances on different ones of the nodes. For example, in one embodiment, there may be a local instance of storage node locator 216 on each coordinator node 350 and on each query TSAR node 360.

Data store 332 represents a data storage system in which units of data (entities) may be stored. Data store 332 may be implemented in accordance with any type of storage system in which locators may be used to locate and retrieve entities. An application may be implemented on client system 330 that leverages the searchable data service as a search frontend to the backend data store 332. In one embodiment, the application may be configured to access the functionalities of the searchable data service in accordance with a Web service interface of the Web services platform 200 to search for and retrieve data in the backend data store 332.

An application that leverages the searchable data service as a search frontend to a backend data store 332 may be referred to as a subscriber to the searchable data service. Note that a searchable data service implementation may have two or more subscribers. In other words, a searchable data service implementation may provide searchable indexes to two or more backend data stores. Also note that an application may leverage a searchable data service implementation as a search frontend to two or more backend data stores 332. An application that leverages the searchable data service as a search frontend to two or more backend data stores 332, and for which there are thus two or more searchable indexes implemented in the searchable data service implementation, may be identified separately and uniquely as a subscriber for each searchable index. A unique subscriber identifier may be assigned for each subscription to the searchable data service, and the subscriber identifiers may be used to uniquely identify particular searchable indexes to particular data stores 332. Note that two or more client systems 330 may access a particular searchable index in a searchable data service implementation using an associated unique subscriber identifier.

In one embodiment, a client system 330 may submit service requests (query node requests and/or storage node requests) to the searchable data service in accordance with the Web service interface of the Web services platform 200 via Internet 334. The Web services platform 200 may route the service request(s) to a coordinator node 350. A coordinator node 350 routes the service requests to the appropriate node(s), collects results, and sends the results back to the Web services platform 200. A request router on the coordinator node 350 may receive the service request(s) from the Web services platform 200 and determine whether each service request is a storage node request or a query node request. If a service request is a storage node request, the request router queries a storage node locator to map the eID and bucket specified in the request to the appropriate storage node(s) 370. If the service request is a query node request, the request router queries a query node locator to map the bucket and query expression to an appropriate query TSAR node 360. In one embodiment, the storage node locator and the query node locator may be components of the searchable data service with instances located on each coordinator node 350.

Upon receiving a query node request from a coordinator node 350, a query TSAR node 360 may perform processing of the query before forwarding the query to one or more storage nodes 370. The query TSAR node 360 may forward the query to appropriate storage node(s) 370 for execution of the query. For a small domain, a query typically may run on a single storage node 370. Larger domains may be partitioned across multiple storage nodes 370, requiring queries to be executed on one storage node 370 for each partition. Partitioning is further described later in this document. The query TSAR node 360 may use a local instance of a storage node locator to locate appropriate storage node(s) 370 for the query. The query TSAR node 360 may aggregate and sort query results received from storage node(s) 370. The query TSAR node 360 may then return the query results to the coordinator node 350. In one embodiment, the query TSAR node 360 may paginate the query results, if necessary or desired.

On a storage node 370, an eID store may serve as the authoritative store for eIDs and their attributes. Indexes may be built from the eID store that may index all attributes for eIDs on the local storage node 370. A local query processor may run queries received from query TSAR node(s) 360 against the indexes on the storage node 370. An eID update service may receive storage node requests from a coordinator node 350 and update the eID store accordingly. A local partition manager may observe the use of local resources (e.g., disk space, CPU load, network bandwidth, etc.) for the storage node 370, and may communicate with other partition managers on other storage nodes 370 to redistribute partitions when necessary.

Figure 5A:
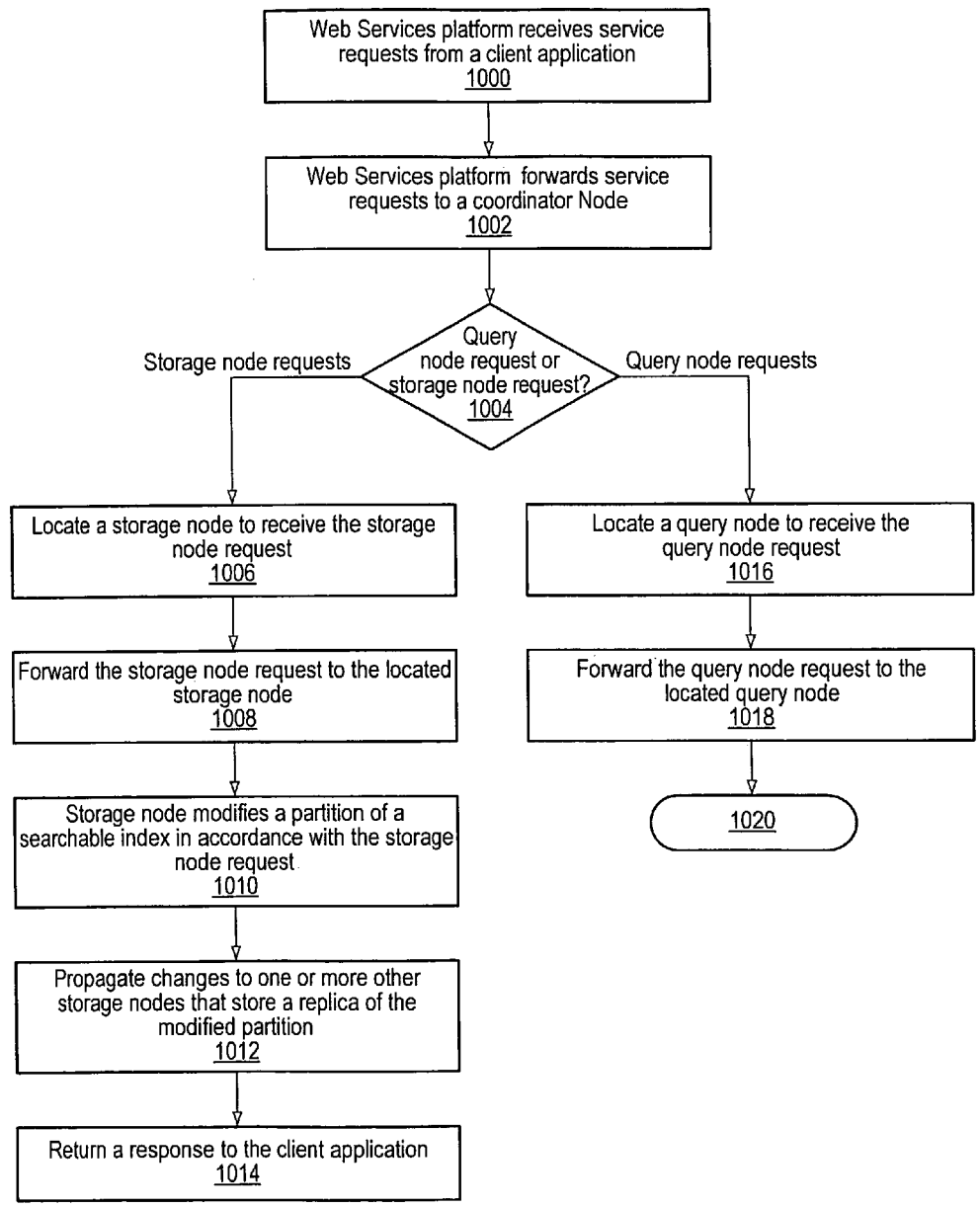
FIGS. 5A and 5B illustrate a method for implementing a searchable data service that processes service requests to store searchable data service objects in a searchable index and to locate entity identifiers (eIDs) for entities in a data store in the searchable index according to one embodiment.
Figure 5B:
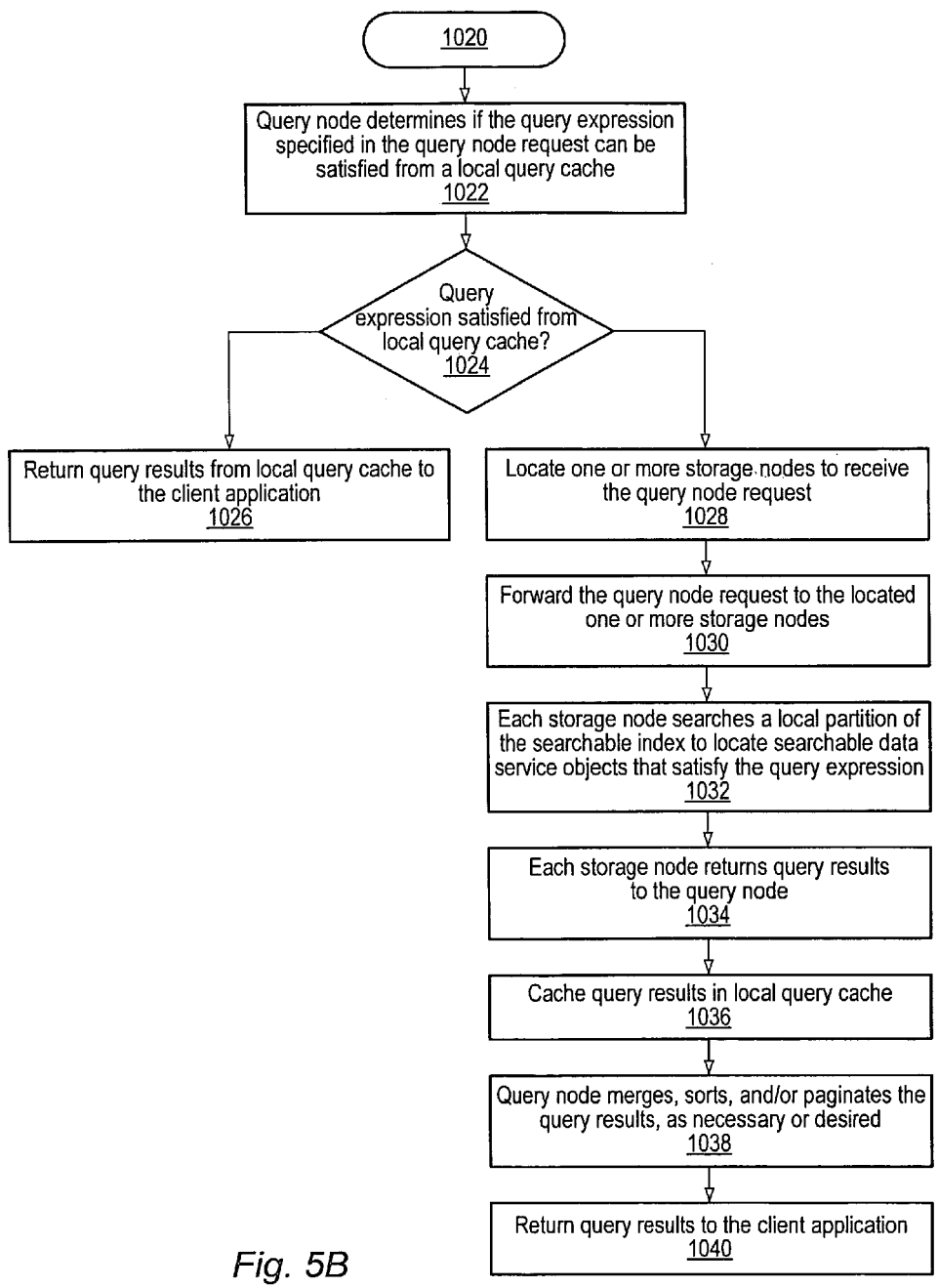

FIGS. 5A and 5B illustrate a method for implementing a searchable data service that processes service requests to store searchable data service objects in a searchable index and to locate entity identifiers (eIDs) for entities in a data store in the searchable index according to one embodiment. Each searchable data service object may specify two or more attributes of a particular entity in the data store. Each attribute may be expressed as a {name, value} pair, and the attributes may include a unique entity identifier (eID) for locating a particular entity in the data store.

A searchable data service system may be implemented on a plurality of nodes. The nodes may be located in one data center or may be dispersed across two or more data centers. The data centers may be geographically dispersed. In one embodiment, the searchable data service may include at least a coordination subsystem, a query subsystem and a storage subsystem. In one embodiment, the plurality of nodes may include one or more coordinator nodes that implement the coordination subsystem, one or more query nodes (also referred to as query TSAR nodes) that implement the query subsystem, and one or more storage nodes that implement the storage subsystem. In one embodiment, a Web services platform may provide a Web service interface to the searchable data service that provides one or more interface calls to client applications of the searchable data service.

In FIG. 5A, the Web services platform may receive service requests from a client application in accordance with the Web service interface to the searchable data service, as indicated at 1000. The Web services platform may then forward the service requests to a coordinator node of the searchable data service, as indicated at 1002. In one embodiment, the Web services platform may provide one or more other services that perform metering, billing, authentication, and access control of subscribers to the searchable data service.

As indicated at 1004, the coordinator node may determine if the service request is a query node request (a read operation to the searchable index) or a storage node request (a write operation to the searchable index, or a list attributes request). In one embodiment, a request router component of the searchable data service may perform said determining. At 1004, if the service request is a storage node request, the coordinator node may locate a storage node to receive the storage node request, as indicated at 1006. In one embodiment, a request router component of the searchable data service may consult a local storage node locator component of the searchable data service to locate a storage node to receive the storage node request. As indicated at 1008, the coordinator node may then forward the storage node request to the determined storage node.

Upon receiving the storage node request, the storage node may modify a partition of a searchable index in accordance with the storage node request, as indicated at 1010. In one embodiment, the storage node may:
 add a searchable data service object specified in the storage request to the searchable index;
 modify a searchable data service object stored in the searchable index as specified in the storage request; or
 delete a searchable data service object from the searchable index as specified in the storage request; or
 compile and return a list of all {name, value} pairs for an entity if the storage node request is a list attributes request. Note that a list attributes request may not result in modification of the partition.

As indicated at 1012, changes to the partition may be propagated to one or more other storage nodes that store a replica of the modified partition. In one embodiment, the changes may be propagated to other storage nodes in accordance with a gossip protocol. In one embodiment, an anti-entropy protocol may also be used to propagate changes to other replicas of the partition. As indicated at 1014, a response indicating success or failure of the storage node request may be returned to the client application in accordance with the Web service interface.

At 1004, if the service request is a query node request, the coordinator node may locate a query node to receive the query node request, as indicated at 1016. In one embodiment, a request router component of the searchable data service may consult a local query node locator component of the searchable data service to locate a query node to receive the query node request. As indicated at 1018, the coordinator node may then forward the query node request to the determined query node. Item 1020 indicates that the flowchart is continued in FIG. 5B.

In FIG. 5B, the query node receives the query node request from the coordinator node and processes the query node request. In one embodiment, the query node may perform some preprocessing of the query node request, for example normalization of an unnormalized query expression specified in the query node request. As indicated at 1022, the query node may determine if the query expression specified in the query node request can be satisfied from a local query cache that caches results from previous query node requests. At 1024, if the query node can be satisfied from the local query cache, then, as indicated at 1026, the query node may return query results retrieved from the local query cache to the client application in accordance with the Web service interface.

At 1024, if the query node request cannot be satisfied from the local query cache, then, as indicated at 1028, the query node may locate one or more appropriate storage nodes to receive and process the query node request. In one embodiment, the query node may consult a local storage node locator component of the searchable data service to locate the one or more storage nodes to receive the storage node request. As indicated at 1030, the query node may then forward the query node request to the determined storage node(s).

As indicated at 1032, each storage node that receives the query node request from the query node may search a local partition of the searchable index to locate searchable data service objects that satisfy the query expression specified by the query node request. As indicated at 1034, each of the storage nodes may then return query results that satisfy the query expression to the query node. In one embodiment, the query results may be cached in a local query cache, as indicated at 1036. The query node may merge, sort, and/or paginate the query results, as necessary or desired, as indicated at 1038. If query results are received from more than one storage node, then the query results may need to be merged. If the query results exceed a page limit, then the query results may be paginated, and then may be returned to the client application in two or more response messages. In one embodiment, the query results may be sorted according to a sort criteria specified in the query node request. In one embodiment, the query results may include at least the entity identifiers (eIDs) from each searchable data service object in the searchable index that satisfied the query expression specified in the query node request. As indicated at 1040, the query node may return the query results received from the storage node(s) to the client application in accordance with the Web service interface.

Figure 6:
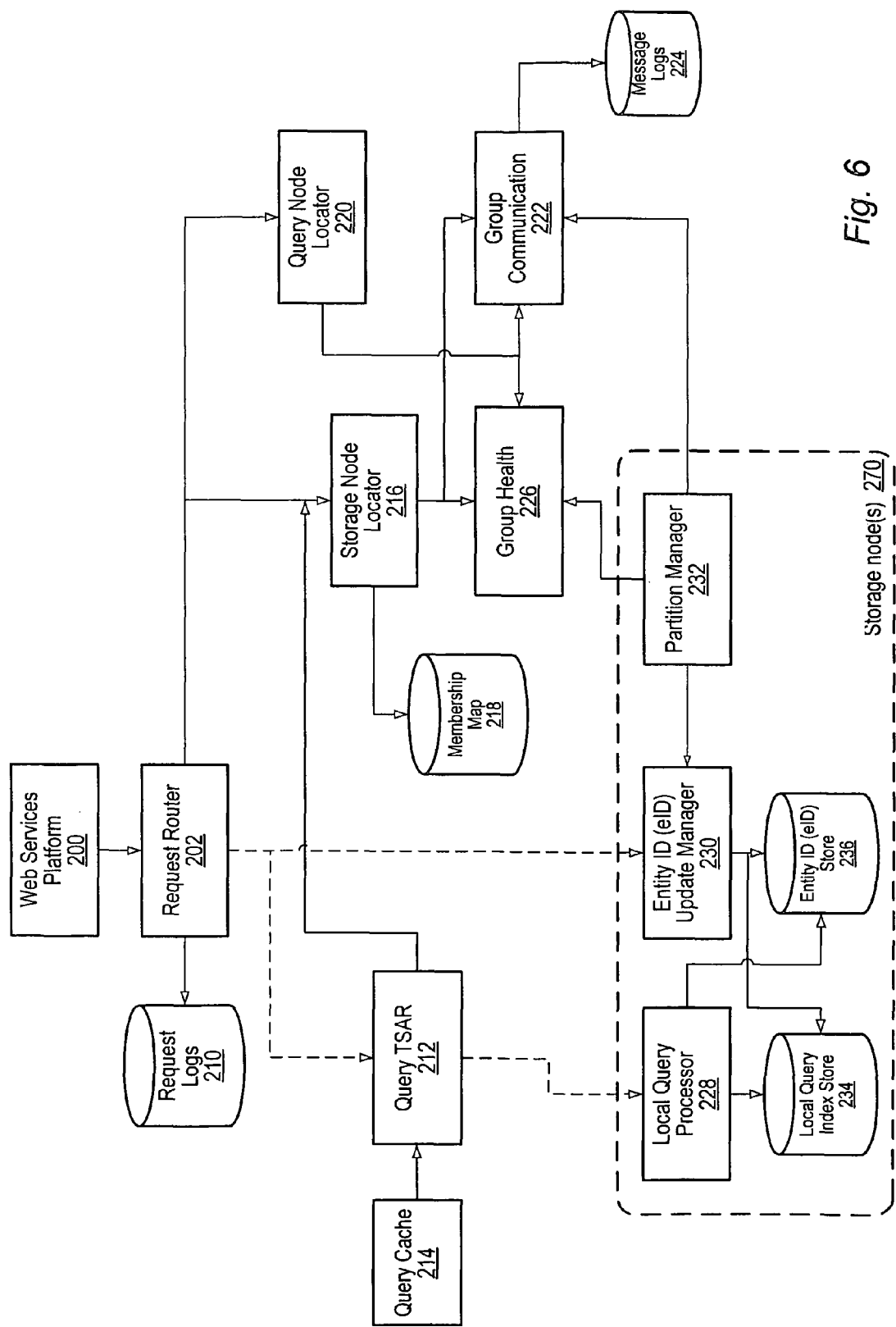
FIG. 6 illustrates an exemplary lower-level, modular architecture for a searchable data service, according to one embodiment.

FIG. 6 illustrates an exemplary lower-level, modular architecture for a searchable data service, according to one embodiment. This Figure shows the data flow through various modules, or components, of the searchable data service. In this embodiment, the searchable data service may include one or more of, but is not limited to, the components shown. Note that an implementation of the searchable data service may include two or more of at least some of the illustrated components.

The following describes exemplary data flow in an embodiment of the searchable data service when new information is submitted to the searchable data service using an add request (a type of storage node request) to a Web services API provided by the Web services platform 200. The REST or SOAP request comes to the Web services platform 200 where it is authenticated, time-stamped and passed on to the request router 202. The request router 202 asks the storage node locator 216 for a list of one or more storage nodes 270 that may store the data, and sends the data to one node on that list. The entity ID update manager 230 on the storage node 270 receives the data, stores the data on its local entity ID store 236, and sends the data to at least one more local storage node 270 and at least two storage nodes 270 in another data center. When all these storage nodes have stored the data, the REST or SOAP call returns a "success" result.

The following describes exemplary data flow in an embodiment of the searchable data service when processing a query node request, or query. The REST or SOAP request comes to the Web services platform 200, where it is authenticated and passed on to the request router 202. The request router 202 asks the query node locator 220 for a list of query TSARs (Top Search AggregatoRs) 212 that can process the query, and routes the query to one node (query TSAR 212) on that list. The query TSAR 212 first determines if the query can be satisfied from query cache 214. If so, it returns the query response to the request router 202, which forwards the query response back to the Web services platform 200, from where the query response may be returned to a client application that initiated the query in accordance with the Web service interface.

If the query cannot be answered out of query cache 214, the query TSAR 212 asks a local storage node locator 216 for a set of partitions of a bucket, and the storage node hosts that store replicas of those partitions. The query TSAR 212 may then send the query to the local query processor 228 of one storage node host from each partition. The local query processors 228 may find all the eIDs that satisfy the query. These lists are then returned to the query TSAR 212, where the lists are aggregated. The aggregated list may be sorted and returned to the querying client.

Embodiments of a searchable data service may run on large distributed systems with high availability and reliability requirements. In these environments, embodiments of the searchable data service may monitor and manage the system resources to meet the high availability and reliability requirements. In one embodiment, a group membership and health component 226 may run on each node, and may communicate local health information about CPU, disk, memory, network utilization; and other local system metrics to one or more other nodes. Group health 226 component may track membership in replication groups, and may also track when nodes enter and leave the searchable data service system environment.

The partition manager 232 handles the assignment of storage node hosts to replication groups, and the splitting of buckets into multiple partitions. This enables nodes that are running low on disk space to partition datasets so that some of the data may be moved to another node. An exemplary algorithm for deciding when and how to split and move data is described later in this document.

In one embodiment, all searchable data service nodes may use the group communication component 222 to communicate with other searchable data service nodes. In one embodiment, the group communication component 222 may provide epidemic (gossip) and anti-entropy inter-node communication.

In one embodiment of the searchable data service, to order updates to the data store, for each update request, the request router 202 may generate a sequencing token and pass it back with the reply to the client. The sequencing token may capture an ordering ID and possibly other system information. The client may, if desired, extract the ordering ID from the sequencing token. In one embodiment, the searchable data service may apply requests in the order given by this ordering ID. Note that other embodiments may use other methods to order updates.

In one embodiment, ordering IDs may be generated by a request router 202 based on its local NTP synchronized time. Other embodiments may use other bases for generating ordering IDs. Note that NTP synchronized time is an imperfect synchronization system and that there may be times where update order may be inverted due to clock skew. However, in one embodiment using NTP synchronized time as a basis for generating ordering IDs, the client may determine the order in which the updates are applied and resubmit an update if they disagree with this order.

In one embodiment, the client may be requested to send the last sequencing token received by the client with its next request to the searchable data service. In one embodiment, the searchable data service may use the received last sequencing tokens to collect data regarding clock skew and ordering. In one embodiment, the searchable data service may use the last sequencing token supplied by the client to affect the ordering of updates, if necessary as determined by the collected data.

Data Partitioning and Replication

Embodiments of the searchable data service may provide one or more mechanisms for data partitioning and replication of indexing data in the storage subsystem 206. Data partitioning may allow clients of the searchable data service to store and maintain larger searchable indexes than can otherwise fit on a single storage node. Data replication may provide redundancy in the searchable index for the durability, reliability, and availability of the searchable index to a subscriber's data store stored and made accessible for queries from client applications via the searchable data service.

An aspect of data partitioning and data replication in embodiments of the searchable data service is that there is no central controller that controls data partitioning and data replication. Instead, data partitioning and data replication tasks may be distributed among various nodes and components in the searchable data service system.

Figure 7:
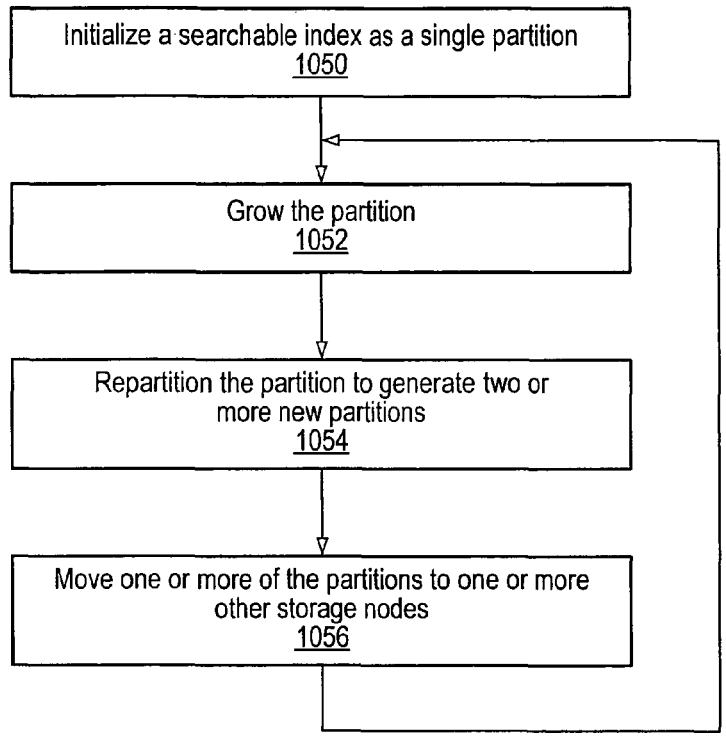
FIG. 7 illustrates a method for partitioning a searchable index in a searchable data service system according to one embodiment.

FIG. 7 illustrates a method for partitioning a searchable index in a searchable data service system according to one embodiment. A searchable data service system may be implemented on a plurality of nodes. The nodes may be located in one data center or may be dispersed across two or more data centers. The data centers may be geographically dispersed. In one embodiment, the searchable data service may include at least a coordination subsystem, a query subsystem and a storage subsystem. In one embodiment, the plurality of nodes may include one or more coordinator nodes that implement the coordination subsystem, one or more query nodes (also referred to as query TSAR nodes) that implement the query subsystem, and one or more storage nodes that implement the storage subsystem. In one embodiment, a Web services platform may provide a Web service interface to the searchable data service that provides one or more interface calls to client applications of the searchable data service.

As indicated at 1050, the searchable data service may initialize a searchable index for a data store as a single partition stored on a single storage node. As indicated at 1052, over time, the partition may grow. For example, the partition may grow as storage requests are received from a client application to add searchable data service objects to the searchable index. At some point, the searchable data service may detect that the available disk space on the storage node is at or near the limits of a comfort zone for available disk space on the storage node.

To allow the searchable index to continue to grow, the partition may be repartitioned to generate two or more new partitions, as indicated at 1054. Each of the new partitions may include a different subset of the searchable data service objects in the searchable index. One or more of the new partitions may then be moved to one or more other storage nodes, thus freeing up storage space on the storage node, as indicated at 1056. In one embodiment, another node may cooperatively volunteer to receive and store a new partition. In one embodiment, the storage node that needs to move a partition may broadcast a message within a group of storage nodes indicating that the storage node needs to move the partition. One or more of the storage nodes that receive the message may then volunteer to store the partition. The storage node may then select a best storage node from the volunteers to store the partition, and may then cooperate with the selected storage node to move the partition to the other storage node. Note that the different partitions stored on the two nodes may continue to grow, and thus may be repartitioned to generate new partitions that may then be moved to other storage nodes if necessary. Repartitioning and moving partitions to other storage nodes thus allows partitions of a searchable index to grow beyond the storage limits of a single storage node. An exemplary stress management mechanism that implements a stress management algorithm for managing disk load on storage nodes in one embodiment of a searchable data service system, and that may be used to select a best storage node from among two or more volunteer storage nodes to receive a partition, is described later in this document in the section titled Stress Management.

Note that repartitioning a partition to create two or more new partitions and moving one or more partitions from a storage node to one or more other storage nodes may also be performed to load-balance write load to the searchable index. If a storage node detects that write load to the partition is at or near the limit of a comfort zone for writes to the storage node, the storage node may repartition the partition and cooperatively move at least one of the new partitions to another storage node, as described above, to move some of the write load to the other storage node.

Figure 8:
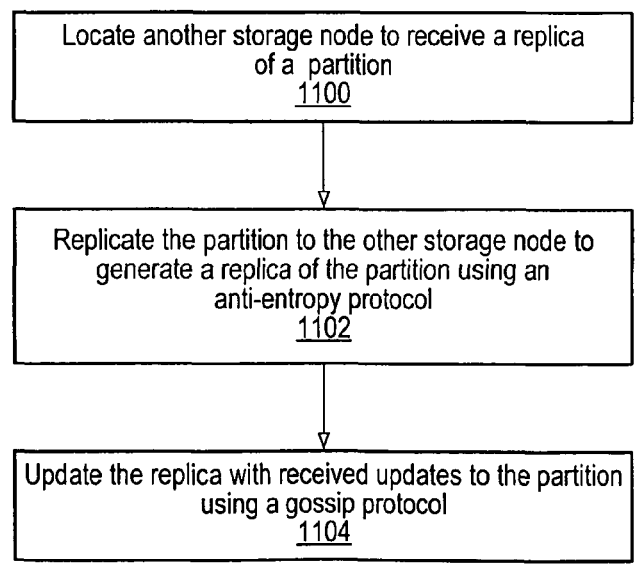
FIG. 8 illustrates a method for replicating a partition of a searchable index in a searchable data service system according to one embodiment.

FIG. 8 illustrates a method for replicating a partition of a searchable index in a searchable data service system according to one embodiment. Data replication may provide redundancy in the searchable index for the durability, reliability, and availability of the searchable index. Replication of a partition may also be performed to load-balance one or more usage metrics for a resource of the storage node. In one embodiment, replication of a partition may be performed to load-balance read load to the partition if the storage node detects that read load to the partition is at or near the limit of a comfort zone for reads to the storage node. In one embodiment, replication of a partition may be performed to load-balance CPU-load on the storage node if the storage node detects that CPU load on the storage node is at or near the limit of a comfort zone for CPU load to the storage node.

To replicate a partition stored by the storage node, a storage node may locate another storage node to receive a replica of the partition, as indicated at 1100. In one embodiment, the other node cooperatively volunteers to receive and store the replica. In one embodiment, the storage node that wants to replicate a partition may broadcast a message within a group of storage nodes indicating that the storage node is seeking a volunteer to receive the replica. One or more of the storage nodes that receives the message may then volunteer to store the replica. The storage node may then select a best storage node from the volunteers to store the replica, and cooperate with the selected storage node to replicate the partition to the other storage node.

As indicated at 1102, the storage nodes may then cooperatively replicate the partition to the other storage node using an anti-entropy protocol. Note that the partition may potentially be updated during the replication as storage node requests for the searchable index are received and processed. To obtain consistency between the partition and the replica, in one embodiment, the replica may be updated with received updates to the partition using a gossip protocol to propagate the updates to the other storage node, as indicated at 1104. Note that the gossip protocol may provide weak consistency between replicas of the partition. Also note that updates to replicas of a partition may continue to be performed using the gossip protocol to thus maintain weak consistency between the replicas.

The storage node to which the partition is replicated may be within the same data center as the storage node that stores the partition or may be in another storage center. In one embodiment, the searchable data service may create and maintain at least two replicas of a partition within a data center and at least two replicas of the partition within at least one other data center.

Data Partitioning

Figure 9A:
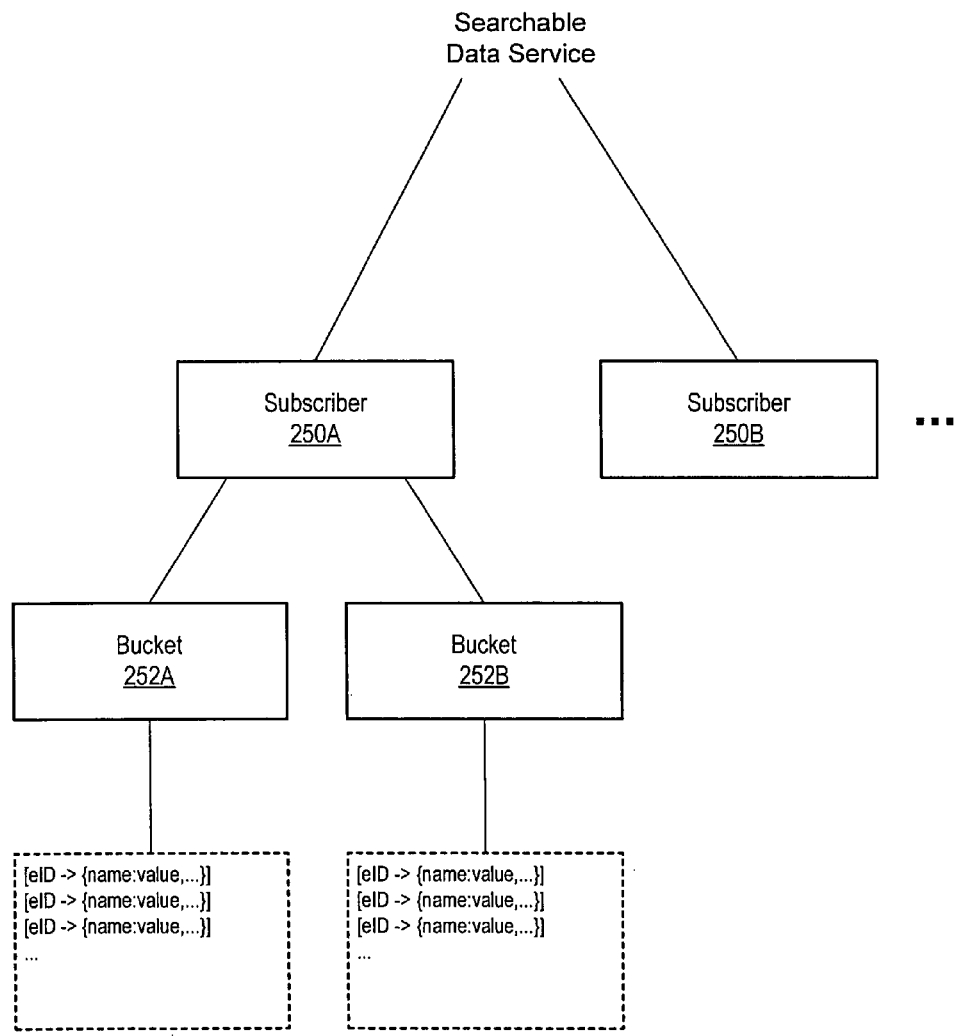
FIGS. 9A and 9B illustrate searchable indexes for subscribers, the segregation of data (eIDs) for each subscriber into buckets, and partitioning of the buckets, according to one embodiment of the searchable data service.
Figure 9B:
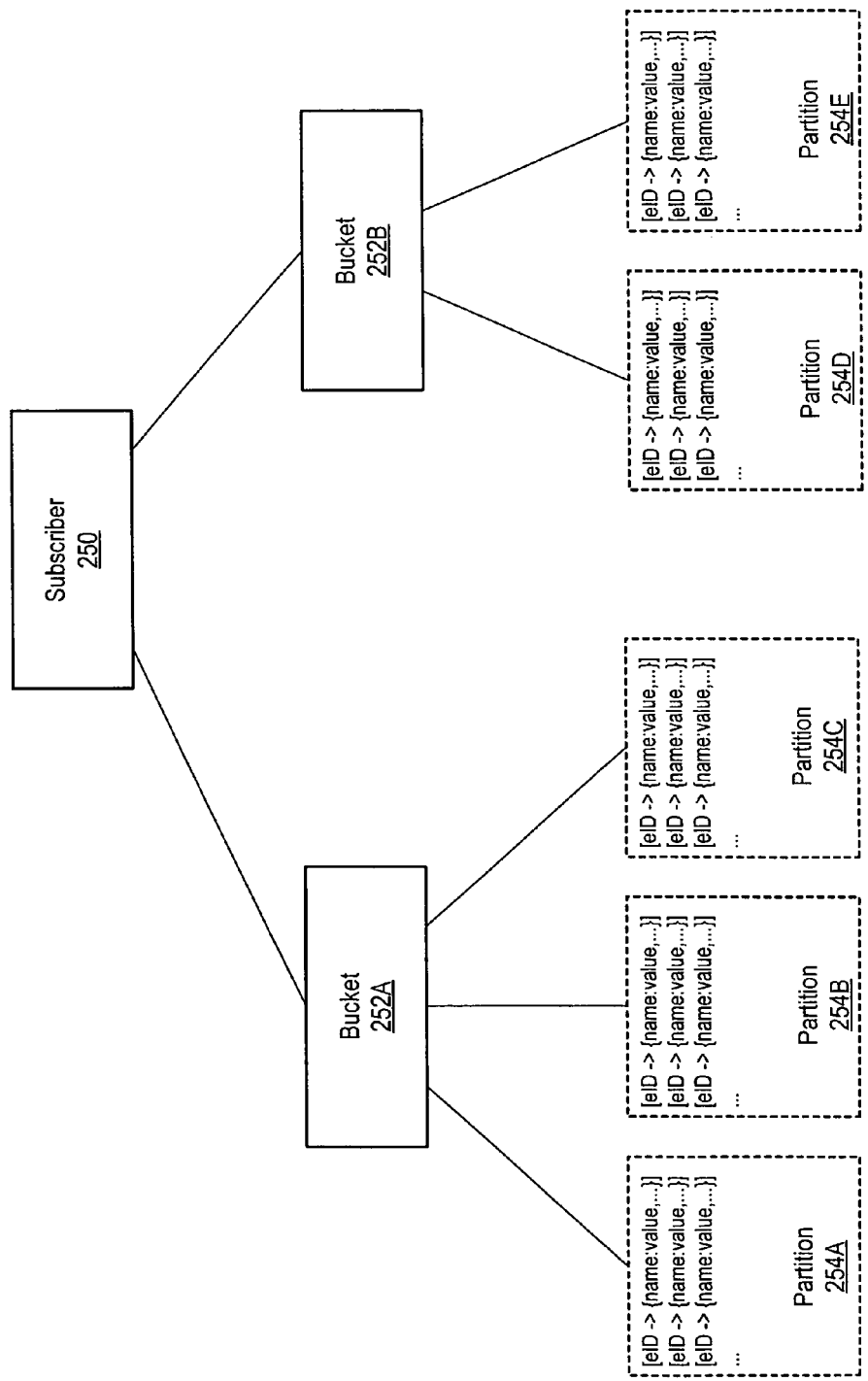

FIGS. 9A and 9B illustrate searchable indexes for subscribers, the segregation of data (eIDs) for each subscriber 250 into buckets, and partitioning of the buckets, according to one embodiment of the searchable data service. Searchable data service data, for each subscriber 250, is segregated into buckets, which define the limits of data that may be considered in a single query. In FIG. 9A, when a searchable data service client (or subscriber) adds data to the searchable index that is identified by subscriber 250A, the client submits a locator (eID), with attributes, into buckets 252. Each bucket 252 initially resides on a single storage node. Since datasets may grow indefinitely, partitions may exceed the physical capacity of a disk on a storage node. To allow for this possibility, in one embodiment, the data in a bucket may be split across two or more partitions 254, as illustrated in FIG. 9B. In FIG. 9B, the buckets 252 of FIG. 9A are shown have been split to form partitions 254. For example, bucket 252A has been split into partitions 254A, 254B and 254C. Note that, in one embodiment, each partition 254 resides on a single storage node. However, more than one partition 254 may reside on a single storage node.

As partitions 254 grow, a disk may run out of space, requiring that one or more partitions 254 be moved to another storage node. In one embodiment, a stress manager component of the searchable data service may perform at least part of the task of managing the movement of partitions 254 among storage nodes. Data partitioning in embodiments of the searchable data service is further described below in reference to the partition manager 232 component and the stress manager component.

Data Replication

Figure 9C:
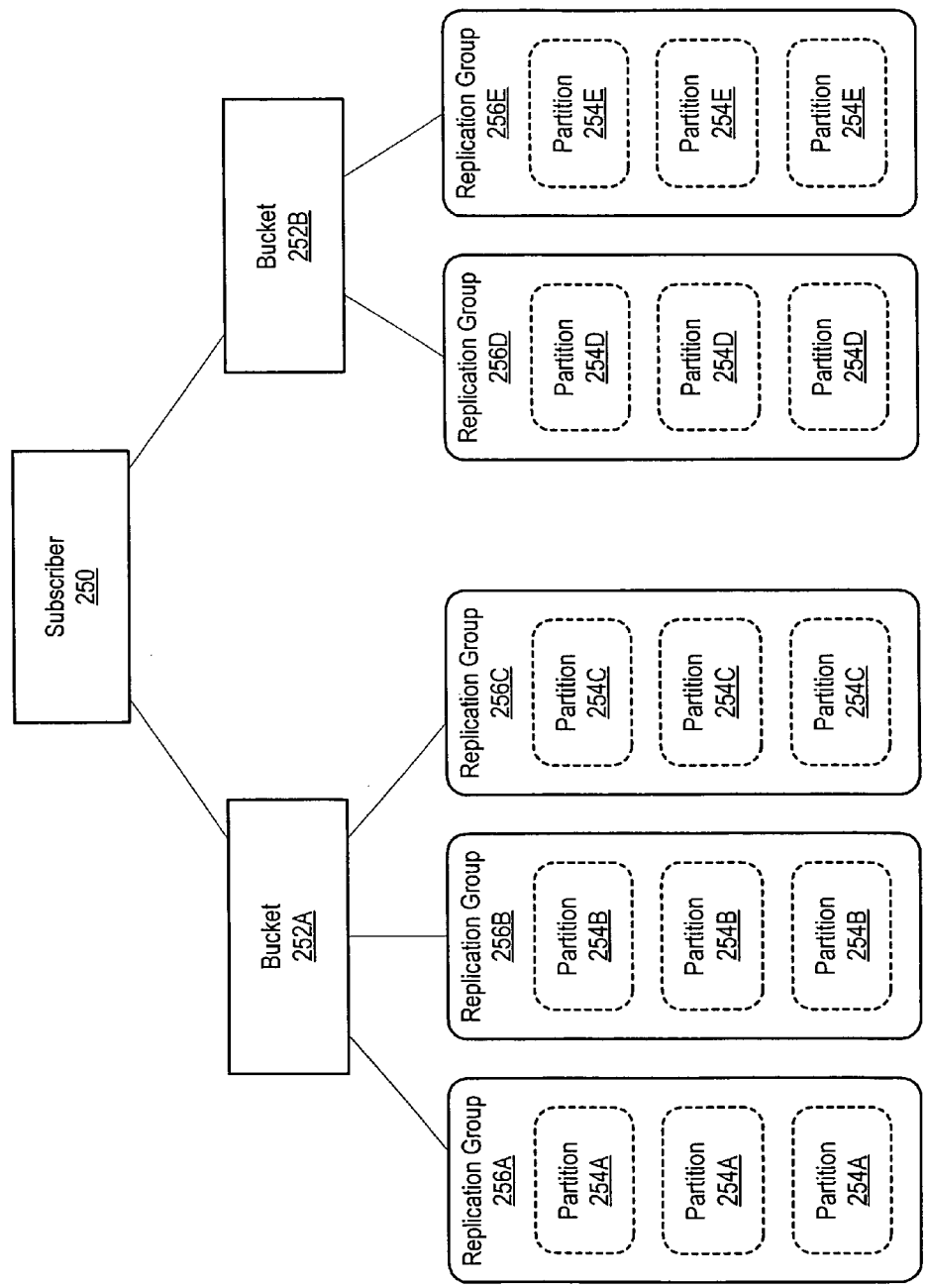
FIG. 9C illustrates data replication via replicating partitions according to one embodiment.

FIG. 9C illustrates data replication via replicating partitions according to one embodiment. In one embodiment, for data durability and fault tolerance, data sets (bucket partitions 254) may be replicated across several storage nodes. In FIG. 9C, the partitions 254 of FIG. 9B have been replicated to form replication groups 256. For example, in FIG. 9C, partitions 254A, 254B, and 254C of bucket 252A have been replicated to form replication groups 256A, 256B, and 256C. Replication may allow embodiments of the searchable data service to distribute query load across replication groups 256, and thus may be necessary or desired as a response to sustained "read stress" on the searchable data service. In addition, as one or more storage nodes may fail, embodiments of the searchable data service may provision new storage nodes to keep the replication group(s) 256 populated. The details of forming replication groups is further described below in reference to the group membership and health component.

Partition Manager

In one embodiment, a partition manager 232 component of the searchable data service is responsible for making decisions and performing actions to reconfigure the searchable data service system to alleviate hot spots which may occur as a result of a shortage of disk (storage) space and/or from a high processing load. The partition manager 232 component may perform as a distributed computation (distributed across hosts or nodes) that tends towards balancing the stress on hosts or nodes in the searchable data service system.

In one embodiment the partition manager 232 may perform one or more of, but not limited to, the following actions:

A host (storage node) may be added to a replication group 256.

A host (storage node) may be removed from a replication group 256.

A partition 254 may be split.

A partition 254 may be merged with another partition.

In one embodiment, the partition manager 232 performs these actions in accordance with group health information collected by and received from the group membership and health component 226.

Partitions

In one embodiment, partitions 254 may be formed based on a hash of the entity ID (eID). The following is an exemplary function that returns a Boolean (true or false) indicating whether a provide eID is within a particular partition:

bool inPartition(String eID, int mask, int value)
{
int h=hash(eID);
return (h & mask)==value;
}

Any of a variety of hash functions may be used in various embodiments. In one embodiment, the hash function may be specified explicitly to support cross-platform implementations of the searchable data service. In one exemplary embodiment, CRC32, as defined in ISO 3309, may be used as the hash function for determining partitions. CRC32 may generate a smooth distribution for just about anything except intentionally malicious input. In one embodiment, the possibility of malicious input may be avoided by using a cryptographically-secure hash, with a tradeoff of greater computational expense.

Splitting and Merging Partitions

Searchable data service data is segregated into buckets 252, which define the limits of data that may be considered in a single query. In one embodiment, buckets 252 which are queried may be replicated beyond the minimum number required for fault-tolerance so that arbitrary amounts of query-processing power may be added to a bucket 252. However, a bucket 252 may become too large to be stored on hosts within the searchable data service system, and/or may receive an excessive number of updates from client systems. Replicating buckets 252 may not address problems which may result from these potential situations. In one embodiment, to address these potential situations, buckets 252 may be divided into separate partitions 254 of data.

In one embodiment, updates to the data store need only be sent to a member of the partition 254 containing the entity to be updated. Queries, however, are made to all partitions 254 in a bucket 252; the results of a query are then merged by a query aggregator in the query subsystem 204. Therefore, the number of partitions 254 may be determined by the storage requirements of the bucket 252, while the number of hosts in each replication group 256 may be driven by the number of queries for the bucket 252.

Embodiments of the searchable data service may provide a mechanism, similar to extensible hashing, that allows the incremental scaling of a bucket 252 by adding single, potentially heterogeneous, hosts to a replication group 256. This mechanism may allow a searchable data service system to take advantage of heterogeneous machines, and may enable the partitioning for a bucket 252 to be dynamically changed, among other benefits. In one embodiment, an algorithm for partitioning searchable data service entities may be employed in which the entity identifier (eID) is hashed to an integer, and the least significant bits of that integer are examined to determine a partition 254. In one embodiment, the number of significant bits that are examined may vary between partitions 254.

Figure 10:
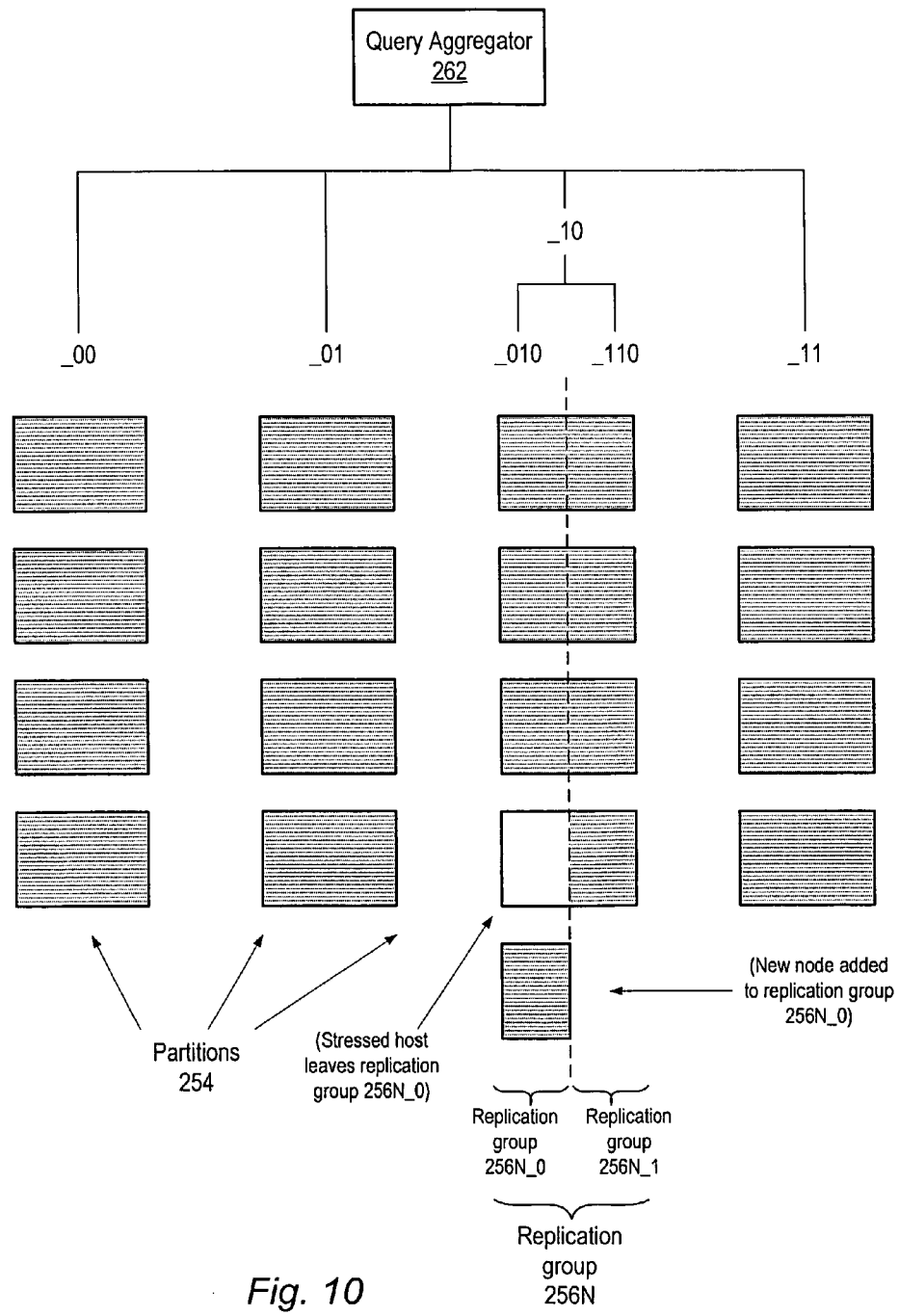
FIG. 10 illustrates the splitting of partitions in replication groups according to one embodiment.

FIG. 10 illustrates the splitting of partitions in replication groups according to one embodiment. In this embodiment, the number of partitions 254 in a bucket 254 may be increased by splitting partitions 254 in a replication group 256. The replication group 256 for the given hash suffix becomes two partitions (two replication groups) corresponding to the two suffixes that may be formed by adding one more bit to the suffix. In the example illustrated in FIG. 10, the replication group 256N of the hash suffix _10 has been split into two partitions (replication group 256N_0 and replication group 256N_1) that are identified by the suffixes _010 and _110.

Using this mechanism, the initial membership of the two new replication groups 256N_0 and 256N_1 may be exactly the same as the membership of the split replication group 256N. No data migration initially happens, and queries and updates may be distributed as before the split. However, when a new storage node is added to one of the split replication groups 256 (in this example, replication group 256N_0), the replication group has more than the required number of members. A stressed host may then leave the replication group 256N_0 (while remaining in the replication group 256N_1), in this case by deleting half of its data (the half in replication group 256N_0), thus alleviating the stress on the host. Thus, adding a single node to a bucket 252 may alleviate at least some stress on the storage subsystem.

Note that, if all hosts have the same amount of disk space (i.e., are homogeneous in regards to disk space), and if the data are more-or-less evenly divided among the partitions 254, then all hosts in the bucket 252 may tend to run out of space at about the same time, which may require the number of hosts in the bucket 252 to double each time the bucket needs to repartition.

To help avoid having to double the hosts in a bucket 252 each time the bucket needs to partition when using homogeneous hosts, embodiments of the searchable data service may use one or more mechanisms that may add hosts more or less randomly, with the probability of hosts being added to a stressed replication group 256 increasing in proportion to the measured stress on that replication group 256. Using these mechanisms, splitting of a replication group 256 may be performed before the storage stress on the replication group becomes critical. One or more new hosts may be added to the split replication groups 256 early, when stress is lower, with new hosts added more frequently as the measured stress level grows.

Partition Manager Interfaces

In one embodiment, the partition manager 232 may interact with the eID update manager 230 in accordance with an API.

The following is an exemplary API that may be used by the partition manager 232 and that may include one or more of, but is not limited to, the described exemplary calls and callbacks.

setpartitions(Subscriber, Bucket, AcceptPartitionList, DropPartitionList)

AcceptPartitionList and DropPartitionList are arrays of strings in which each string represents a partition mask. The eID update manager 230 remembers the new accept partition list and uses the list to filter incoming operations. The eID update manager 230 may then walk the data store to remove items whose hashed eID matches the patterns in the drop partition list. Either the accept partition list or the drop partition list may be empty. When a storage node boots, its accept partition list may be empty, and may be initialized using this call from the partition manager 232.

empty(subscriber identifier, bucket identifier)

This callback indicates that the specified bucket has become empty locally, and that the partition manager 232 should thus consider merging or deleting it.

hint(subscriber identifier, bucket identifier, mask)

This peer-to-peer call may serve as a hint that another storage node should consider joining the named partition.

In one embodiment, the partition manager 232 may be a client of the group health 226 component for determining the load of nodes within replication groups through an API to the group membership and health 226 component. In one embodiment, the partition manager 232 may also query the storage node locator 216 to look for underutilized storage nodes.

In one embodiment, the splitting and merging of partitions may be driven only by stress on disk storage. In particular, once local disk usage gets beyond a certain threshold, locally-hosted partitions may be split. Other embodiments may use other architectures and mechanisms for dividing entities among a set of available hosts. For example, in one embodiment, consistent hashing (or Distributed Hash Tables (DHTs)) may be used to spread entity replicas semi-randomly among the available hosts. This embodiment may make adding or deleting hosts in the system relatively simple, but may tend to make querying inefficient, as queries may need to be sent to almost all hosts serving the bucket. Therefore, scaling the query-processing power for a bucket would be difficult in this embodiment. In another exemplary embodiment, entities may be distributed based upon their attributes, but note that this embodiment may make query planning and execution more complex. This embodiment may also increase the complexity of adding and removing hosts, and may make it more difficult to react to changing data distributions.

Storage Nodes

Figure 11:
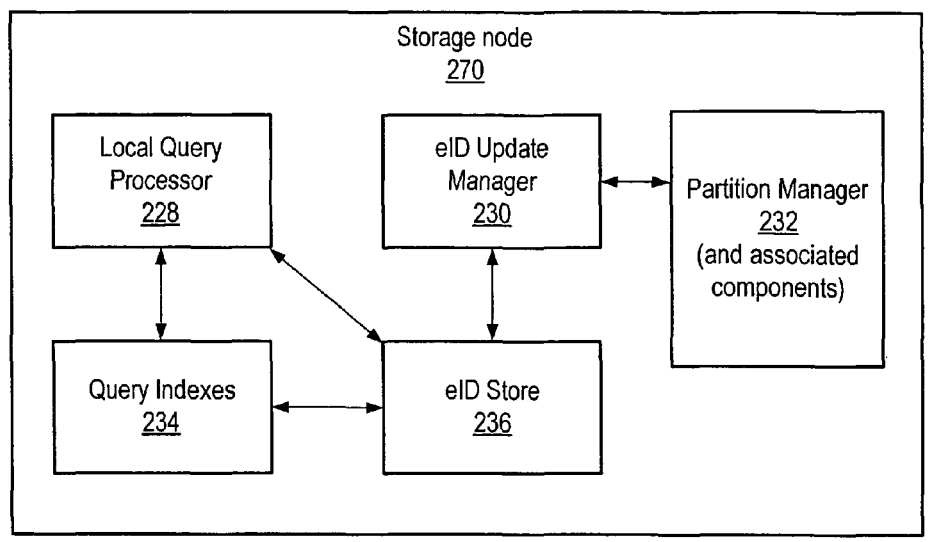
FIG. 11 illustrates an exemplary storage node and its components according to one embodiment.

FIG. 11 illustrates an exemplary storage node and its components according to one embodiment. Note that the partition manager 232 and associated components were described above in the section titled Partition Manager, and the local query processor 228 is further described below in the section titled Query Service. The following description of FIG. 11 focuses on the eID store 236 and its associated components: the eID update manager 276 and the query indexes 234 compiled on the eID store 236. Also note that, in one embodiment, instances of the illustrated components may reside on every storage node 270 in a searchable data service implementation.

In one embodiment, a local eID store 236 and a local eID update manager 230 may function together to provide one or more of, but not limited to, the following functionalities:

Support a list attributes API: After clients submit updates, the clients may read back the attributes associated with eIDs.

Support creation and re-creation of query indexes 234: The eID store 236 may be used as an authoritative store for creation of query indexes 274. If these indexes 234 are lost, they may be regenerated using the local eID store 236.

Support query subsystem 204 requirement for a chunk request whereby a list of eIDs is submitted for which the attributes for each are to be returned.

In one embodiment, the instances of an eID store 236 on the various storage nodes 270 within a searchable data service implementation may collectively provide one or more of, but not limited to, the following functionalities:

Durability: When a client is told that an update has been accepted, the client may require a high level of confidence that the replicated eID store 236 will not lose the data.

Consistency: Replicas exhibit eventual consistency within a specified Service Level Agreement (SLA) with a customer.

Reliability, availability, scalability: a searchable data service implementation may be required to support these as needed to enable the overall system to meet particular SLAs.

In one embodiment, to provide the durability and consistency functionalities, the instances of eID store 236 may communicate using a gossip mechanism, as further described later in this document. The partition manager 232, through interactions with the group health 226 component and a stress manager component, may manage the disk usage of the eID stores 236 through dynamic partitioning, and durability of the eID stores 236 through new replica creation when nodes fail.

eID Update Manager

In one embodiment, the eID update manager 230 may receive updates and list-attribute requests, for example via TCP, on a specified port. The eID update manager 230 may also communicate with its local partition manager 232 to report problems and status; and to receive directions on which bucket partitions 254 the eID update manager 230 should maintain, and which it should get rid of, if any.

Note that a storage node 270 may include one or more bucket partitions 254. In one embodiment, partitioning decisions are outside the scope of the eID update manager 230. However, the eID update manager 230 is informed of partitioning decisions and abides by them.

eID Store

In one embodiment, the eID store 236 may be implemented as a Berkeley database (BDB). Note that other embodiments may use other mechanisms to implement the eID store 236. A BDB provides the capacity to find all the attributes given a subscriber identifier, a bucket identifier, and an entity identifier (eID) within it. A BDB stores information as key-value pairs; the key may be referred to herein as a BDB-key, and the value as BDB-value. In one embodiment, the BDB-key and BDB-value may be formed as follows:

BDB-key=Key(subscriber identifier, bucket identifier, eID)

BDB-value={updates-for-the-eID-above}

Key(subscriber identifier, bucket identifier, eID) is a function that forms a unique key using the specified arguments. For example, in one embodiment, this function may form the BDB-key by concatenating the subscriber identifier, the bucket identifier, and the eID strings. Continuing the example, to list all eIDs given a bucket identifier, the function may prefix the concatenated subscriber identifier, bucket identifier, and eID strings with some delimiting information. For example, a BDB-key may be formed as "p12_client1bucket1/photos/xy.jpg", which indicates that the subscriber identifier ("client1") concatenated with one of the subscriber's buckets ("bucket1") is 12 characters long, and whatever follows after 12 characters is the eID string: "/photos/xy.jpg". Depending on which lookup functionalities are desired (equality lookup on subscriber identifier, bucket identifier, and eID; equality lookup on subscriber identifier and bucket but range and equality lookup for eID; etc), the Key( . . . ) may be implemented in various ways in embodiments.

In one embodiment, the BDB-value may include a collection of update operations (e.g., replace, add, and/or delete) and their corresponding sequenceIDs that help make up the attributes for the eID in the BDB-key. In one embodiment, a new update operation on an attribute supercedes an existing update operation in the eID store if its sequence ID is higher. For example, given an eID, a replace operation on an attribute with a sequence ID higher than a replace on that attribute in the eID store 236 removes the latter from the eID store 236. As another example, an overall delete operation with a certain sequence ID makes all update operations with lower sequence IDs irrelevant.

To illustrate the above, consider the following exemplary BDB-value at a particular eID:
    {(op=replace, name=n1, value=v1, ts=t1), (op=replace, name=n2, value=v2, ts=t2), (op=add, name=n2, value=v3,ts=t3)}
where op indicates operation and ts indicates a sequence ID. Assume for this example that t4>t3>t2>t1. At "this moment" in the example, the attributes implied by the BDB-value are:
    {(n1,v1),(n2,v2),(n2,v3)}
where n2 is multiple-valued. Now consider updates via one of the following exemplary scenarios at the same eID:
First Scenario:
    (op=replace, name=n2, value=v4, ts=t4)
This causes the BDB-value to contain:
    {(op=replace, name=n1, value=v1, ts=t1), (op=replace, name=n2, value=v4, ts=t4)}
Thus:
    (op=replace, name=n2, value=v2, ts=t2), (op=add, name=n2, value=v3,ts=t3) are jettisoned from the list of updates, as they are superceded by the new update.
Second Scenario:
    (op=delete, ts=t4)
This causes the BDB-value to contain only:
    {(op=delete, ts=t4)}
All of the other operations are removed, as they are all superceded by this new operation.
Third Scenario:
    (op=add, name=n1, value=v5, ts=t4)
This causes the BDB-value to contain:
    {(op=replace, name=n1, value=v1, ts=t1), (op=add, name=n1, value=v5, ts=t4), (op=replace, name=n2, value=v2, ts=t2), (op=add, name=n2, value=v3,ts=t3)}
In this scenario, no update needs to be thrown out. Two attributes, n1 and n2, are multi-valued.

Query Indexes

In one embodiment, the query indexes 234 may be implemented as a Berkeley database (BDB). Note that other embodiments may use other mechanisms to implement the query indexes 234. In one embodiment, given a bucket 252, the query indexes 234 allow a mapping from {name, value} pairs to eIDs. Thus, for query indexes 234:
    BDB-key=Key(subscriber identifier, bucket identifier, name, value)
    BDB-value={all-eIDs-with-{name, value}-above}
One embodiment may perform equality lookups with subscriber identifier, bucket identifier, and name, and equality and range lookups with the value. In one embodiment, the Key(subscriber identifier, bucket identifier, name, value) function for the query indexes 234, given the exemplary query:
    @name="some-name", @value>"string1" AND @value<"string2"
may support the query by allowing the following translation:
    BDB-Key>Key (subscriber identifier, bucket identifier, "some-name", "string1") AND BDB-Key<Key (subscriber identifier, bucket identifier, "some-name", "string2"
Some exemplary methods to implement the function Key( . . . ) were discussed under the section titled eID Store above, and are intended to apply here as well.

In one embodiment, the BDB-value for the query indexes 234 is a set of update operations (e.g., add and/or replace), along with their sequence IDs that associate a set of one or more eIDs with the {name, value} pair in the BDB-key. Note that every new update of the eID store 236 may cause one or more previous updates to become irrelevant. The query indexes 234 need to receive the new update, as well as all updates that it supercedes.

Storage Node Use Cases

The following describes several exemplary searchable data service storage node use cases according to one embodiment. The first two use cases (processing update requests and processing list-attribute requests) describe the processing of external events. The rest describe the processing of internal events.

The following describes the processing of update requests according to one embodiment. Upon receiving an update request from a request router 202, if the eID update manager 230 determines that the update is not for buckets it currently maintains, an error is returned. If the eID update manager 230 determines that the update is marked by the request router 202 with a sequence ID that is more than T (e.g., ~5-10) seconds in the future, the eID update manager 230 returns an error. In one embodiment, the eID update manager 230 may also check its NTP synchronization status and raise an alarm, if necessary.

In one embodiment, the eID update manager 230 may "gcast" the update using the group communication 222 component. The number of bytes sent across the network may be approximated (see the Group Communications section for more details); typically, the number of bytes may be N times the size in bytes of the update message, where N is the number of replicas needed for durability. The gcast may return a node set to which the update may be written for durability, or may time out.

The eID update manager 230 performs a read-modify-write of the eID store 236 with the updates. This may cause some updates to be superceded, and new updates to be entered. If the eID update manager 230 finds that the update cannot be applied because it has been superceded, an indication that the message is late is returned. The eID update manager 230 logs the new update, and the superceded updates, in a durable log. If the eID update manager 230 successfully gcasts, updates the eID store 236, and writes to its log, it returns the node-set obtained from gcast. Otherwise, an error may be returned.

The following describes the processing of list-attribute requests according to one embodiment. The eID update manager 230 reads its local eID store 236 to find the eID specified by the request. If the eID is found, its attributes are read and a successful response sent back. If the eID is not found, an error may be returned.

Processing Internal Events

If the eID store log changes, a query index updater may read the new additions and updates the query index 234. An anti-entropy daemon reads the new additions and updates its a data structure (e.g., a Merkle tree) for anti-entropy.

The following describes the processing of an apply message call made by the group communication 222 component according to one embodiment. If the eID update manager 230 determines that the update is not for buckets it currently maintains, an error is returned. If the eID update manager 230 determines that the update is marked by the request router 202 with a sequence ID that is more than T (e.g., ~5-10) seconds in the future, the message is accepted, and the eID update manager 230 checks its NTP synchronization status and raises an alarm, if necessary.

The eID update manager 230 performs a read-modify-write of the eID store 236 with the update message. This may cause some updates to be superceded, and new updates to be entered. If the eID update manager 230 finds that the update cannot be applied because it has been superceded, an indication that the message is late is returned. If the eID update manager 230 finds that the update has already been applied, an indication that the message is a duplicate is returned. The eID update manager 230 logs the new update, and the superceded updates, in a durable log. If the eID update manager 230 successfully updates the eID store 236 and writes to its log, it returns OK (successful). Otherwise, an error may be returned.

The following describes the processing of an anti-entropy call made by the group communication 222 component according to one embodiment. In response to the call, an anti-entropy daemon connects to the indicated host and carries out an anti-entropy session with the host. Anti-entropy is further discussed elsewhere in this document.

The following describes the processing of a set partitions call made by the partition manager 232 according to one embodiment. The eID update manager 230 writes its log with the new accept list and drop list. The eID update manager 230 starts a cleaner thread with the drop list to prune itself of eIDs that it is no longer responsible for. The query index 234 starts its own cleaner thread when it reads the logged event. An anti-entropy daemon also starts its own cleaner thread when it reads the logged event.

eID Update Manager Interfaces

The following describes exemplary interfaces that may be exposed or expected by an eID update manager 230 according to one embodiment. Note that these interfaces are exemplary, and are not intended to be limiting.

The eID update manager 230 may expose one or more of, but not limited to, the following interfaces to the request router 202:

replace (bucket identifier, eID, name, value, prev-seq-ID) OR add (bucket identifier, eID, name, value, prev-seq-ID) OR delete (bucket identifier, eID, name, value, prev-seq-ID)

The eID update manager 230 may expose one or more of, but not limited to, the following interfaces to a local group communication 222 component:

apply(Group, Msg)→ok|dup|late|error antientropy(Group, Host, Cookie)→Status

The eID update manager 230 may expose, but is not limited to, the following interface to a local partition manager 232:

setpartitions(Subscriber, Bucket, AcceptPartitionList, DropPartitionList)

Note that AcceptPartitionList and DropPartitionList are lists of {mask, value} pairs.

The eID update manager 230 may expect one or more of, but not limited to, the following interfaces from a local group communication 222 component:

gcast(Group, Msg)—>{ok, Hosts, Cookie}|error gsync(Cookie, Timeout)—>true|false

The eID update manager 230 may expose, but is not limited to, the following interface from a local partition manager 232:

empty(Subscriber, Bucket)

Query Service

In one embodiment, the query subsystem 204, or query service, of a searchable data service system may provide one or more interfaces for parsing client queries, retrieving data, and correlating query results sets. In one embodiment, the query service may involve or include several components of the searchable data service as illustrated in FIG. 6, including, but not limited to, one or more query TSARs 212, query caches 214, query node locators 220, and, on each storage node 270, a local query processor 228, local query index store 234, and entity ID (eID) store 236. Note that these components may be referred to using different numbers in the following Figures.

Figure 12:
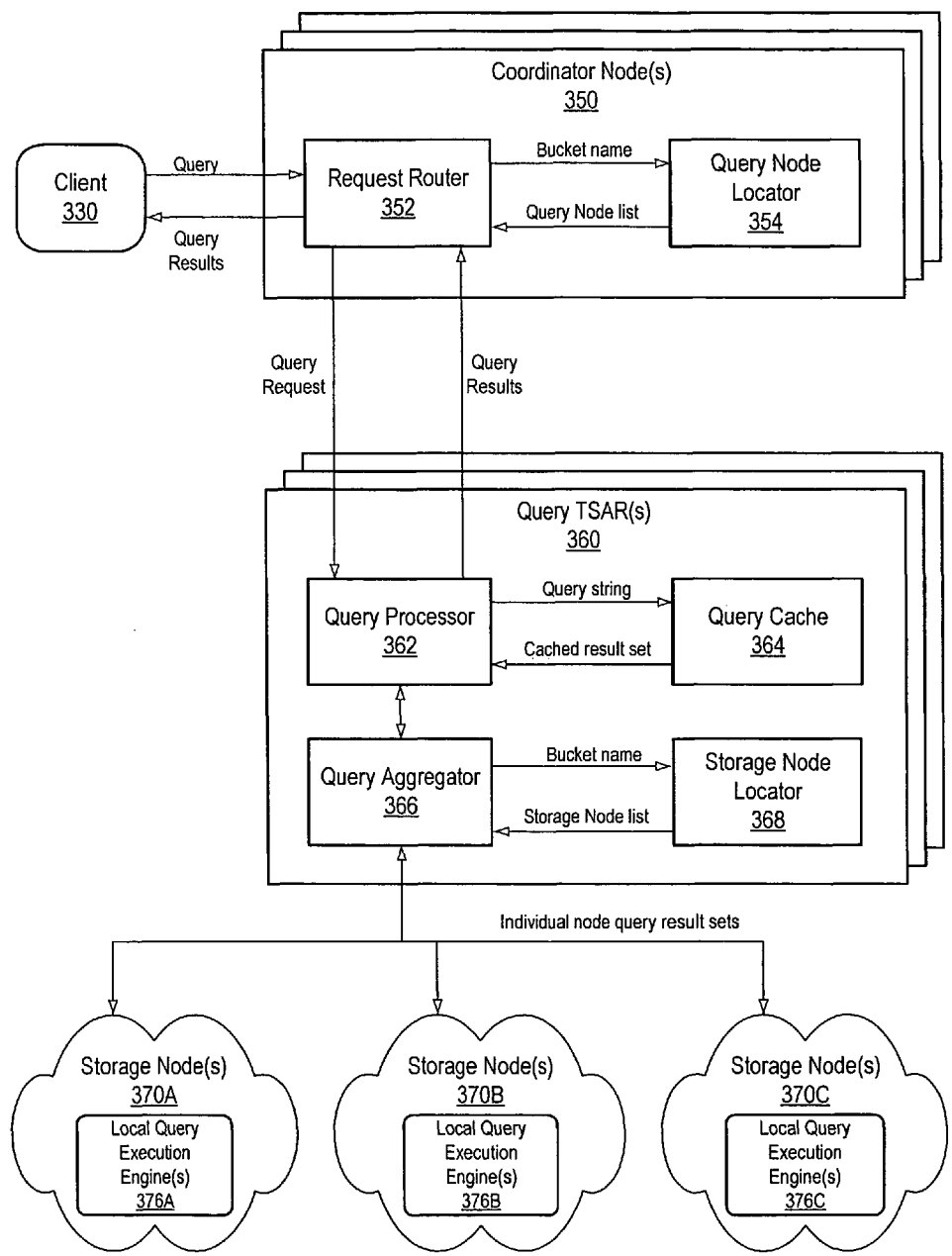
FIG. 12 illustrates various components of the searchable data service that may constitute or interact with the query subsystem to perform the servicing of queries from clients of the searchable data service, and further illustrates the data flow among the components, according to one embodiment.

FIG. 12 illustrates various components of the searchable data service that may constitute or interact with the query subsystem to perform the servicing of queries from clients of the searchable data service, and further illustrates the data flow among the components, according to one embodiment. The query subsystem may provide efficient execution of a client-submitted query against all storage nodes 370 in the searchable data service containing the relevant entity IDs (eIDs) (belonging to a particular bucket), aggregating the results from each individual storage node 370, and caching eID sets satisfying each given query. In one embodiment, to perform the processing of queries, the query subsystem may include, but is not limited to the following components:

query node locator 354 may make routing decisions for each particular query. In one embodiment, repeated client queries may be encouraged to route the same path through the query system in order to maximize the benefits of query cache 364.

query TSAR (Top Search AggregatoR) 360 may distribute a query to the appropriate set of storage nodes 370 for a given bucket, as well as aggregating results and query caching.

local query execution engines 376, one on each storage node 370, are responsible for executing the query locally on each of the storage nodes 370.

In one embodiment, query TSARs 360 are essentially treated as equals. Each query TSAR 360 may answer any client query. This may help to simplify the addition and removal of individual nodes. However, since query results may be cached in query caches 364 on the individual nodes, one embodiment may attempt to route identical queries for the same storage domain through the same query TSAR 360 nodes as often as possible. To help in routing queries through query TSARs 360, the request router 352 may access the query node locator 354 service to obtain lists of query nodes for specified buckets.

In addition to the abovementioned services and components, one or more other components or services may be accessed by the query service. For example, the storage node locator service 369 may be accessed to locate a set or list of appropriate storage nodes 370 for a given bucket. As another example, the query service may leverage or participate in the overall system node health service (group membership and health 226, in FIG. 6), which may monitor various nodes joining and leaving the system, and may propagate that health information to other nodes in the system.

Query Node Locator

In order for query caching to provide a beneficial hit rate, one embodiment may attempt to ensure that the same client queries are routed by the coordination service (request router 352) to the same query TSAR 360 nodes, if possible. In one embodiment, a query node locator 354, one of which may be instantiated in each coordinator node 350, may encapsulate the logic for providing that routing. In one embodiment, query node locator 354 may implement a consistent hashing scheme that allows for the random distribution of the incoming queries over the set of participating nodes. Other embodiments may implement other random or non-random mechanisms for distributing queries.

In one embodiment, the query node locator 354 implements a consistent hash function to assign each node and key an m-bit identifier using a base hash function, such as SHA-1. In one embodiment, a node's identifier may be chosen by hashing the node's IP address while a key identifier may be generated by hashing the combination of the domain and the normalized query string. The term "key" may be used to refer to both the original key and its image under the hash function, as the meaning will be clear from the context in which the term is used. Similarly, the term "node" may be used to refer to both the node and its identifier under the hash function. In one embodiment, the identifier length may be large enough to make the probability of two nodes or keys hashing to the same identifier negligible.

In one embodiment, the hashmap structure used by query node locator 354 may include one or more of, but is not limited to, the following fields:

key—a hash of the combined domain (bucket) name and query string expression.

value—a set of eIDs satisfying a query expression for the given bucket.

cost—the time it took to originally execute the query expression; may be used, for example, in garbage collection and replacement algorithms.

timestamp—the local time when the entry was inserted in the cache; may be used, for example, in garbage collection and validation algorithms.

Consistent hashing may assign keys to nodes as follows. Identifiers are ordered in an identifier circle modulo $2^m$. Key k is assigned to the first node whose identifier is equal to or follows (the identifier of) k in the identifier space. This node is called the successor node of key k, denoted by successor(k). If identifiers are represented as a circle of numbers from 0 to $2^m-1$, then successor(k) is the first node clockwise from k.

Figure 13:
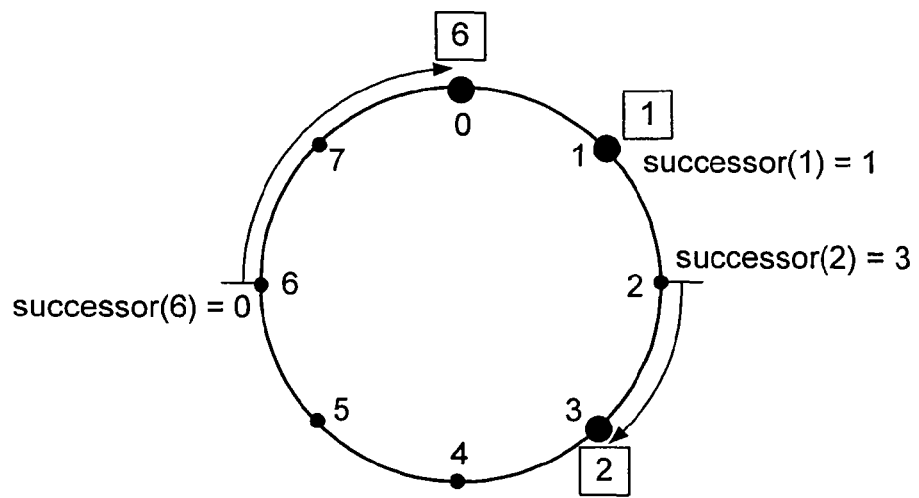
FIG. 13 illustrates an identifier circle, according to one embodiment.

FIG. 13 illustrates an identifier circle with m=3. The circle has three nodes: 0, 1, and 3. The successor of identifier 1 is node 1, so key 1 would be located at node 1. Similarly, key 2 would be located at node 3, and key 6 at node 0.

Consistent hashing may allow nodes to enter and leave the searchable data service with minimal disruption. To maintain the consistent hashing mapping when a node n joins the network, certain keys previously assigned to node n's successor now become assigned to node n. When node n leaves the network, all of its assigned keys are reassigned to node n's successor. No other changes in assignment of keys to nodes need occur. In the example given in FIG. 13, if a node were to join with identifier 7, it would capture the key with identifier 6 from the node with identifier 0.

Query TSAR (Top Search AggregatoR)

In one embodiment, query processor 362 is the first component of the searchable data service system that deals with the query expression provided by the client 330 in the query message. Query processor 362 may preprocess the query expression. In an embodiment that allows for unnormalized syntax in the query language, an initial step that the query processor 362 performs is to transform the query into its canonical, normalized form. In one embodiment, query processor 362 may also reorder the predicates in a query expression to normalize them so that semantically identical queries look the same. For example, the query expression:

[predicate 1] AND [predicate2] AND [predicate3]

should be represented by the same normalized query expression as the query expression:

[predicate3] AND [predicate 1] AND [predicate2]

This normalization of predicates in query expressions may, for example, help in allowing the system to achieve a higher query cache 364 hit rate.

Following the preprocessing of the query expression, query processor 362 may check its local query cache 364 to determine if the query cache 364 contains the necessary result set to satisfy the given (possibly normalized) query expression. If query cache 364 does contain the result set, the result set is retrieved from the query cache 364 and returned to the client 330 via coordinator node 350. Otherwise, the query expression is passed along to the query aggregator 366, which is responsible for retrieving the result set from the corresponding storage nodes 370. After the result set is retrieved from the storage nodes 370, it is cached in the local query cache 364 and returned to the client 330 via coordinator node 350.

The efficiency of query caching in query cache 364 may be a performance parameter that affects the overall performance of the searchable data service system. Overall performance of the system may be improved by resolving hot queries against the query cache 364 without having to go to the individual storage nodes 370 to retrieve the results sets.

Query Aggregator

In one embodiment, query aggregator 366 may use the storage node locator 368 service in order to locate a set of storage nodes 370 that contain eIDs for the bucket on which the current query is executed. After the set of storage nodes 370 is determined, query aggregator 366 may send the query request to the local query execution engines 376 on the each of the storage nodes 370, retrying if necessary. After the result sets are received from all the storage nodes 370 participating in the query, the result sets may be merged into a single set based on the sorting attribute, if necessary.

Local Query Execution Engine

Figure 14:
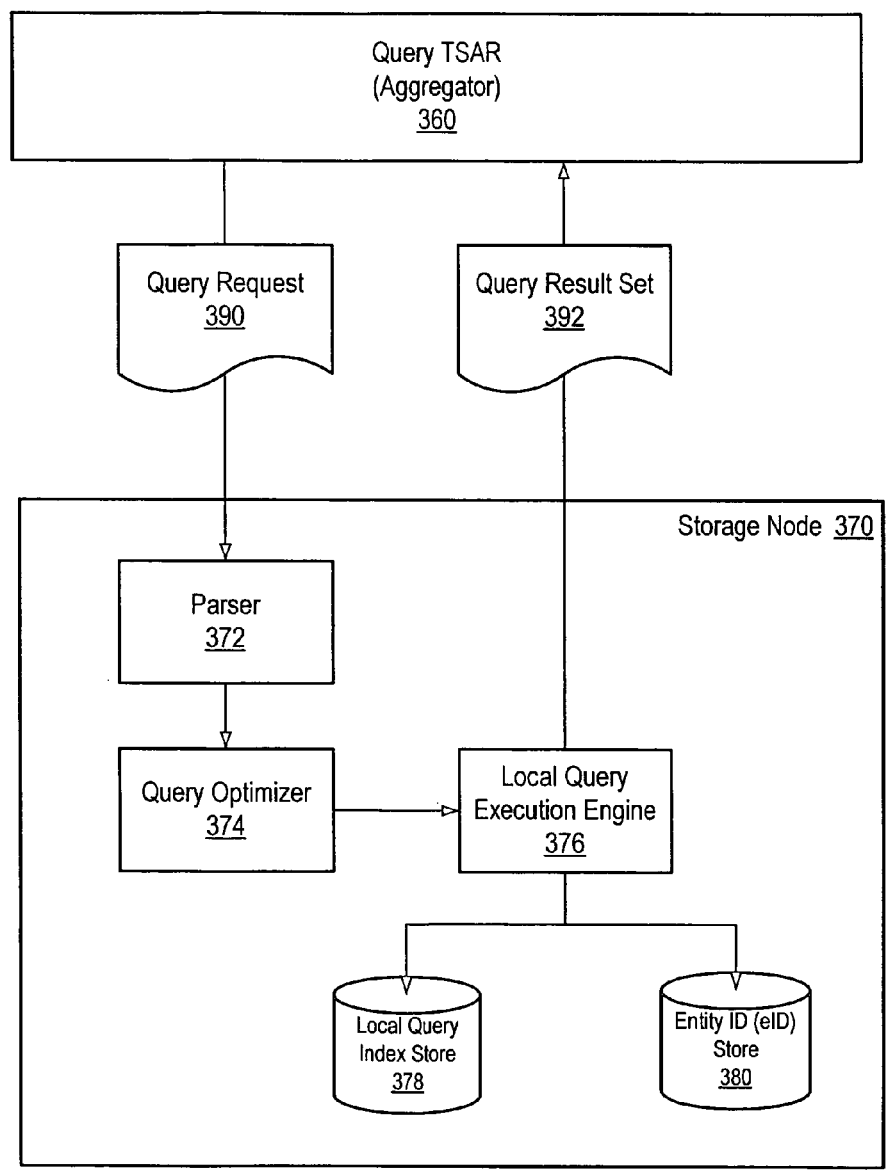
FIG. 14 illustrates an exemplary architecture for a single storage node according to one embodiment.

FIG. 14 illustrates an exemplary architecture for a single storage node 370 according to one embodiment. Local query execution engine 376 may be closely tied to the storage node 370's eID store 380 and local query index store 378. Local query execution engine 376 executes queries locally against the set of eIDs stored on this particular storage node 370. Since all the information about the eIDs is present locally, local query execution engine 376 may locally (i.e., within this storage node 370) execute the provided query 390, sort the results, and return the query result set 390 (along with the sorting attribute) to the query TSAR 360. In one embodiment, an incoming query 390 may be locally parsed by a parser 372 and optimized by a query optimizer 374 prior to being executed against the eID store 380 by the local query execution engine 376. In one embodiment, parser 372, query optimizer 374, and local query execution engine 376 may be components of a local query processor 228, as illustrated in FIG. 6.

Query Syntax and Search Expressions

In embodiments, an exemplary query message may include one or more of, but is not limited to, the following fields:

Subscriber identifier—an identifier for the particular client or client of the searchable data service.

Bucket identifier—identifies a bucket that defines the limits of data that may be considered in the query.

Node ID—a node identifier.

Query expression—a search expression to be applied for this query.

"More Tokens"—an opaque moreToken object may be returned to the client when the number of eIDs satisfying the query expression exceeds a pagination limit. This token may be resubmitted with the same query in order to retrieve the next set of results (eIDs).

Sequencing token.

In embodiments, the query service may support one or more of, but not limited to, the following types of operations for queries to the searchable data service by clients of the service:

Boolean operations (e.g.: AND, OR, NOT, etc.)

Arithmetic operations (e.g.: <, >, <=, >=, <>, =, !=)

String comparison operations (e.g.: prefix, "contains", etc.)

Sorting of the results set of entities based on a client-specified attribute. In one embodiment, sorting may be allowed on a single attribute only. Other embodiments may allow sorting on two or more attributes.

Pagination of the results set.

In one embodiment, search expressions in the searchable data service may represent a subset of XPath, a W3C recommendation. Note that other embodiments may use other protocols for search expressions. In one embodiment, a relatively small subset of XPath syntax may be used, given that attributes are lists of (name, value) pairs, and multiple levels in a markup language (e.g., XML) document are not allowed. Note that other embodiments may allow multiple levels in a markup language document. Also note that other embodiments may use relatively larger subsets of Xpath syntax. Therefore, the query syntax that is used in at least some embodiments of a searchable data service relates to the predicate test expressions of XPath definition.

In some embodiments, in addition to an Xpath query syntax, one or more unnormalized forms for search expressions—expressions with implicit syntax that may be reduced to a canonical form in accordance with one or more normalization rules—may be allowed. Allowing unnormalized forms for search expressions may help provide flexibility in testing and implementation for developers utilizing the searchable data service.

In embodiments, search expressions work on the attribute lists of objects; that is, a truth value may be calculated using one or more of, or all, of the attributes of an object and, if TRUE, the object may be selected.

The following are some examples of search expressions according to one embodiment, and are not intended to be limiting.

[@name="xxxxxx" starts-with (@value="yyyyyy")]

This expression refers to a test to be applied to every {name, value} pair of the attribute list. The square brackets "[ ]" designate an individual element test). After the application of this test, a small set of {name, value} pairs that matched the expression are left. This set is referred to as a "node set" by XPath. If a non-null node set for an object is obtained, its key will be selected.

[@name="prefix"  @value="keyword"] AND
  [@name="glassy" starts-with (@value="tasty")]

In this example, two node sets are combined. As indicated in XPath, a node set evaluates to TRUE if and only if it is not a null set. In the above example, two node sets are computed separately with the attribute-list of an object, and their truth values are combined using AND.

Note that [@value="foo"] does not mean the same as NOT [@value!="foo"]; the former is true if and only if some attribute has value with the string-value "foo"; the latter is true if and only if all attributes have value with the string-value "foo".

The following is a summary of an exemplary query syntax that is allowed in search expressions in one embodiment. Note that other embodiments may not include at least part of this syntax and/or may include other syntax:

query expression←(predicate expression)?

predicate expression←predicate|NOT predicate expression|predicate expression AND predicate expression|predicate expression OR predicate expression|predicate expression sort expression sort expression←'SORTBY[' attribute name']'|'SORTBY[' attribute name 'ASC]'|'SORTBY[' attribute name 'DESC]' predicate←'[' attribute name ']'|'[' attribute name_value test expression_']' attribute name←'@name=' attribute

In the above, attribute is a string name of a given attribute in the system.

value test expression←value test|NOT value test expression|value test expression AND value test expression|value test expression OR value test expression value test←'@value=' test value In the above, value has to be equal to test value.

value test←'@value !=' test value

In the above, value has to be not equal to test value.

value test←'@value>' test value

In the above, value has to be greater than test value.

value test←'@value>=' test value

In the above, value has to be greater than or equal to test value.

value test←'@value<' test value

In the above, value has to be less than test value.

value test←'@value<=' test value

In the above, value has to be less than or equal to test value.

value test←'startsWith(@value=' test value')'

In the above, value has to start with test value.

value test←'contains(@value=' test value')'

In the above, value contains test value as a substring.

The following is a summary of exemplary query syntax rules for search expressions in one embodiment. Note that other embodiments may not include at least part of these syntax rules and/or may include other syntax rules or modifications of these rules:

A Boolean test to be carried out on every {name, value} pair of an object's attribute list is enclosed within a square bracket [ . . . ].

Within the square brackets, the name and value parts of a {name, value} pair are referred to using "@name" and "@value" on the left-hand side.

The first part of an expression must be the name of the attribute in the form of "@name=", and may be followed by zero or more Boolean tests of attribute value.

The operators ">>=<<==!=" may be used as comparison operators with a string on the right-hand side.

String functions "starts-with" and "contains" from XPath may be used for string value attributes.

All @name parts of an attribute are considered strings, the @value parts are also considered strings.

Boolean operators are AND, OR, and NOT. These may be used to combine tests on a {name, value} pair.

Attribute sets obtained using tests within [. . . ] have truth values as given by XPath (Boolean function of node-sets) and hence can be combined using Boolean operators.

An optional SORTBY expression may specify the attribute on which the result set should be sorted. SORTBY expression may include ASC (ascending) and DESC (descending) specifiers to indicate the sort order. ASC (ascending) is the default sort order.

The following is an exemplary search expression according to the exemplary canonical search expression syntax as described above:

[@name="lastName" starts-with (@value="Adams")] AND [@name="firstName" @value="John"] AND [@name="age" @value>"25" AND @value<"60"] SORTBY[@name="year" DESC]

Unnormalized Search Expressions

The above describes an exemplary canonical search expression syntax using Xpath syntax that may be used in embodiments of the searchable data service. Some embodiments of the searchable data service, however, may accept unnormalized search expressions with implicit syntax and reduce the statements to the canonical form using one or more normalization rules. The following presents examples of unnormalized search expressions and corresponding exemplary relevant normalization rules for reducing the implicit syntax to a canonical form. Note that the unnormalized expressions are shown on the left, with the normalized expressions on the right, as in:

"unnormalized expression"=>[normalized expression]

A string, followed by comparison operators ">>=<<=: !=" MUST be followed by a string or a number; the expression will form a comparison-test:

"index>5"=>[@name="index" @value>"5"]
"title:'foo'"=>[@name="title" @value="foo"]

A negative-test is a test with "NOT" in front of it:

"NOT keyword:'xxxxxx'"=>[@name="keyword" NOT (@value="xxxxxx")]

An element test is either a test or a negative-test as defined above. Element tests may be listed as a series connected by the Boolean operators AND or OR. If a Boolean operator is missing, it is assumed to be AND. Parentheses may be used to indicate the order in which the Boolean operators may be applied:

"title:'foo' NOT prefix:'keyword'"=>@name="title" @value="foo") AND [@name="prefix" NOT (@value="keyword")]

A sequence of tests on the same attribute may be treated as belonging in the same predicate:

"price>5 AND price<20 AND available:'yes'"=> [@name="price" @value>"5" AND @value<"20"] AND [@name="available" @value="yes"]

Sorting order may be specified by including "sortby" expression at the end of the query string, followed by the attribute name on which resulting set should be sorted. Additional modifier ("asc" or "desc") may follow, specifying the sort order:

"year<2010 AND author:'John Doe' sortby price desc"=> [@name="year" @value<"2010"] AND [@name="author" @value="John Doe"] SORTBY [@name="price" DESC]

Query Result Set

In one embodiment, queries submitted to the searchable data service may be processed by the query service of the searchable data service as described herein to generate one or more of, but not limited to, the following as part of the returned search results data:

A set of one or more entity IDs (eIDs) that satisfy the query expression. In one embodiment, the number of eIDs that are returned may not exceed a predefined pagination limit.

moreToken: an opaque object returned to the client when the number of eIDs satisfying the query expression exceeds a pagination limit. This token may be resubmitted with the same query in order to retrieve the next set of results (eIDs).

Query Service Use Cases

The following describes several exemplary searchable data service query service use cases according to one embodiment. Note that these use cases may refer to the exemplary query subsystem architecture illustrated in FIG. 12.

The following describes the processing of an exemplary query request by the query service if all nodes are available, the query is not cached, and no sequencing token is provided, according to one embodiment. After receiving a query from a client 330, request router 352 on a coordinator node 350 submits the query request, or query information from the query request, to the local query node locator 354. Query node locator 354 may respond by returning a list of one or more query TSAR nodes 360. In one embodiment, there may be a predefined limit on the number of query TSAR nodes 360 that may be returned in the list (e.g., the limit may be three). In one embodiment, the list of query TSAR nodes 360 may be ranked or sorted according to one or more criteria.

Request router 352 may then submit the query request to at least one query TSAR node 360 on the list received from the query node locator 354. On a query TSAR node 360 that receives the query request from request router 352, the local query processor 362 may submit the query request to a local query cache 364. If the query cache 364 returns a negative cache hit result, the query TSAR node 360 may submit the query request to the local storage node locator 368. The storage node locator 368 returns a set or list of storage nodes 370 that contain the bucket specified in the query request.

The query TSAR 360 may then submit the query request to one or more of the storage nodes 370 from the list returned by the storage node locator 368. In one embodiment, the query request may be submitted to a minimal set of needed storage nodes 370. The local query processor on each storage node 370 that receives the query request may process the query request against the local eID store and return a set of entity Ds (eIDs). In one embodiment, the set of eIDs may be limited by a page size (e.g., 100 entities). A "more token" indicator may be returned, if necessary, to indicate that there are more eIDs available to satisfy the query request.

The query TSAR 360 merges sets of eIDs received from the one or more storage nodes, if necessary, and submits the query request to the local query cache 364 to store the results. The query TSAR 360 then returns the query results to the request router 352. Request router 352 then returns the query results to the requesting client 330.

The following describes the processing of an exemplary query request by the query service if all nodes are available, the query is cached, and no sequencing token is provided, according to one embodiment. After receiving a query from a client 330, request router 352 on a coordinator node 350 submits the query request, or query information from the query request, to the local query node locator 354. Query node locator 354 responds by returning a list of one or more query TSAR nodes 360. In one embodiment, there may be a predefined limit on the number of query TSAR nodes 360 that may be returned in the list (e.g., 3). In one embodiment, the list of query TSAR nodes 360 may be ranked or sorted according to one or more criteria.

Request router 352 then submits the query request to at least one query TSAR node 360 on the list received from the query node locator 354. On a query TSAR node 360 that receives the query request from request router 352, the local query processor 362 submits the query request to the local query cache 364. If the query cache 364 returns a positive cache hit result, the query TSAR 360 returns the page of eIDs recovered from query cache 364 to the request router 352. Request router 352 then returns the query results to the requesting client 330.

The following describes the processing of an exemplary query request by the query service if all nodes are available and a sequencing token is provided by the client, according to one embodiment. A sequencing token may be provided with the query request to help ensure that the searchable data service favors those storage nodes 370 specified in the node set of the sequencing token. By providing a sequencing token in a query request immediately following an update, a client 330 may significantly increase the chance of seeing the update reflected in the query result set. The two major differences from the exemplary use cases described above are that the query cache 364 is bypassed and that the process of selecting the storage nodes 370 to execute the query request against favors those storage nodes 370 indicated by the sequencing token.

After receiving a query from a client 330, request router 352 on a coordinator node 350 submits the query request, or query information from the query request, to the local query node locator 354. Query node locator 354 responds by returning a list of one or more query TSAR nodes 360. In one embodiment, there may be a predefined limit on the number of query TSAR nodes 360 that may be returned in the list (e.g., 3). In one embodiment, the list of query TSAR nodes 360 may be ranked or sorted according to one or more criteria.

Request router 352 then submits the query request to at least one query TSAR node 360 on the list received from the query node locator 354. The query TSAR 360 submits the request to the local storage node locator 368. The storage node locator 368 returns a set or list of storage nodes 370 that contain the bucket specified in the query request. The query TSAR 360 uses the storage node 370 set specified in the sequencing token and the list of storage nodes 370 returned by the storage node locator 368 to determine a set of one or more storage nodes 370 to which the query request may be submitted, and then submits the query request to the determined storage node(s) 370. The local query processor on each storage node 370 that receives the query request processes the query request against the local eID store and returns a set of entity IDs (eIDs). The query TSAR 360 merges sets of eIDs received from the storage nodes 370, if necessary, and submits the query request to the local query cache 364 to store the results. The query TSAR 360 then returns the query results to the request router 352. Request router 352 then returns the query results to the requesting client 330.

Query Service Interfaces

The following describes exemplary interfaces that may be exposed or expected by components of the query service according to one embodiment. Note that these interfaces are exemplary, and are not intended to be limiting.

The following are exemplary exposed interfaces of components of the query service.

The query node locator 354 may be used to discover a ranked list of query TSAR 360 hosts The query node locator 354 may expose at least the following exemplary interface:

GetQueryNodes (subscriber identifier, bucket identifier, query-expression)

GetQueryNodes accepts a subscriber identifier, a bucket identifier, and a query expression, and returns a list of hosts that correspond to the provided information.

The query TSAR 360 may expose at least the following exemplary query interface:

Query (queryID, subscriber identifier, bucket identifier, query-expression, more-token, update-cookie)

Query accepts a query ID, a subscriber identifier, a bucket identifier, a query expression, a more-token object and an update cookie. Query returns a query ID, an eID list, a more-token object, and/or an error message if appropriate.

The local query processor on each storage node 370 may expose at least the following exemplary query interface:

Query (queryID, subscriber identifier, bucket identifier, query-expression, more-token, update-cookie)

Query accepts a query ID, a subscriber identifier, a bucket identifier, a query expression, a more-token object and an update cookie. Query returns a query ID, an eID list, a more-token object, and/or an error message if appropriate.

The following are exemplary expected interfaces of components of the query service.

The storage node locator 368 may expose an interface that may be used to discover a ranked list of storage hosts for write and list-attribute operations:

GetStorageNodes (subscriber identifier, bucket identifier)

GetStorageNodes accepts a subscriber identifier and a bucket identifier, and returns a list of one or more storage nodes 370.

The group health 226 component may expose one or more interfaces that may be used by the query node locator 354 to locate available query TSAR nodes 360:

Status (group)

Status returns status information for nodes in the specified group. If no status for the nodes in the group are known, then no status (or "status unknown") is returned. In one embodiment, the status may be returned as a vector of qualities for each node: {status, [{Quality, Level}, { } . . . ]. Status information may include one or more of, but is not limited to, disk space, read "temperature", liveness, etc.

Monitor (group, callback)

Monitor returns group status changes through asynchronous callbacks.

Stress Management

Embodiments of the searchable data service may implement a distributed, non-centralized, automated stress management mechanism. In embodiments, each node in the searchable data service may manage its own resources as much as possible. The nodes may monitor their resource usage, and may communicate with a limited set of other nodes about their resource usage. When a resource usage is too high on a node and goes out of the comfort zone, the resource may be referred to as being hot. A resource that is not being used enough may be referred to as being cold. Each node may have actions that may be performed to keep its resource usage within a comfort zone.

In one embodiment, stress management may be modular, with separate processes controlling the monitoring, analysis/decisions, and actions to be performed In one embodiment, disk space may be actively managed by the automated stress management mechanism. Other embodiments may actively manage other system resources, including one or more of, but not limited to, communications bandwidth, read load, write load, and/or CPU usage or load, or combinations thereof.

Embodiments of the stress management mechanism may provide functionality including, but not limited to, the automated monitoring of critical resources, analysis of resource usage, and decisions on and performance of actions to keep resource usage in the comfort zone. Actions performed by the stress management mechanism may be performed so that they do not generate system loads that may impact overall system performance, availability, and/or reliability.

In embodiments, usage metrics for resources that may be monitored on a searchable data service node may include one or more of, but are not limited to:

- Storage (e.g., disk) space: Some embodiments may monitor the percentage of available and/or used storage space on storage nodes for use in determining if the available storage space is in the comfort zone.
- CPU (processor) load: Some embodiments may monitor CPU (processor) usage. One embodiment may monitor queue depth and/or one or more other CPU usage metrics. The percentage of a node's potential throughput that is being used may be monitored for use in determining if the CPU usage is in the comfort zone.
- Read load: Some embodiments may monitor the number of disk reads. Reads may be driven primarily by queries and secondarily by "list attribute" calls. Embodiments may ensure that these calls are not silently lost and that, if a call cannot be performed, the call returns an error.
- Write load: Some embodiments may monitor the number of disk writes. When a host/disk has too much write load, update of eID attributes may slow down. Embodiments may ensure that the writes are not silently lost and that, if a call cannot be performed, the update returns an error.

In one embodiment, resource load logs may be kept on each node with moving window averages showing recent activity. When, for example, disk space is too hot for the comfort zone of a storage node, data may be moved from the storage node to one or more other storage nodes. In one embodiment, the stress management mechanism may increase disk space (or another resource) on a node before the resource reaches a critically low state.

In one embodiment, when a disk gets too full on a storage node (i.e., when the disk space resource usage on the storage node is too hot and is thus out of or approaching being out of the comfort zone for the storage node), data may be moved off the disk. In one embodiment, this may be performed with a minimum of data migration.

Figure 15:
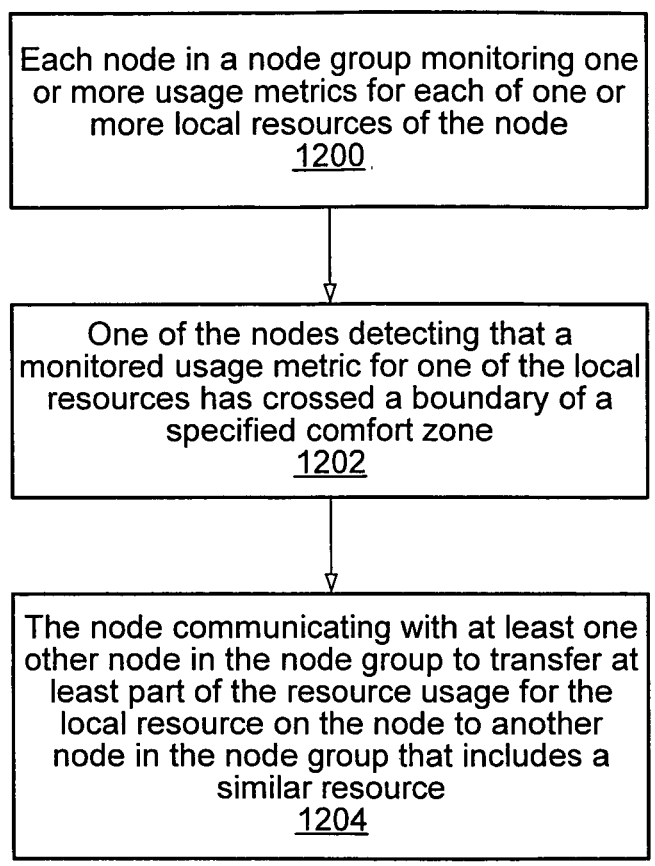
FIG. 15 is a flowchart of a stress management method for a searchable data service system, according to one embodiment.

FIG. 15 is a flowchart of a stress management method for a searchable data service system as described herein, according to one embodiment. A searchable data service system may be implemented on a plurality of nodes. The nodes may be located in one data center or may be dispersed across two or more data centers. The data centers may be geographically dispersed. In one embodiment, the searchable data service may include at least a coordination subsystem, a query subsystem and a storage subsystem. In one embodiment, the plurality of nodes may include one or more coordinator nodes that implement the coordination subsystem, one or more query nodes (also referred to as query TSAR nodes) that implement the query subsystem, and one or more storage nodes that implement the storage subsystem. In one embodiment, a Web services platform may provide a Web service interface to the searchable data service that provides one or more interface calls to client applications of the searchable data service.

In one embodiment, the plurality of nodes may self-organize into two or more node groups each including a subset of the plurality of nodes. In one embodiment, the node groups may include one or more storage node groups each including a subset of the storage nodes, one or more query node groups each including a subset of the query nodes, and one or more coordinator node groups each including a subset of the coordinator nodes. In one embodiment, each query node and each coordinator node may include an instance of a storage node locator component of the searchable data service configured to locate appropriate storage nodes to receive service requests, and the node groups may include one or more storage node locator groups each including a subset of the query nodes and the coordinator nodes. Other embodiments may include other types of node groups.

As indicated at 1200, each node in a node group may monitor one or more usage metrics for each of one or more local resources of the node used in supporting searchable data service functionality on the node. In one embodiment, nodes in the node group may propagate usage metrics for local resources to other nodes in the node group in accordance with a gossip protocol. As indicated at 1202, one of the nodes in the node group may detect that a monitored usage metric for one of the local resources of the node has crossed a boundary of a specified comfort zone for the usage metric. As indicated at 1204, the node may communicate with at least one other node in the node group to transfer at least part of the resource usage for the local resource on the node to another node in the node group that includes a similar resource. In one embodiment, a gossip protocol and/or an anti-entropy protocol may be used in communicating with the at least one other node. Note that transferring at least part of the resource usage for the local resource to another node in the node group may move the monitored usage metric for the local resource on the node into the specified comfort zone for the usage metric on the node.

The following is an exemplary stress management algorithm for managing disk load that may be implemented by a stress management mechanism in a searchable data service system according to one embodiment. Note that the algorithm handles both adding new hosts to the searchable data service system when necessary and increasing disk space on individual hosts (storage nodes) when necessary. The individual hosts may use an implementation of relevant parts of this algorithm to locally manage disk space usage. Note that other embodiments may use other algorithms or modifications of this algorithm.

DEFINITIONS $D_a$=Average percent of disk usage across all storage nodes.
$D_{th}$=Disk usage threshold. The high edge of the comfort zone.
$D_c$=Low edge of the comfort zone.
$D_i$=percent of disk usage on a host H.
$P_i$=A partition on host H.

Exemplary Algorithm:
If $D_a>D_{th}$, add a host.
If $D_i>D_{th}$, publish the list of partitions that $H_i$ is offering to move. The list may include one or more, or even all, of $H_i$'s partitions.
Hosts where $D_a<D_c$ may bid for partitions from the list that they can accept without going over $D_{th}$.
$H_i$ may accept one or more bids such that:
$D_c<D_i$ (new)$<D_{th}$,
  migration costs are low
  partitions go to disks with the most free space
After a period, if $H_i$'s receives no bids that will get it under $D_{th}$, split a partition (in one embodiment, the smallest partition) on $H_i$ and re-offer an updated list of partitions.

In one embodiment, new partitions may be offered using the same or a similar mechanism. A default size may be used in place of the real (near zero) initial size for the new partitions.

In one embodiment, to save large free spaces on disks for larger partitions, the above algorithm may be modified so that partitions are more likely to be moved to a disk if that move may put the disk into the comfort zone. In this embodiment, hosts that are in the comfort zone may not bid on partitions. This modification may help to avoid moving smaller partitions onto disks that have a large amount of free space, thus saving that free space for larger partitions.

Other embodiments may implement one or more other rules for moving partitions that may be applied in the execution of the disk space stress management algorithm. For example, one embodiment may implement rules that may enable the packing of disks (decreasing $D_{th}$ and/or the width of the comfort zone) with partitions that have had very little recent growth. As another example, one embodiment may implement rules that may enable the moving of partitions off of disks that have had significant recent growth and are nearing $D_{th}$ during periods of low activity.

Group Communication

The group communication 222 component may be used, for example, to enable other components of the searchable data service to maintain weakly-consistent replicated databases of indexing information. Group communication 222 may "carry" updates to one or more of, but not limited to, the following kinds of replicated data sets:

Searchable data service entities in the standalone storage/indexing/querying subsystem(s).

Bucket partitioning information and standalone storage host replication group directories.

Group membership information for query subsystem hosts and request router 202 hosts.

Weakly-consistent means that reads of replicated data may not reflect changes made by the most recent writes that were applied elsewhere in the replication group. In the absence of further changes, all replicas should converge to the same values, though that convergence may be delayed, for example by network partitions and/or node reboots.

In one embodiment, group communication may rely on two methods: gossip and anti-entropy. Gossip (or "rumor mongering") is an unreliable multicast through probabilistic flooding. Anti-entropy is a process of selecting a random peer host and looking for and resolving any differences between the peer databases on the selected host and the peer databases on other host(s). In one embodiment, a high-level and a low-level anti-entropy may be performed.

High-level anti-entropy may compare a peer's logs of gossiped updates to handle cases where the probabilistic flooding of messages may have missed a host. High-level anti-entropy may be performed without reference to the underlying database. Low-level anti-entropy compares the databases (alternatively, in one embodiment, aggregate statistics of the databases, such as checksums), and may handle cases where a node has rebooted or otherwise lost its message log, or where a node is joining a replication group and uses low-level anti-entropy to idempotently get a copy of the database.

In one embodiment, the group communication 222 component may have no knowledge of the implementation of the underlying database. The group communication 222 component provides the database with a call to propagate an update, and relies on the database to provide callbacks for processing received updates and for performing low-level anti-entropy.

The group communication 222 component may have frequent interaction with the group health 226 component. In one embodiment, the two components may be implemented in separate processes. In another embodiment, both of these components may be implemented within the same process so that the two components may share data structures.

Replication Group Life Cycle

Figure 16:
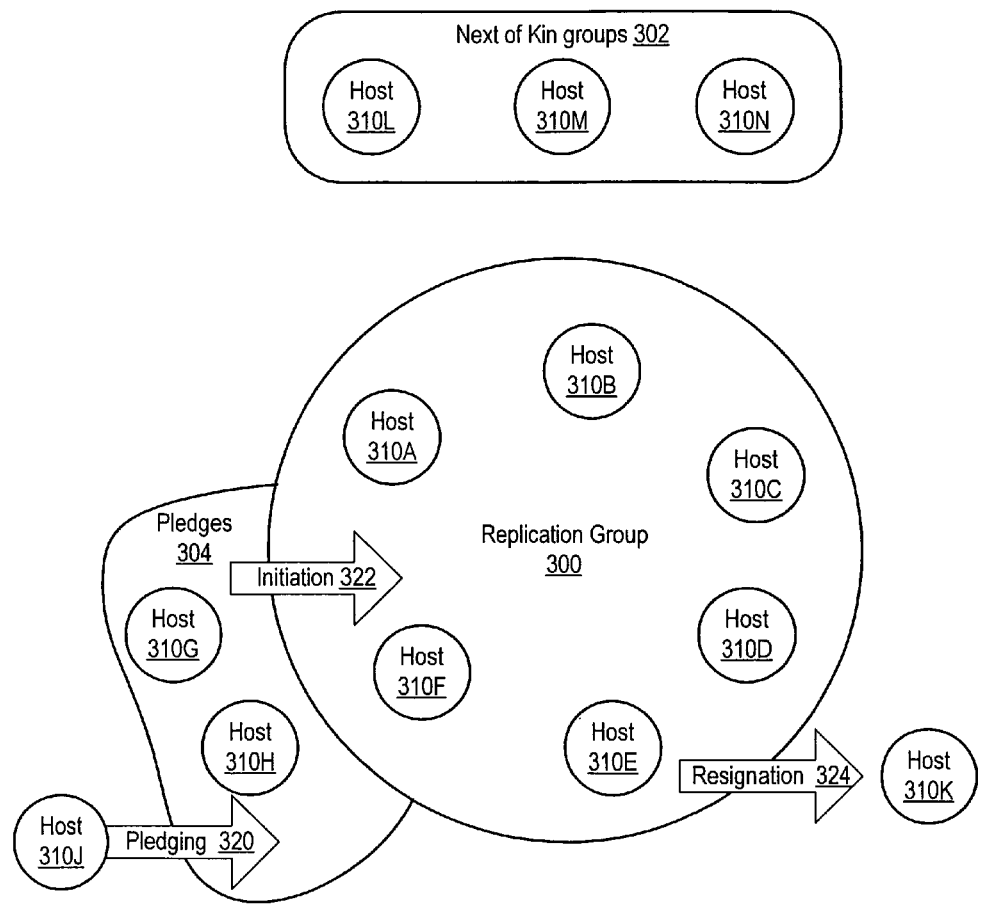
FIG. 16 illustrates the life cycle of a replication group in a searchable data service according to one embodiment.

FIG. 16 illustrates the life cycle of a replication group 300 in a searchable data service according to one embodiment. New hosts 310 may be added to replication group 300, and existing hosts 310 may be removed from or leave replication group 300. New hosts 310 (e.g., host 310J) may be added to replication group 300 by declaring or pledging 320 themselves as pledges 304. Pledged hosts 310 (e.g., host 310G and 310H) may receive gossipped updates to the replicated data set. The pledged hosts 310 may then select an existing replication group 300 member (e.g., host 310F) and perform low-level anti-entropy. Since pledged hosts 310 may also receive all updates, when the anti-entropy finishes, the pledged hosts 310 may be as up-to-date as any other replication group 300 member, and may thus initiate 322 themselves into replication group 300.

A host 310 (e.g., host 310K) may leave replication group 300, for example through failure or resignation. Resignation may require synchronization, as too many simultaneous resignations may cause the replication group 300 to fall below its minimal membership requirements.

In one embodiment, group membership changes may be sent to one or more other groups of hosts, known as next-of-kin groups 302. For a replication group, a next-of-kin group is a storage node locators group. For a storage node locators group, the next-of-kin groups are all replication groups. A replication group is a group of storage nodes that store replicas of a particular partition. Note that replication groups are illustrated in FIG. 9C and FIG. 10 as replication groups 256. The storage node locators group is a group of nodes (hosts) in the searchable data service that each include an instance of storage node locator 216.

Embodiments of a searchable data service may include one or more of, but are not limited to, the following types of groups of hosts, or nodes. Note that a name is provided for each type of group. These names are exemplary, and are not intended to be limiting:

snl_hosts: includes some or all nodes implementing a storage node locator (snl); in one embodiment, all coordination and query aggregation subsystem nodes.

qtsar_hosts: includes some or all nodes in the query subsystem. This may also be referred to as a query node group.

coord_datacenter_hosts: all coordinator nodes in the given data center. This may also be referred to as a coordinator node group.

sn_subscriber_bucket_mask_value_hosts: the replication group for the named partition. "sn" represents "storage node". This is what is referred to elsewhere as a partitions group, but may also be referred to as a storage node group.

Group Communication Interfaces

The following describes exemplary interfaces (e.g., calls and callbacks, both eternal and internal (peer-to-peer)) that may be exposed or expected by a group communication 222 component of a searchable data service according to one embodiment. Note that these interfaces are exemplary, and are not intended to be limiting. Other embodiments may include other interfaces, or may not include one or more of these interfaces.

Calls constructor(argument(s))

One embodiment may provide a constructor call to construct a new replication group 300. This constructor may accept one or more parameters as arguments including, but not limited to, a minimum number of group members required to successfully acknowledge and service initial updates received via a gcast call (see below).

gcast(Group, Msg)

gcast initiates a gossiped message within a group. Group is a string naming the group. Msg is a value specifying the message to be sent to the group. This may be given as the msg argument to the apply callback for other group members.

In one embodiment, the results of a gcast call is an object containing one or more of, but not limited to, the following elements:

Hosts: An array of strings listing the storage nodes which have acknowledged the update so far.

Durable: A boolean indicating whether the message was initially propagated to the minimum number of group members. The system may continue to attempt to communicate the message, even if false is returned.

Cookie: A value that may be later given to gsync to see if the message has been acknowledged by all group members.

In one embodiment, a gcast call may generate one or more of, but not limited to, the following errors:

invalid group type
invalid group name gsync(Cookie)

gsync returns a boolean indicating whether a gossiped message has reached all non-failed group members. Cookie is a value that was returned by a successful gcast call. The results of a gsync call may be a boolean indicating whether all group members have acknowledged the message. In one embodiment, a gsync call may generate, but is not limited to, an invalid cookie error.

Callbacks apply(Group, Msg)

The apply callback applies the change described by the given message to a replicated data set. Group is a string indicating the group name. Msg is a value indicating the message to be applied.

In one embodiment, the results of a gcast call may include one or more of, but are not limited to, one of the following:

OK: the change was successfully applied, though perhaps not in whole due to more recently-ordered changes.

DUP: or "duplicate". The specified change has previously been received.

LATE: The specified change has been obsoleted by more recently-ordered changes;

Error: A string giving an error reason. The change cannot be applied due to the reason specified by the Error. As a result, in one embodiment, a low-level anti-entropy session may be requested with a peer to perform self-repair (see below).

antientropy(Group, Host)

The antientropy callback initiates an anti-entropy session with the specified peer Host for the data associated with the named group. Group is a string indicating the name of the group. Host is a string indicating the name of the peer Host with which to perform anti-entropy. antientropy may return a boolean indicating whether the entire data set was traversed. If false, another anti-entropy session for the same group may be initiated, preferably with a different peer host. In one embodiment, an antientropy callback may generate, but is not limited to, a group invalid or a host invalid error.

Peer-to-Peer Calls

Peer-to-peer calls may be internal to an implementation of the searchable data service. These calls are made between or to members of specified groups.

rumor(Group, Originator, Seq no, OrigVtime, Msg)

The rumor peer-to-peer call spreads an update in a group by rumor-mongering. Group is a string indicating the name of the group in which the update is to be spread. Originator is a string indicating the name of the originating host. Seqno indicates the originator's sequence number for the update. OrigVtime indicates the originator's virtual time for the update. Msg indicates the update that is being spread, which is to be applied to the remote database through the apply callback. The results of a rumor call may be a boolean indicating whether the rumor has been successfully received. In one embodiment, a rumor call may generate, but is not limited to, a group invalid error.

request_membership(Group, Mode, Generation, Seqno)

The request_membership peer-to-peer call requests a voluntary membership change to be made for the sender in the receiver's group membership view. Group is a string indicating the name of the group. Mode indicates the type of membership change; in one embodiment, this may be one of "pledge", "initiate", and "resign". Generation indicates the sender's generation number, which may be guaranteed to increment after reboots. Seqno indicates the originator's sequence number for the operation, so that an acknowledgement vector (see below) may be used to indicate when all group members have seen the operation. The results of a request_membership call may be a boolean indicating whether the recipient has made the requested group membership change. In one embodiment, a request_membership call may generate, but is not limited to, a group invalid error.

In one embodiment, a received request_membership call may be forwarded to one or more other group members by the receiver. In one embodiment, the receiver may return a list of other group members to which the request_membership call has been forwarded to the sender.

failure(Group, Host, Generation)

The failure peer-to-peer call announces that a group member has been identified as having failed. Group is a string indicating the name of the group. Host identifies the failed host. Generation: indicates the generation of the failed host at the time of failure.

fast_anti_entropy(Group, View, SummaryVec, AcknowledgementVec)

The fast_anti_entropy peer-to-peer call initiates a fast or high-level phase of anti-entropy to exchange updates possibly missed by rumor-mongering. An exchange of these operations may be followed by any necessary rumor operations to bring the two hosts into sync. Group is a string indicating the name of the group. View is an object representing the group membership view. SummaryVec is an object representing the summary vector. AcknowledgementVec is an object representing the acknowledgement vector. The results of a fast_anti_entropy call may be a boolean indicating successful processing of the information, to be followed by a reciprocal call and an exchange of rumor operations until the two hosts have exchanged all available messages. In one embodiment, a fast_anti_entropy call may generate, but is not limited to, a group invalid error.

In one embodiment, a received fast_anti_entropy call may be forwarded to one or more other group members by the receiver. In one embodiment, the receiver may return a list of other group members to which the fast_anti_entropy call has been forwarded to the sender.

Group Membership and Health

In one embodiment, a group health 226 component may allow one or more other components of the searchable data service to identify sets of nodes that the components may monitor. The group health 226 component may then be queried by the other components for automatically-refreshed health information about those nodes. In one embodiment, the group health 226 component may also perform as a failure detection mechanism.

In embodiments of the searchable data service, hosts (nodes) may exchange health information about themselves and other nodes via the group health 226 component and the group communication 222 component. In one embodiment, if a searchable data service node is not communicating with other nodes, whether due to a node failure, a network failure, or some other reason, the staleness of the node's information may be noticed by the other nodes, and a timer may be used to eventually declare the silent node as failed. This encapsulation of time may help to simplify other components by allowing the components to work asynchronously—if a node A is waiting for a response from a node B, node A may eventually either receive a response from node B or be notified of node B's failure. In one embodiment, another node may be determined to have failed or gone offline if a group health message is not received from that node (either directly or through gossip) for a period equal to or greater than a prespecified timeout period after the last received group health message.

In one embodiment, distributed load averaging may be controlled at least in part through the group membership and health 226 component. For example, in one embodiment, group health 226 component may provide a mechanism to select a best member node from a replication group, taking current load averages and distances into account.

In one embodiment, there may be an instance of group health 226 component on each node in the searchable data service. In one embodiment, to allow other nodes to detect a node's failure, the group health 226 component on each node may periodically send a group health message, also referred to as a heartbeat message, to one or more neighbor nodes. The heartbeat message may include current local health statistics for the node. These statistics may include statistics on one or more of, but not limited to, the following node health information metrics:

Processor usage metrics—e.g., CPU (processor) load average/run queue depth, etc.

Storage and/or memory resource usage metrics—e.g., disk I/O, disk free space, paging/swapping metrics, etc.

Network/bandwidth resource usage metrics—e.g., network traffic metrics for a network communications resource.

The statistics may be averages over a time period (or over different time periods for different ones of the metrics), for example over one minute, or five minutes. In one embodiment, the averages for the node health information metrics may be correlated against operation counts in order to establish an estimate of a marginal change in load with an increase or decrease in operations. In one embodiment, the group health 226 component may query one or more other local components as necessary to get a per-bucket breakdown of operations in the last time period for averaging. The statistics may be augmented with a prediction of change in CPU load (or bandwidth, or storage, etc.) that may be realized in response to a change in the number of operations, e.g. "what will the disk I/O stress be like if an additional 150 queries per second are taken on?" This, for example, may allow a partition manager 232 component on a storage node to estimate what the loads may be like if one or more proposed changes to the configuration are made.

In one embodiment, a heartbeat message may be propagated to components on nodes throughout the searchable data service system or within a group of nodes in the searchable data service system via an epidemic, or gossip, protocol. In one embodiment, the communications may be performed via a group communications 222 component of the searchable data service, as described above. In one embodiment, group health information may be piggybacked on other searchable data service inter-node and inter-component messages.

If a node has not received a heartbeat message for another node for a period in excess of a specified threshold or time period (e.g., five minutes), the node may assume that the other node has failed. If a node does not receive any heartbeats from any other nodes for a period, the node may assume that its network connection has failed.

In one embodiment, when a node receives a heartbeat message, the node may check an internal table to see if this is the most recent heartbeat message that the node has seen from the originator node. If it is not, the heartbeat message is discarded. If it is the most recent heartbeat message from the originator node, the internal table is updated, and the heartbeat message may then be sent to one or more other neighbor nodes. In one embodiment, the neighbor nodes may be randomly selected. In one embodiment, the neighbor nodes may be chosen with a bias toward nearer neighbor nodes, in order to reduce the number of times the heartbeat is sent over WAN links. However, the probability of successfully sending a heartbeat message to distant nodes over a network (and of the distant nodes receiving the heartbeat message) should be high enough to realize a desired level of confidence that the heartbeat will eventually reach every other data center in the searchable data service system.

In one embodiment, the neighbor nodes to which a heartbeat message is forwarded may be selected on a per-monitored-group basis. For example, if node A's group health 226 component is monitoring groups G1, G2, and G3, each of which node A is a member, and is also monitoring groups G4, G5, and G6, of which node A is not a member, then node A's heartbeat messages may be sent to N hosts in each of the six groups. One embodiment may optimize selection of nodes to which heartbeat messages are forwarded for groups that have overlapping memberships. For example, if a node B in group G2 is selected to receive a heartbeat message from node A, and node B is also a member of groups G4 and G6, then node B may also be selected to receive the heartbeat message for those other groups as well.

If a node has not seen a health update from a monitored node for a period, e.g. 5 minutes, the node may perform a health anti-entropy with a different node, which in one embodiment may be selected according to a probability that decreases with distance from the node. Other embodiments may use other methods or metrics or combinations thereof to select a different node with which a health anti-entropy may be performed. For example, in one embodiment, the different node may be selected according to a probability that decreases with effective network and node utilization costs. If the anti-entropy does not yield an update for the monitored node, the monitored node may be identified as dead or unavailable to local components on the monitoring node.

In one embodiment, one or more gossip, or epidemic, protocols may be used for weakly-consistent multicasting of updates to health information. In one embodiment, the group health 226 component may not be considered a regular client of the group communication 222 component, since the group communication 222 component relies on group membership and health 226 component.

The group health 226 component may have frequent interaction with the group communication 222 component. In one embodiment, the two components may be implemented in separate processes. In another embodiment, both of these components may be implemented within the same process so that the two components may share data structures.

The amount of network traffic required for performing health updates may be a limiting factor for scaling a searchable data service, due to potentially large groups of nodes. Therefore, in one embodiment, the groups of nodes in a searchable data service may be organized as a hierarchy of groups, thus allowing large data sets to be addressed while limiting the size of any single group of nodes.

Figure 17:
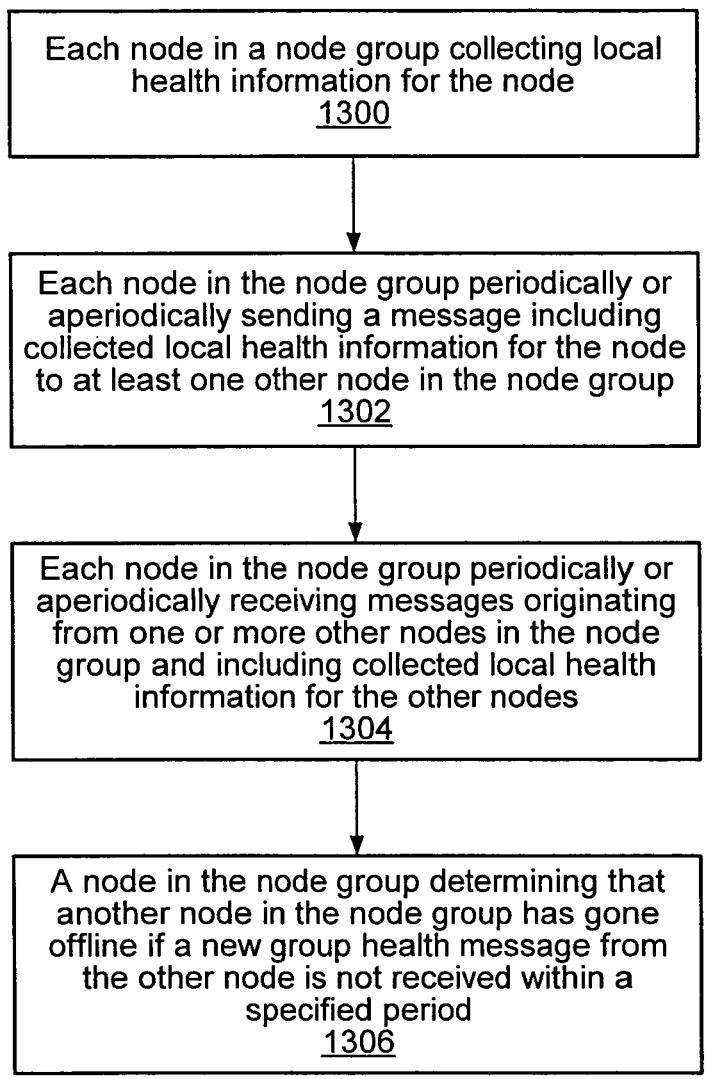
FIG. 17 illustrates a method for monitoring group membership and health in a searchable data service system according to one embodiment.

FIG. 17 illustrates a method for monitoring group health in a searchable data service system according to one embodiment. A searchable data service system may be implemented on a plurality of nodes. The nodes may be located in one data center or may be dispersed across two or more data centers. The data centers may be geographically dispersed. In one embodiment, the searchable data service may include at least a coordination subsystem, a query subsystem and a storage subsystem. In one embodiment, the plurality of nodes may include one or more coordinator nodes that implement the coordination subsystem, one or more query nodes (also referred to as query TSAR nodes) that implement the query subsystem, and one or more storage nodes that implement the storage subsystem. In one embodiment, a Web services platform may provide a Web service interface to the searchable data service that provides one or more interface calls to client applications of the searchable data service.

In one embodiment, the plurality of nodes may self-organize into two or more node groups each including a subset of the plurality of nodes. In one embodiment, the node groups may include one or more storage node groups each including a subset of the storage nodes, one or more query node groups each including a subset of the query nodes, and one or more coordinator node groups each including a subset of the coordinator nodes. In one embodiment, each query node and each coordinator node may include an instance of a storage node locator component of the searchable data service configured to locate appropriate storage nodes to receive service requests, and the node groups may include one or more storage node locator groups each including a subset of the query nodes and the coordinator nodes. Other embodiments may include other types of node groups.

As indicated at 1300, each node in a node group may collect local health information for the node. As indicated at 1302, each node in the node group may periodically or aperiodically send a message including collected local health information for the node to at least one other node in the node group. As indicated at 1304, each node in the node group may periodically or aperiodically receive messages originating from one or more other nodes in the node group and including collected local health information for the other nodes. In one embodiment, the local health information for a node may include one or more of, but is not limited to: one or more storage resource usage metrics for a local storage resource; one or more processor usage metrics for a local processor resource; and one or more network usage metrics for a network communications resource.

In one embodiment, the nodes in the node group may be configured to propagate the messages within the node group in accordance with a gossip protocol. In one embodiment, the nodes in the node group may piggyback the health information on other searchable data service messages to other nodes in the node group.

In one embodiment, the health messages may be used as heartbeat messages to detect if another node in the node group has gone offline. In this embodiment, as indicated at 1306, one of the nodes in the node group may determine that another node in the node group has gone offline if a new message including collected local health information for the other node is not received within a specified period.

In one embodiment, upon detecting that a new message including collected local health information for another other node has not been received from a particular node in the node group for a specified period, the node may perform an anti-entropy operation with one or more other nodes in the node group to obtain updated health information for the nodes in the node group. If the anti-entropy operation does not produce updated health information for the particular node, the node may then determine that the particular node has gone offline.

In one embodiment, a node in the node group may compare collected local health information for the node to local health information for at least one of the other nodes in the node group received in messages from the other nodes. The node may use the comparison in making local node health decisions for the node.

Group Membership and Health Interfaces

The following describes exemplary interfaces (e.g., calls and callbacks, both eternal and internal (peer-to-peer)) that may be exposed or expected by a group health 226 component of a searchable data service according to one embodiment. Note that these interfaces are exemplary, and are not intended to be limiting. Other embodiments may include other interfaces, or may not include one or more of these interfaces.

Calls add(Group, Host)

The add call adds a specified host (node) to a specified group. This call may result in the creation of the group if not already present.

del(Group, Host)

The del call deletes a specified host (node) from a specified group. This call may result in the deletion of the specified group itself if the deleted host was the only host in the group.

gdel(Group)

The gdel call deletes the specified group.

status(Group)

The status call returns status information for all nodes in the specified group. The status results may be returned in an object that includes the node names in the group, and status information on each of the named nodes. The status information may include, for each node, an indication as to whether the node is known; that is, if the node is known to the requestor via previous information received about the named node. If the node is not known, other status information about that particular node may not be valid. If the node is known, then the status information for the node may include an indication if the node is currently alive, and may also include other information about the node.

monitor(Group)

The monitor call returns group status changes for the specified group through one or more asynchronous callbacks.

unmonitor(Group)

The unmonitor call turns off asynchronous callbacks for the specified group. This call may undo a monitor call for the specified group.

Callbacks update(Group, Host, Status)

The update callback provides immediate notification of a status change for the specified host (node) in the specified monitored group.

Peer-to-Peer Calls heartbeat(Originator, OrigVtime, StatVec)

The heartbeat peer-to-peer call propagates a rumor of a heartbeat. Originator indicates the host originating the heartbeat. OrigVtime indicates the virtual time of the heartbeat. StatVec is an object that includes statistics on one or more named metrics and arrays of values for the statistics, where the first element is the normalized stress and the second element is the estimated per-operation change in the stress.

Exemplary metrics on which statistics may be included may include one or more of, but are not limited to:

cpu: CPU load average or run queue depth for a period (e.g., for one minute).

diskspace: disk space utilization percentage and usage (e.g., in gigabytes).

diskio: disk I/O operations.

net: network I/O operations.

mempage: memory paging.

Administrative Console

Figure 18:
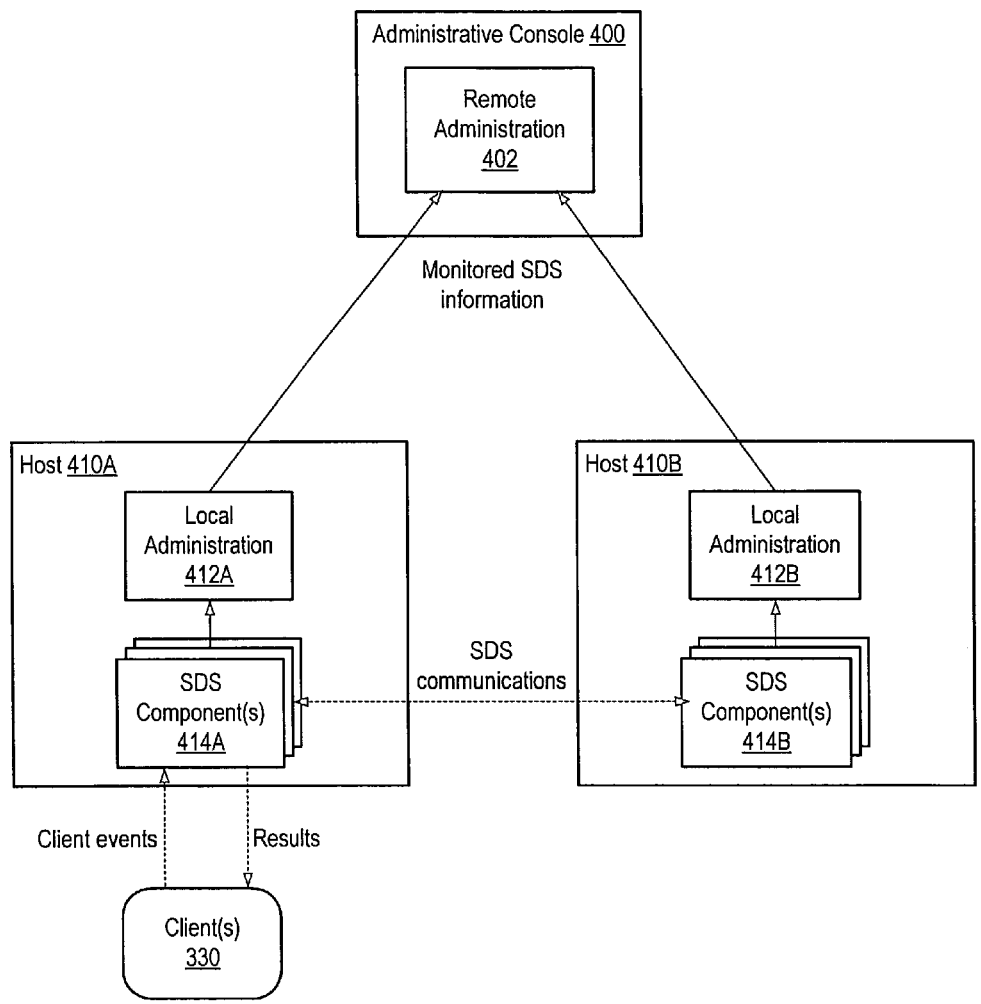
FIG. 18 illustrates a high-level architecture for an administrative console in a searchable data service system according to one embodiment.

One embodiment of the searchable data service may provide an administrative console that may allow an administrator to monitor the behavior of the searchable data service system. FIG. 18 illustrates a high-level architecture of an administrative console in a searchable data service system according to one embodiment. The administrative console 400 may collect information from hosts 410 in the searchable data service system. In a searchable data service system implementation, a single event (a query or add, for example) may result in many hosts in the system communicating with each other. Providing an administrative console 400, that can monitor, capture, analyze, summarize and display information on events and the resulting cascade of activity (e.g., messages) in the system that may follow an event may be valuable in system monitoring, optimization, and troubleshooting during various phases of a searchable data service system.

An administrative console 400 may be used during the development phase of a searchable data service system to, for example, understand system behavior, debug, and detect areas that may need optimization. During the production phase, an administrative console 400 may be used, for example, to monitor the health of the system, identify problems, and to predict and address issues before they become critical.

In an embodiment illustrated in FIG. 18, administration of a searchable data service may be implemented in a distributed architecture, with components of the distributed administrative system residing on two or more hosts. A remote administration 402 application may reside on a host system (the administrative console 400). One or more of hosts 410 in the searchable data service system may each include a local administration 412 module that monitors and collects information on the searchable data service activities, health information, and communications of the searchable data service components 414 in that host 410, including component-to-component communications between components 414 on that host and between components 414 on different hosts 410.

In one embodiment, remote administration 402 application may establish communications channels (e.g., RPC (Remote Procedure Call) or HTTP communications channels) with the local administration 412 modules at specified searchable data service nodes (hosts 410), and requests to monitor one or more searchable data service components 414. Each local administration 412 module may then establish a connection with the requested searchable data service components 414, and requests that those searchable data service components 414 start sending messages for monitoring to the local administration 412 module. The local administration 412 modules forward these messages to the remote administration 402 application.

In one embodiment, remote administration 402 application may provide an interactive client interface to the human client, for example an administrator. The client may, via the client interface, direct the remote administration 402 application to connect to particular (or all) local administration 412 modules, and may direct the local administration 412 modules, via the remote administration 402 application, to enable/disable the monitoring of particular searchable data service components 414.

Administrative console 400 may capture, log/store, perform analysis of, and graphically and/or textually display the collected information and/or summaries of the collected information for a client (e.g., a system administrator). In one embodiment, the administrative console 400 may enable or perform one or more of, but is not limited to, the following activities (referring to the components illustrated in FIG. 6):

Capture, log and display messages between searchable data service hosts. These messages may include, but are not limited to: messages between request routers 202, messages between storage node locators 216, messages between query node locators 220, messages between eID update manager s 230, messages between request routers 202 and query TSARs 212, messages between request routers 202 and eID update manager s 230, messages between query TSARs 212 and query processors 228, messages between partition managers 232 and storage node locators 216, and messages between partition managers 232.

Capture, log and display messages (e.g., RPC messages) between modules or components within a searchable data service host. These messages may include, but are not limited to: request router 202-query node locator 220 messages, request router 202-storage node locator 216 messages, partition manager 232-eID update manager 230 messages, query TSAR 212-storage node locator 216 messages, storage node locator 216-group membership and health 226 messages, query node locator 220-group membership and health 226 messages, partition manager 232-group membership and health 226 messages, storage node locator 216-group communication 222 messages, and query node locator 220-group communication 222 messages.

Capture and display content of eID Stores 236 and query index stores 234.

Monitor and display group membership information (e.g., snl_hosts, qtsar_hosts, etc.)

View the states of storage node locators 216: mappings between hosts and partition replicas.

View the states of query node locators 220: consistent hashing ring of query TSARs.

Display contents of a query TSAR's query cache 214.

View the states of request router(s) 202.

View the states of partition managers 232.

Modify group membership lists.

Initiate anti-entropy between two nodes.

Add or remove resources from the system.

Temporarily or permanently stop processing of one or more nodes

Referring again to FIG. 18, in one embodiment, the remote administration 402 application may provide one or more of, but is not limited to, the following interfaces. Note that these interfaces are exemplary and are not intended to be limiting:

readMsg(String msg)

readMsg receives messages from local administration 412 modules.

startMon(String host, int port)

startMon connects to a local administration 412 module at the specified host:port and enables all components 414 that are to be monitored for this local administration 412 module.

stopMon(String host, int port)

stopMon stops the monitoring of all components 414 and disconnects from the local administration 412 module at the specified host:port.

stopAllMon( )

stopAllMon stops the monitoring of all components 414 and disconnects from all currently connected local administration 412 modules.

enableComp(String componentName)

enableComp begins monitoring all connected hosts' components 414 identified by componentName.

enableAllComp( )

enableAllComp enables monitoring on all components 414 found in a static input file.

disableComp(String componentName)

disableComp stops monitoring all connected hosts' components 414 identified by componentName.

disableAllComp( )

disableAllComp stops monitoring all components 414, but does not disconnect from currently connected local administration 412 modules.

Local Administration Module

A local administration 412 module on a searchable data service host 410 serves as an intermediary between the remote administration 402 application and the local components 414. Local administration 412 module waits for a remote administration 402 connection and, once connected to remote administration 402 application, handles enable/disable component 414 requests from that remote administration 402 application. Local administration 412 module may also forward information on searchable data service messages among local components 414 to the remote administration 402 application.

The following is an exemplary message format of searchable data service monitoring messages to the remote administration 402 application from local administration 412 modules, and is not intended to be limiting:

<host/hostname/nodeID>: <Component> <sent/received> on <to/from who> <timestamp>: <msg>

In one embodiment, a local administration 412 module may provide one or more of, but is not limited to, the following interfaces. Note that these interfaces are exemplary and are not intended to be limiting:

monMsg(String msg)

monMsg is called by a component 414 when the component 414 sends/receives a message.

monBegin(String componentName)

monBegin looks up the port of the named component 414 in a static file, connects to local host:port, and calls monEnable( ) for the component 414.

monBeginAll( )

monBeginAll reads a static input file that includes a list of components 414 and the components' ports, connects to the components 414 listed in the file, and calls monEnable( ) for each of the components 414.

monStop(String componentName)

monStop stops monitoring the named component 414.

monStopAll( )

monStopAll stops all current component 414 monitoring activities.

Local Components

A local component 414 waits for a local administration 412 connection. Once connected to the local administration 412 module, a local component 414 may start sending messages for monitoring to the local administration 412 module when it receives an enable request from the local administration 412 module (which, in turn, occurs when the local administration 412 module receives an enable request from the remote administration 402 application). The local component 414 may stop sending messages for monitoring when it receives a disable request from the local administration 412 module.

The following is an exemplary message format of searchable data service monitoring messages to a local administration 412 module from local components 414, and is not intended to be limiting:

<Component> <sent/received> on <to/from who> <timestamp>: <msg>

In one embodiment, a local component 414 may provide one or more of, but is not limited to, the following interfaces. Note that these interfaces are exemplary and are not intended to be limiting:

monEnable( )

monEnable begins sending any sent/received messages to the local administration 412 module by invoking sendMsgToMon.

monDisable( )

monDisable stops sending messages to the local administration 412 module.

sendMsgToMon(String msg)

When monitoring is enabled, sendMsgToMon sends any sent/received messages to the local administration 412 module by invoking monMsg(String msg).

Searchable Data Service System—Physical Implementation

Figure 19:
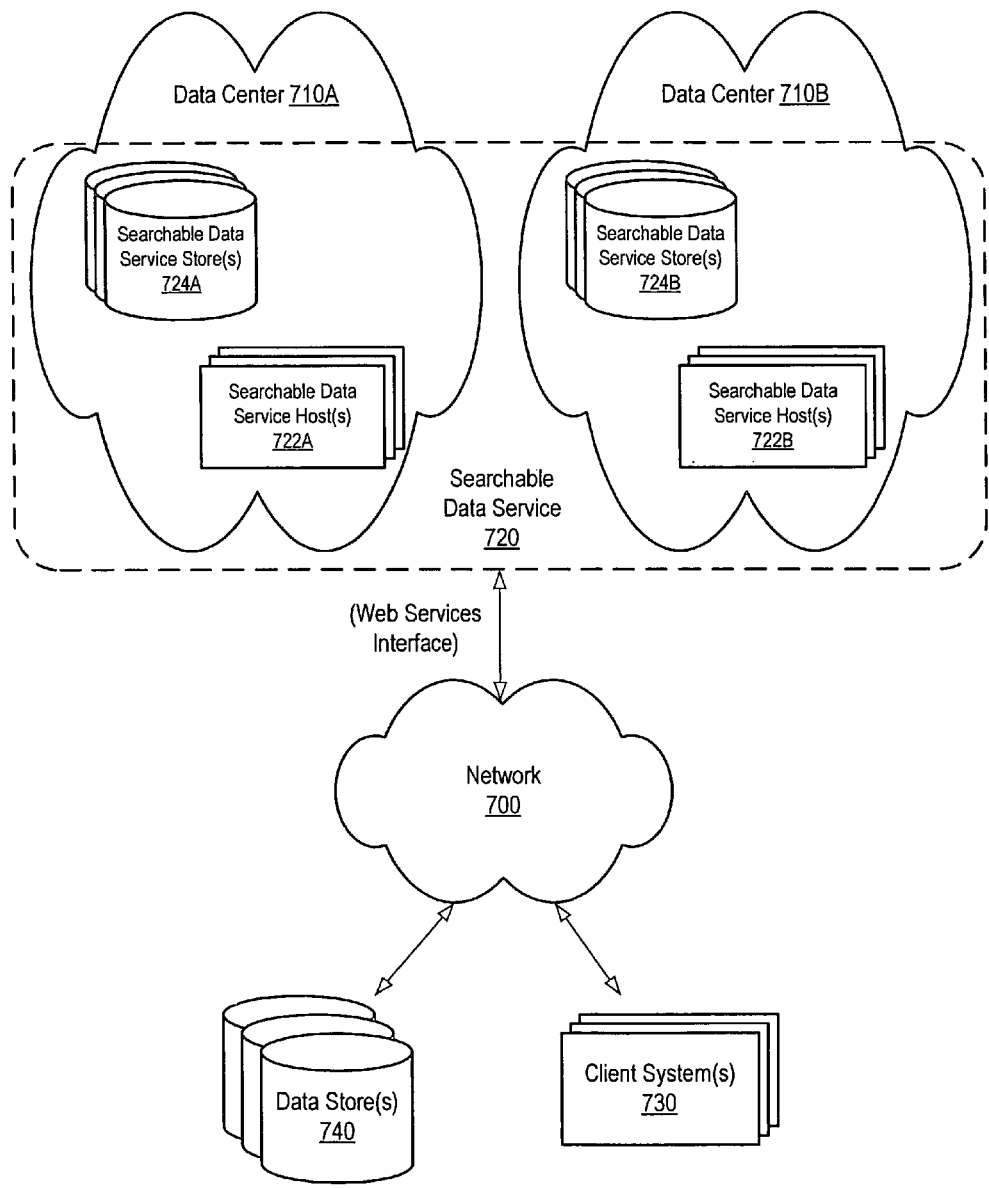
FIG. 19 illustrates an implementation of a searchable data service in a networked environment according to one embodiment.

FIG. 19 illustrates an implementation of a searchable data service 720 in a networked environment according to one embodiment. Network 700 may represent, for example, the World Wide Web, or Internet. Alternatively, network 700 may represent a Local Area Network (LAN), or Wide Area Network (WAN). Searchable data service 720 may be implemented across one or more data centers 710 (e.g., data centers 710A and 710B). A data center 710 represents a local collection of computing devices, which may include, but are not limited to, server systems and storage devices. Data centers 710 may be geographically dispersed. Note that not all computing devices in a data center 710 may participate in searchable data service 720.

Searchable data service hosts 722A and 722B, in data centers 710A and 710B respectively, represent individual computer systems (e.g., server systems) that host instances of searchable data service nodes, such as coordinator nodes 340, query TSAR nodes 350, and storage nodes 360 as illustrated in FIG. 4. In one embodiment, each searchable data service host 722 may host one and only one searchable data service node. In this embodiment, each searchable data service host 722 represents a distinct searchable data service node; each coordinator node 340, query TSAR node 350, and storage node 360 is instantiated on a separate computer system.

In another embodiment, a searchable data service host 722 may host one or more searchable data service nodes. For example, one searchable data service host 722 in a data center may host an instance of coordinator node 340, and another host 722 may host an instance of query TSAR node 350 and storage node 360.

In one embodiment, components of a searchable data service node may be instantiated across two or more searchable data service hosts 722. In this embodiment, two or more computer systems may constitute one searchable data service node.

Searchable data service stores 724 represent the various data that may be persistently stored by the searchable data service, such as the eID stores 236, query index stores 234, request logs 210, membership maps 218, and message logs 224 illustrated in FIG. 6. Note that, while FIG. 12 shows stores 724 as external to hosts 722, in one embodiment, at least a portion of searchable data service stores 724 may be located on storage within hosts 722. In various embodiment, searchable data service stores 724 may be stored on any type of persistent storage device(s) or storage system(s) within hosts 722, within data centers 710, remotely located elsewhere on network 700, or some combination of the above. Note that a storage node 360 logically includes at least a local eID store 236 and a query index store 234, along with components that are instantiated on a searchable data service host 722. Similarly, coordinator nodes 340 and query TSAR nodes 350 may logically include at least some data stored in searchable data service stores 724.

A client system 730 may be coupled to the network 700 via any wired or wireless network connection mechanism. Client systems 730 may access searchable data service 720, via a Web service interface as described above, to create and update searchable indexes for data stored in data stores 740, and/or to query the searchable indexes to obtain locators for entities stored in data stores 740. Client systems 730 and the storage devices that store data stores 740 may be located anywhere on network 700. The Web service interface may be provided by a Web services platform (see Web services platform 200 of FIG. 6, for example) instantiated on one or more server systems coupled to network 700, which may or may not reside in data centers 710 that include other searchable data service 720 hardware components. Note that the Web services platform may provide redundancy in hardware and software so that the Web services platform is not a single point of failure for the searchable data service 720.

Note that the underlying architecture, implementation, and operations of searchable data service 720 are opaque to client systems 730 and to developers of client applications that are instantiated on client systems 730 to leverage the searchable data service 720 as a search frontend for data stores 740. Developers may program the search frontends for the client applications in accordance with the exposed Web service interface to the searchable data service.

Searchable data service 720 may scale to store large amounts of data. No special configuration is required to scale the searchable data service 720. Heterogeneous machines may be added to the system, and the machines may be detected and added to the searchable data service 720 automatically: Scaling may be achieved by adding additional hosts 722 and storage devices to data centers 710, and/or by adding new data centers 710 to the searchable data service 720, and not just by adding larger servers.

The searchable data service 720 may be scaled by adding additional hardware to address one or more of, but not limited to, the following:
The number of searchable data service clients.
The size of a particular searchable index domain for a searchable data service subscriber, and/or the overall size of all domains for all subscribers.
The size and number of attributes in each searchable data service object.
The number of requests served (read/write throughput).
The number of nodes (additional coordinator nodes 340 may be added for load-balancing, for example).
Redundancy requirements (how many replicas of a partition are required).
Availability, consistency, and performance in general. Additional nodes may be added to a data center 710 and/or additional data centers 710 may be added to the searchable data service 720 to improve availability, consistency, and performance of the overall system. As a more specific example, replicating a partition to an additional storage node 360 within a data center or to storage nodes 360 in another newly-added data center may provide additional redundancy, increase availability, and improve load-balancing.

Rather than requiring particular models of potentially expensive hardware (e.g., server systems) or hardware/software server solutions from particular vendors, searchable data service 720 may be implemented on relatively inexpensive, heterogeneous commodity hardware from one or more vendors within a data center 710. Different types of systems from different vendors may be used as hosts 722 in the searchable data service infrastructure, with different disk sizes and performance capabilities, different CPU capabilities, RAM capacities, etc, as long as the systems are generally compatible with the other systems in the data center 710. In one embodiment, one or more minimum requirements for a host 722 may be established, but any compatible system that meets the minimum requirements may serve as a host 722.

Embodiments may support a two-touch data center maintenance model, whereby hosts 722 may not be repaired, but instead may be replaced; once they fail. By using relatively inexpensive, heterogeneous hardware, the searchable data service 720 may be scaled inexpensively and rapidly.

From the client perspective, searchable data service 720 functionality and performance should not be affected by system faults such as host 722, network, or even data center 710 failures. The logical and physical architecture of the searchable data service 720, as described herein, has no single point of failure. The searchable data service 720 may withstand the temporary or permanent loss of a machine within a data center 710 or even an entire data center 710 without affecting client functionality. The searchable data service 720 may withstand the random failure of a host 722, networking hardware, or even an entire data center 710 without a significant impact on clients 730. The searchable data service 720 may withstand the intentional shutting down of one or more hosts 722 in a single data center 710 without significantly impacting overall operations of the searchable data service 720, which for example allows a fleet of hosts 722 within a data center 710 to be upgraded if necessary or desired.

In one embodiment, searchable data service 720 may provide global accessibility on network 700. In providing global accessibility, the searchable data service 720 may provide similar latency and throughput performance to clients systems 730 irrespective of the geographic location of the client system 730. Note that a client system 730 may be coupled to the network 700 via any wired or wireless network connection mechanism. To assist in providing global accessibility with similar performance experiences for client systems 730 irrespective of the locations of the client systems 730, searchable data service 720 may be implemented across data centers 710 that are widely dispersed geographically. A searchable index (domain) of a subscriber that may require global accessibility may then be replicated across the geographically distributed and distant data centers 710. Note that a geographically distributed domain may result in a small increase in latency when synchronizing the data across the data centers 730.

Exemplary System

Figure 20:
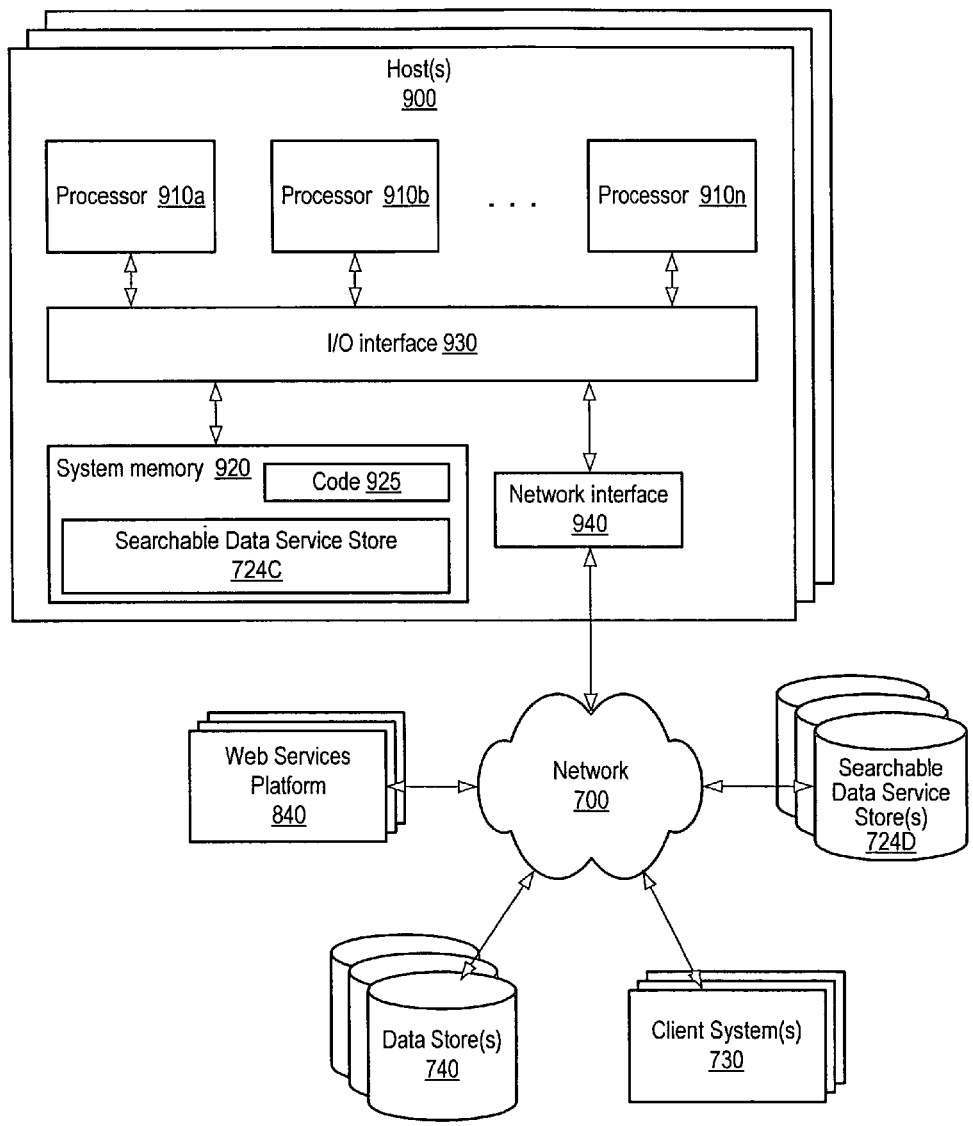
FIG. 20 is a block diagram illustrating an exemplary embodiment of a computer system on which embodiments may be implemented.

In one embodiment, a host system that implements one or more components of a searchable data service as described herein may include a general-purpose computer system that includes or is configured to access one or more computer-accessible media, such as host system 900 illustrated in FIG. 20. In the illustrated embodiment, host system 900 includes one or more processors 910 coupled to a system memory 920 via an input/output (I/O) interface 930. Computer system 900 further includes a network interface 940 coupled to I/O interface 930.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those methods and techniques described above for various nodes of a searchable data service, are shown stored within system memory 920 as code 925. In addition, searchable data service store 724C represents the various data that may be persistently stored by the searchable data service, such as the eID stores 236, query index stores 234, request logs 210, membership maps 218, and message logs 224 illustrated in FIG. 6, which in one embodiment may be stored at least in part in system memory 920 of host(s) 900.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between a host system 900 hosting a searchable data service node and other devices attached to a network, such as other host systems 900 hosting other searchable data services nodes and storage devices or systems that may be used to store at least a portion of searchable data service store(s) 724D. In particular, network interface 20, 940 may be configured to allow communications between a host system 900 and other computer systems on network 700 hosting a Web services platform 840 that provides a Web service interface for the searchable data service to client systems 730 via network 700. Network interface 940 may commonly support one or more wired or wireless networking protocols (e.g., Wi-Fi/IEEE 802.11, or another wireless networking standard). In various embodiments, network interface 940 may support communication via any suitable wired or wireless general data networks, such as other types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible storage medium configured to store program instructions and data as described above for implementing one or more components of a searchable data service as described above. However, in other embodiments, program instructions and/or data may be received, sent or stored upon different types of computer-accessible media. Generally speaking, a computer-accessible storage medium may include storage media or memory media such as magnetic or optical media, e.g., disk or DVD/CD coupled to computer system 900 via I/O interface 930. A computer-accessible storage medium may also include any volatile or non-volatile media such as RAM (e.g. SDRAM, DDR SDRAM, RDRAM, SRAM, etc.), ROM, etc, that may be included in some embodiments of computer system 900 as system memory 920 or another type of memory. Further, a computer-accessible storage medium may include transmission media or signals such as electrical, electromagnetic, or digital signals, conveyed via a communication medium such as a network and/or a wireless link, such as may be implemented via network interface 940.

CONCLUSION

Various embodiments may further include receiving, sending or storing instructions and/or data implemented in accordance with the foregoing description upon a computer-accessible storage medium. Generally speaking, a computer-accessible storage medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A searchable data service system, comprising:
a plurality of computer devices configured to implement a searchable data service, wherein the searchable data service is configured to process query requests from client applications to locate searchable data service objects in respective searchable indexes stored on the plurality of computer devices that satisfy the query requests, wherein each searchable data service object specifies two or more attributes of a particular entity in a particular one of a plurality of independent data stores on one or more storage devices each on a network and separate from the plurality of computer devices that implement the searchable data service, wherein each searchable index stores searchable data service objects for a particular one of the plurality of independent data stores, and wherein the attributes include a unique entity identifier for locating the particular entity in the particular data store;

wherein the searchable data service comprises a node group comprising two or more nodes implemented on the plurality of computer devices, wherein each node in the node group comprises an instance of a group health component of the searchable data service, wherein the group health component on each node is configured to:

send group health messages each including collected local health information for the node to at least one other node in the node group; and receive group health messages originating from one or more others of the nodes in the node group, wherein each group health message includes local health information for the originating node.

2. The system as recited in claim 1, wherein each attribute is expressed as a {name, value} pair.

3. The system as recited in claim 1, wherein each node in the node group is configured to compare collected local health information for the node to local health information for at least one of the one or more other nodes in the node group received in the group health messages to make local node health decisions for the node.

4. The system as recited in claim 1, wherein each node in a node group is configured to send group health messages and to receive group health messages in accordance with a gossip protocol.

5. The system as recited in claim 1, wherein the nodes in a node group are configured to propagate received group health messages to other nodes in the node group in accordance with a gossip protocol.

6. The system as recited in claim 1, wherein each node in a node group is configured to piggyback group health messages on other searchable data service messages to other nodes in the node group.

7. The system as recited in claim 1, wherein the group health component on each node is further configured to provide the local health information for other nodes received in group health messages to one or more other searchable data service components on the node.

8. The system as recited in claim 1, wherein the group health component on each node is further configured to determine that another node in the node group has gone offline if a new group health message from the other node is not received within a specified period after a last received group health message from the other node.

9. The system as recited in claim 1, wherein the group health component on each node is further configured to:

detect that a new group health message has not been received from a particular node in the node group for a specified period;

perform an anti-entropy operation with another one of the plurality of nodes to obtain updated health information for the nodes in the node group in response to said detection; and if the anti-entropy operation does not produce updated health information for the particular node, determine that the particular node has gone offline.

10. The system as recited in claim 1, wherein the searchable data service comprises a plurality of nodes configured to organize into node groups each including a subset of the plurality of nodes, wherein each node in a node group is configured to communicate group health messages with other nodes in the node group in accordance with a gossip protocol.

11. The system as recited in claim 1, wherein the local health information includes:

one or more storage resource usage metrics for a local storage resource;

one or more processor usage metrics for a local processor resource; and one or more network usage metrics for a network communications resource.

12. The system as recited in claim 1, wherein the searchable data service further comprises:

a plurality of storage nodes each configured to persistently store at least one partition of the searchable index;

one or more query nodes each configured to:

maintain a local query cache of responses to previous query requests;

access the local query cache on the query node to determine if a query request can be satisfied from the local query cache; and if the query request cannot be satisfied from the local query cache, forward the query request to an appropriate one or more of the storage nodes;

one or more coordinator nodes each configured to:

receive service requests from the client application, wherein the service requests comprise storage requests and query requests;

forward each storage request to an appropriate one or more of the storage nodes; and forward each query request to an appropriate one or more of the query nodes.

13. The system as recited in claim 12, wherein each of the one or more storage nodes is configured to:

receive a storage request from a coordinator node; and modify a partition of the searchable index persistently stored by the storage node as specified in the storage request.

14. The system as recited in claim 12, wherein each of the one or more storage nodes is configured to:

receive a query request from a query node;

search a partition of the searchable index persistently stored by the storage node to locate a set of one or more searchable data service objects in the searchable index that satisfy the query request; and return at least the entity identifiers from the set of one or more searchable data service objects that satisfy the query request to the client application.

15. The system as recited in claim 12, wherein the searchable data service comprises a plurality of nodes configured to organize into node groups each including a subset of the plurality of nodes, wherein each node in a node group is configured to communicate with other nodes in the node group in accordance with a gossip protocol to propagate searchable data service information within the node group;

wherein the storage nodes are configured to organize into one or more storage node groups;

wherein the query nodes are configured to organize into one or more query node groups; and wherein the coordinator nodes are configured to organize into one or more coordinator node groups.

16. The system as recited in claim 15, wherein each query node and each coordinator node comprises an instance of a storage node locator component of the searchable data service, wherein the storage node locator component is configured to locate appropriate storage nodes to receive service requests, and wherein the query nodes and coordinator nodes are configured to self-organize into one or more storage node locator groups.

17. The system as recited in claim 12, wherein the searchable data service comprises a plurality of nodes distributed among two or more data centers, wherein each data center includes two or more of the storage nodes, one or more of the query nodes, and one or more of the coordinator nodes.

18. The system as recited in claim 1, further comprising a web services platform configured to provide a web service interface to the searchable data service, wherein the web services platform is configured to:
receive service requests from the client application in accordance with the web service interface to the searchable data service, wherein the service requests comprise query requests and storage requests; and
return searchable data service responses to the service request to the client application in accordance with the web service interface to the searchable data service.

19. The system as recited in claim 1, wherein, to send group health messages each including collected local health information for the node to at least one other node in the node group, the group health component on each node is further configured to periodically send a group health message including collected local health information for the node to at least one other node in the node group.

20. The method as recited in claim 19, further comprising:
comparing collected local health information for a node in the node group to local health information for at least one of the one or more other nodes in the node group received in group health messages;
making a local node health decision on the node in accordance with said comparing.

21. The system as recited in claim 1, wherein, to send group health messages including collected local health information for the node to at least one other node in the node group, the group health component on each node is further configured to aperiodically send a group health message including collected local health information for the node to at least one other node in the node group.

22. A method, comprising:
processing query requests received from client applications by a searchable data service implemented on a plurality of computer devices, wherein the searchable data service is configured to locate searchable data service objects in respective searchable indexes that satisfy the query requests, wherein each searchable data service object specifies two or more attributes of a particular entity in a articular one of a plurality of independent data stores on one or more storage devices on a network and separate from the plurality of computer devices that implement the searchable data service, wherein each searchable index stores searchable data service objects for a particular one of the plurality of independent data stores, and wherein the attributes include a unique entity identifier for locating the particular entity in the particular data store;
wherein the searchable data service comprises a plurality of nodes implemented on the plurality of computer devices, wherein the plurality of nodes are organized into one or more node groups each including a subset of the plurality of nodes, wherein each node in the node group comprises an instance of a group health component of the searchable data service;
on each node in a node group, the group health component on the node:
sending group health messages each including collected local health information for the node to at least one other node in the node group; and
receiving group health messages originating from one or more others of the nodes in the node group, wherein each group health message includes local health information for the originating node.

23. The method as recited in claim 22, wherein each attribute is expressed as a {name, value} pair.

24. The method as recited in claim 22, wherein the nodes in the node group are each configured to send group health messages and to receive group health messages in accordance with a gossip protocol.

25. The method as recited in claim 22, further comprising the nodes in the node group propagating received group health messages to other nodes in the node group in accordance with a gossip protocol.

26. The method as recited in claim 22, further comprising piggybacking group health messages on other searchable data service messages to be sent from a node in the node group to one or more other nodes in the node group.

27. The method as recited in claim 22, further comprising forwarding the local health information for other nodes received in group health messages from the group health component on the node to one or more other searchable data service components on the node.

28. The method as recited in claim 22, further comprising determining that another node in the node group has gone offline if a new group health message from the other node is not received within a specified period after a last received group health message from the other node.

29. The method as recited in claim 28, wherein said determining that another node in the node group has gone offline is performed by the group health component on the node.

30. The method as recited in claim 22, further comprising the group health component on a node in the node group:
detecting that a new group health message has not been received from a particular node in the node group for a specified period;
performing an anti-entropy operation with another one of the plurality of nodes to obtain updated health information for the nodes in the node group in response to said detection; and
determining that the particular node has gone offline if the anti-entropy operation does not produce updated health information for the particular node.

31. The method as recited in claim 22, wherein each node in a node group is configured to communicate with other nodes in the node group in accordance with a gossip protocol.

32. The method as recited in claim 22, wherein the local health information includes:
one or more storage resource usage metrics for a local storage resource;
one or more processor usage metrics for a local processor resource; and
one or more network usage metrics for a network communications resource.

33. The method as recited in claim 22, wherein the plurality of nodes comprises a plurality of storage nodes, one or more coordinator nodes, and one or more query nodes, and wherein the method further comprises:
persistently storing at least one partition of the searchable index on each of the plurality of storage nodes;
on each of the one or more coordinator nodes:
receiving service requests from the client application, wherein the service requests comprise storage requests and query requests;
forwarding each storage request to an appropriate one or more of the storage nodes; and
forwarding each query request to an appropriate one or more of the query nodes;
on each of the one or more query nodes:
maintaining a local query cache of responses to previous query requests;

accessing the local query cache on the query node to determine if a query request can be satisfied from the local query cache;

forwarding the query request to an appropriate one or more of the storage nodes if the query request cannot be satisfied from the local query cache.

34. The method as recited in claim 33, further comprising, on each of the one or more storage nodes:

receiving a storage request from a coordinator node; and modifying a partition of the searchable index persistently stored by the storage node as specified in the storage request.

35. The method as recited in claim 33, further comprising, on each of the one or more storage nodes:

receiving a query request from a query node;

searching a partition of the searchable index persistently stored by the storage node to locate a set of one or more searchable data service objects in the searchable index that satisfy the query request; and returning at least the entity identifiers from the set of one or more searchable data service objects that satisfy the query request to the client application.

36. The method as recited in claim 33, wherein the two or more node groups include:

one or more storage node groups each comprising a subset of the storage nodes;

one or more query node groups each comprising a subset of the query nodes; and one or more coordinator node groups each comprising a subset of the coordinator nodes.

37. The method as recited in claim 36, wherein each query node and each coordinator node comprises an instance of a storage node locator component of the searchable data service configured to locate appropriate storage nodes to receive service requests, and wherein the two or more node groups include one or more storage node locator groups each including a subset of the query nodes and the coordinator nodes.

38. The method as recited in claim 33, wherein the plurality of nodes is distributed among two or more data centers, wherein each data center includes two or more of the storage nodes, one or more of the query nodes, and one or more of the coordinator nodes.

39. The method as recited in claim 22, further comprising a web services platform configured to provide a web service interface to the searchable data service, wherein the method further comprises the web services platform:

providing a web service interface to the searchable data service;

receiving service requests from the client application in accordance with the web service interface to the searchable data service, wherein the service requests comprise query requests and storage requests;

forwarding the received service requests to one or more of the plurality of nodes; and returning searchable data service responses to the service request to the client application in accordance with the web service interface to the searchable data service.

40. The method as recited in claim 22, wherein said sending group health messages each including collected local health information for the node to at least one other node in the node group comprises periodically sending a group health message including collected local health information for the node to at least one other node in the node group.

41. The method as recited in claim 22, wherein said sending group health messages each including collected local health information for the node to at least one other node in the node group comprises aperiodically sending a group health message including collected local health information for the node to at least one other node in the node group.

42. A computer-accessible memory medium storing program instructions, wherein the program instructions are computer-executable to implement a searchable data service on a plurality of nodes, wherein the searchable data service is configured to:

process query requests received from client applications by a searchable data service implemented on a plurality of computer devices, wherein the searchable data service is configured to locate searchable data service objects in respective searchable indexes that satisfy the query requests, wherein each searchable data service object specifies two or more attributes of a particular entity in a particular one of a plurality of independent data stores on one or more storage devices on a network and separate from the plurality of computer devices that implement the searchable data service, wherein each searchable index stores searchable data service objects for a particular one of the plurality of independent data stores, and wherein the attributes include a unique entity identifier for locating the particular entity in the particular data store;

wherein the searchable data service comprises a plurality of nodes implemented on the plurality of computer devices, wherein the plurality of nodes are organized into one or more node groups each including a subset of the plurality of nodes, wherein each node in the node group comprises an instance of a group health component of the searchable data service;

wherein, on each node in a node group, the group health component of the searchable data service is configured to:

send group health messages each including collected local health information for the node to at least one other node in the node group; and receive group health messages originating from one or more others of the nodes in the node group, wherein each group health message includes local health information for the originating node.

43. The computer-accessible memory medium as recited in claim 42, wherein each attribute is expressed as a {name, value} pair.

44. The computer-accessible memory medium as recited in claim 42, wherein each node in a node group is configured to compare collected local health information for the node to local health information for at least one of the one or more other nodes in the node group received in the group health messages to make local node health decisions for the node.

45. The computer-accessible memory medium as recited in claim 42, wherein each node in a node group is configured to send group health messages and to receive group health messages in accordance with a gossip protocol.

46. The computer-accessible memory medium as recited in claim 42, wherein the nodes in a node group are configured to propagate received group health messages to other nodes in the node group in accordance with a gossip protocol.

47. The computer-accessible memory medium as recited in claim 42, wherein each node in a node group is configured to piggyback group health messages on other searchable data service messages to other nodes in the node group.

48. The computer-accessible memory medium system as recited in claim 42, wherein the group health component on each node is further configured to provide the local health information for other nodes received in group health messages to one or more other searchable data service components on the node.

49. The computer-accessible memory medium as recited in claim 42, wherein, on each node in the node group, the group health component of the searchable data service is further configured to determine that another node in the node group has gone offline if a new group health message from the other node is not received within a specified period after a last received group health message from the other node.

50. The computer-accessible memory medium as recited in claim 42, wherein, on each node in the node group, the group health component of the searchable data service is configured to:
   detect that a new group health message has not been received from a particular node in the node group for a specified period;
   perform an anti-entropy operation with another one of the plurality of nodes to obtain updated health information for the nodes in the node group in response to said detection; and
   if the anti-entropy operation does not produce updated health information for the particular node, determine that the particular node has gone offline.

51. The computer-accessible memory medium as recited in claim 42, wherein each node in a node group is configured to communicate with other nodes in the node group in accordance with a gossip protocol and an anti-entropy protocol.

52. The computer-accessible memory medium as recited in claim 42, wherein the local health information includes:
   one or more storage resource usage metrics for a local storage resource;
   one or more processor usage metrics for a local processor resource; and
   one or more network usage metrics for a network communications resource.

53. The computer-accessible memory medium as recited in claim 42, wherein the program instructions are configured to implement the searchable data service on the plurality of nodes as:
   a plurality of storage nodes each configured to persistently store at least one partition of the searchable index;
   one or more query nodes each configured to:
     maintain a local query cache of responses to previous query requests;
     access the local query cache on the query node to determine if a query request can be satisfied from the local query cache; and
     if the query request cannot be satisfied from the local query cache, forward the query request to an appropriate one or more of the storage nodes;
   one or more coordinator nodes each configured to:
     receive service requests from the client application, wherein the service requests comprise storage requests and query requests;
     forward each storage request to an appropriate one or more of the storage nodes; and
     forward each query request to an appropriate one or more of the query nodes.

54. The computer-accessible memory medium as recited in claim 53, wherein each of the one or more storage nodes is configured to:
   receive a storage request from a coordinator node; and
   modify a partition of the searchable index persistently stored by the storage node as specified in the storage request.

55. The computer-accessible memory medium as recited in claim 53, wherein each of the one or more storage nodes is configured to:
   receive a query request from a query node;
   search a partition of the searchable index persistently stored by the storage node to locate a set of one or more searchable data service objects in the searchable index that satisfy the query request; and
   return at least the entity identifiers from the set of one or more searchable data service objects that satisfy the query request to the client application.

56. The computer-accessible memory medium as recited in claim 53, wherein the two or more node groups include:
   one or more storage node groups each comprising a subset of the storage nodes;
   one or more query node groups each comprising a subset of the query nodes; and
   one or more coordinator node groups each comprising a subset of the coordinator nodes.

57. The computer-accessible memory medium as recited in claim 56, wherein each query node and each coordinator node comprises an instance of a storage node locator component of the searchable data service configured to locate appropriate storage nodes to receive service requests, and wherein the two or more node groups include one or more storage node locator groups each including a subset of the query nodes and the coordinator nodes.

58. The computer-accessible memory medium as recited in claim 53, wherein the plurality of nodes is distributed among two or more data centers, wherein each data center includes two or more of the storage nodes, one or more of the query nodes, and one or more of the coordinator nodes.

59. The computer-accessible memory medium as recited in claim 42, wherein the program instructions are further configured to implement a web service interface to the searchable data service, wherein the web service interface is configured to:
   receive service requests from the client application in accordance with the web service interface, wherein the service requests comprise query requests and storage requests;
   forward the received service requests to one or more of the plurality of nodes; and
   return searchable data service responses to the service request to the client application in accordance with the web service interface.

60. The computer-accessible memory medium as recited in claim 42, wherein, to send group health messages each including collected local health information for the node to at least one other node in the node group, the group health component on each node is further configured to periodically send a group health message including collected local health information for the node to at least one other node in the node group.

61. The computer-accessible memory medium as recited in claim 42, wherein, to send group health messages including collected local health information for the node to at least one other node in the node group, the group health component on each node is further configured to aperiodically send a group health message including collected local health information for the node to at least one other node in the node group.

62. A searchable data service node, comprising:
   one or more processors;
   a network interface configured to communicatively couple to a network; and
   a memory comprising program instructions, wherein the program instructions are executable by the one or more processors to:
     persistently store a partition of a particular one of a plurality of searchable indexes maintained by a searchable data service implemented on a plurality of computer devices, wherein the searchable data service node is implemented on one of the computer devices, wherein the particular searchable index corresponds to a particular one of a plurality of independent data stores on one or more storage devices on the network and separate from the plurality of computer devices that implement the searchable data service, and wherein the partition is configured to store a set of searchable data service objects stored in the particular searchable index;

process query requests received from client applications via the network to locate searchable data service objects that satisfy the query requests in the particular searchable index, wherein each searchable data service object specifies two or more attributes of a particular entity in the data store corresponding to the particular searchable index, and wherein the attributes include a unique entity identifier for locating the particular entity in the corresponding data store;

send group health messages each including collected local health information for the searchable data service node to another searchable data service node implemented on another one of the computer devices via the network; and receive group health messages via the network and originating from the other searchable data service node, wherein each received group health message includes local health information for the other searchable data service node.

63. The searchable data service node as recited in claim 62, wherein each attribute is expressed as a {name, value} pair.

64. The searchable data service node as recited in claim 62, wherein the program instructions are further executable by the one or more processors to compare collected local health information for the searchable data service node to local health information for the other searchable data service node received in the group health messages to make local node health decisions for the searchable data service node.

65. The searchable data service node as recited in claim 62, wherein the program instructions are further executable by the one or more processors to send group health messages and to receive group health messages via the network in accordance with a gossip protocol.

66. The searchable data service node as recited in claim 62, wherein, to periodically or aperiodically send a group health message including collected local health information for the searchable data service node to another searchable data service node via the network, the program instructions are further executable by the one or more processors to piggyback the group health message including collected local health information for the searchable data service node on another searchable data service message to the other searchable data service node.

67. The searchable data service node as recited in claim 62, wherein the program instructions are further executable by the one or more processors to determine that the other searchable data service node has gone offline if a new group health message from the other searchable data service node is not received within a specified period after a last received group health message from the other searchable data service node.

68. The searchable data service node as recited in claim 62, wherein, send group health messages each including collected local health information for the searchable data service node to another searchable data service node via the network, the program instructions are further executable by the one or more processors to periodically send a group health message including collected local health information for the node to at least one other node in the node group.

69. The searchable data service node as recited in claim 62, wherein, send group health messages each including collected local health information for the searchable data service node to another searchable data service node via the network, the program instructions are further executable by the one or more processors to aperiodically send a group health message including collected local health information for the node to at least one other node in the node group.

* * * * *